(12) United States Patent
Hambardzumyan et al.

(10) Patent No.: US 10,710,489 B2
(45) Date of Patent: Jul. 14, 2020

(54) LIFT GATE AND MOUNTING CORRECTION SYSTEM

(71) Applicant: MAXON INDUSTRIES, INC., Santa Fe Springs, CA (US)

(72) Inventors: Levon Hambardzumyan, Glendale, CA (US); Karapet Ablabutyan, Glendale, CA (US); Paul Bark, Canyon Lake, CA (US); Sheralin Lafferty, Pomona, CA (US)

(73) Assignee: MAXON INDUSTRIES, INC., Santa Fe Springs, CA (US)

( * ) Notice: Subject to any disclaimer, the term of this patent is extended or adjusted under 35 U.S.C. 154(b) by 0 days.

(21) Appl. No.: 16/229,565

(22) Filed: Dec. 21, 2018

(65) Prior Publication Data

US 2019/0135155 A1    May 9, 2019

Related U.S. Application Data

(63) Continuation-in-part of application No. 15/640,123, filed on Jun. 30, 2017, which is a continuation of
(Continued)

(51) Int. Cl.
*B60P 1/44* (2006.01)
*F16B 21/09* (2006.01)
*F16B 1/02* (2006.01)

(52) U.S. Cl.
CPC ............ *B60P 1/4485* (2013.01); *B60P 1/44* (2013.01); *B60P 1/4414* (2013.01); *F16B 1/02* (2013.01);
(Continued)

(58) Field of Classification Search
CPC ......... B60P 1/4485; B60P 1/4414; B60P 1/44; Y10T 403/70; Y10T 403/56; F16B 21/09; F16B 1/02
See application file for complete search history.

(56) References Cited

U.S. PATENT DOCUMENTS

| 4,312,529 A | 1/1982 | Gillette |
| 5,806,632 A * | 9/1998 | Budd ................. B66B 9/0853 |
| | | 187/200 |

(Continued)

FOREIGN PATENT DOCUMENTS

CA    2817007    5/2016

OTHER PUBLICATIONS

International Search Report and Written Opinion dated Sep. 4, 2013 for International Application No. PCT/US13/38299.
(Continued)

*Primary Examiner* — Saul Rodriguez
*Assistant Examiner* — Ashley K Romano
(74) *Attorney, Agent, or Firm* — Brooks Acordia IP Law, PC; Michael Zarrabian

(57) ABSTRACT

Systems, methods, and devices for correcting a mounting system for mounting a lift gate on a structure, the lift gate having a lift platform supported between a pair of spaced support columns, the correction system including: a first mounting member configured for attachment onto the structure; a first lift gate support column configured for attachment onto the first mounting member; a first correction mechanism configured to couple with a first support block, where the first correction mechanism creates a force between the first lift gate support column and the first mounting member when engaged, resulting in a first corrective gap forming between the first lift gate support column and the first mounting member; and where the resulting corrective gap orients the first lift gate support column to be substantially parallel with a plane parallel to a rear of the structure such that the lift gate platform can be operated.

20 Claims, 58 Drawing Sheets

Related U.S. Application Data application No. 14/395,269, filed as application No. PCT/US2013/038299 on Apr. 25, 2013, now Pat. No. 9,840,181.

(60) Provisional application No. 61/776,541, filed on Mar. 11, 2013, provisional application No. 61/638,875, filed on Apr. 26, 2012.

(52) U.S. Cl.
CPC .............. *F16B 21/09* (2013.01); *Y10T 403/56* (2015.01); *Y10T 403/70* (2015.01)

(56) References Cited

U.S. PATENT DOCUMENTS

| | | | |
|---|---|---|---|
| 6,183,187 B1 | 2/2001 | Ablabutyan | |
| 6,589,006 B1* | 7/2003 | Krause | B60D 1/54 |
| | | | 414/558 |
| 6,705,825 B2* | 3/2004 | Kreutinger | B60P 1/431 |
| | | | 414/554 |
| 6,893,203 B2 | 5/2005 | Anderson et al. | |
| 6,948,903 B2 | 9/2005 | Ablabutyan et al. | |
| 7,073,837 B2* | 7/2006 | Madlinger | B62D 33/03 |
| | | | 296/57.1 |
| 7,441,995 B2* | 10/2008 | Sobota | A61G 3/06 |
| | | | 410/7 |
| 7,484,921 B2* | 2/2009 | Murphy | B60P 1/4421 |
| | | | 414/462 |
| 7,487,986 B2* | 2/2009 | Leitner | B60R 3/02 |
| | | | 280/163 |
| 7,762,756 B1 | 7/2010 | Ablabutyan et al. | |
| 8,043,040 B2* | 10/2011 | Nespor | B60P 1/02 |
| | | | 414/401 |
| 10,220,759 B2* | 3/2019 | Ablabutyan | B60P 1/44 |
| 2006/0245885 A1 | 11/2006 | Ablabutyan et al. | |
| 2009/0072570 A1 | 3/2009 | Savoy | |
| 2010/0313479 A1 | 12/2010 | Bark | |
| 2014/0003897 A1 | 1/2014 | Ablabutyan | |

OTHER PUBLICATIONS

Notification Concerning Transmittal of International Preliminary Report on Patentability for serial No. PCT/US2013/03299 dated Nov. 6, 2014.

* cited by examiner

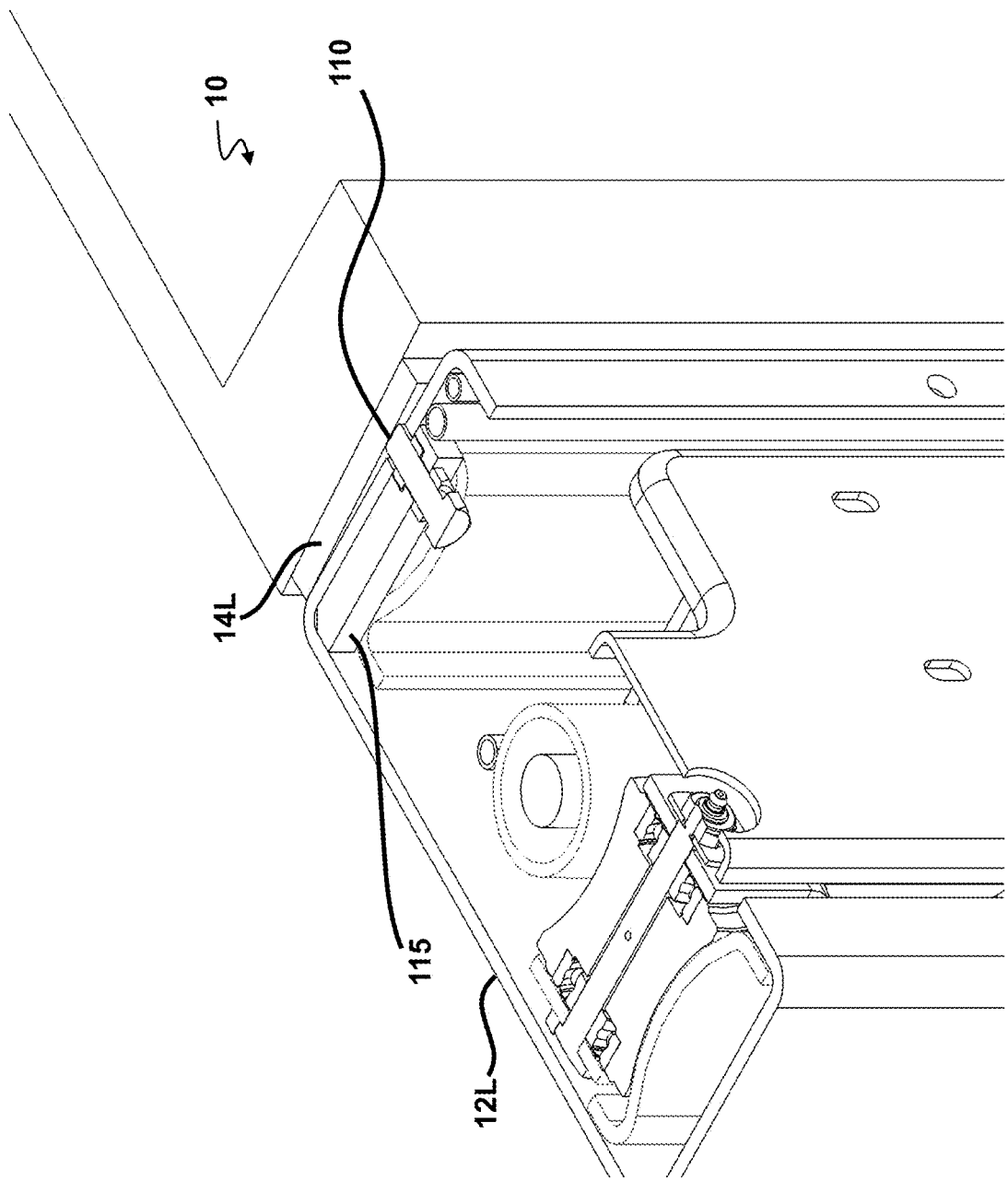

LIFT GATE AND MOUNTING CORRECTION SYSTEM

CROSS REFERENCE TO RELATED APPLICATIONS

This application is a continuation-in-part of U.S. patent application Ser. No. 15/640,123 filed Jun. 30, 2017, which is a continuation of U.S. Nonprovisional patent application Ser. No. 14/395,269, filed Oct. 17, 2014, which is the U.S. National Phase Patent Application under 35 U.S.C. § 371 of International Application Number PCT/US2013/038299, filed Apr. 25, 2013, which claims the priority benefit of U.S. Provisional Patent Application Ser. No. 61/638,875 filed Apr. 26, 2012, and further this application claims the priority benefit of U.S. Provisional Patent Application Ser. No. 61/776,541 filed Mar. 11, 2013, all of which are incorporated herein by reference in their entirety.

BACKGROUND

Field of the Invention

The present invention relates generally to lift gates and, in particular, to mounting systems for lift gates.

Description of Related Art

One type of a lift gate system comprises a load elevator in the form of a lift gate including a dual lift system having a parallel pair of vertically extending columns, each having a vertically-disposed hydraulic cylinder for vertically raising and lowering a load carried by the pair of cylinders.

Such a lift gate includes a rigid H-frame having said parallel pair of upstanding columns. The columns contain a corresponding pair of vertically-disposed hydraulic cylinders having runners interconnected by a transverse stabilizing bar typically supporting a two-section foldable lifting platform actuated on each side by an actuating linkage system.

Lift gates are typically mounted at a structure such as an opening at the rear of a vehicle to lift payloads on a lift platform from one level (e.g., ground level) up to another level (e.g., the bed of the vehicle), and vice versa.

BRIEF SUMMARY

An embodiment of a mounting system for mounting a lift gate on a structure is provided, wherein the lift gate has a lift platform supported between a pair of spaced support columns. The mounting system comprises a first mounting member configured for attachment onto said structure, wherein the first mounting member includes a support protrusion for engaging an opening in a wall of a corresponding lift gate support column. The mounting system further comprises a second mounting member configured for attachment onto said structure, wherein the second mounting member includes a support protrusion for engaging an opening in a wall of a corresponding lift gate support column. When the mounting members are attached to the structure and the corresponding lift gate support columns are mounted on the support protrusions, the mounting members support the lift gate on the structure.

These and other features, aspects and advantages of the present invention will become understood with reference to the following description, appended claims, and accompanying FIGS.

BRIEF DESCRIPTION OF THE DRAWINGS

FIG. 44B shows a perspective cross-section of the upper support block and upper correction mechanism of FIG. 44A about line A-A, according to one embodiment.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments of a lift system (including a lift gate), a mounting system for mounting the lift gate on a vehicle, and a method of mounting the lift gate on the vehicle using the mounting system, are disclosed herein.

An embodiment of a mounting system for mounting a lift gate on a structure is provided, wherein the lift gate has a lift platform supported between a pair of spaced support columns. The mounting system comprises a first mounting member configured for attachment onto said structure, wherein the first mounting member includes a support protrusion for engaging an opening in a wall of a corresponding lift gate support column. The mounting system further comprises a second mounting member configured for attachment onto said structure, wherein the second mounting member includes a support protrusion for engaging an opening in a wall of a corresponding lift gate support column. When the mounting members are attached to the structure and the corresponding lift gate support columns are mounted on the support protrusions, the mounting members support the lift gate on the structure.

Figure 1:
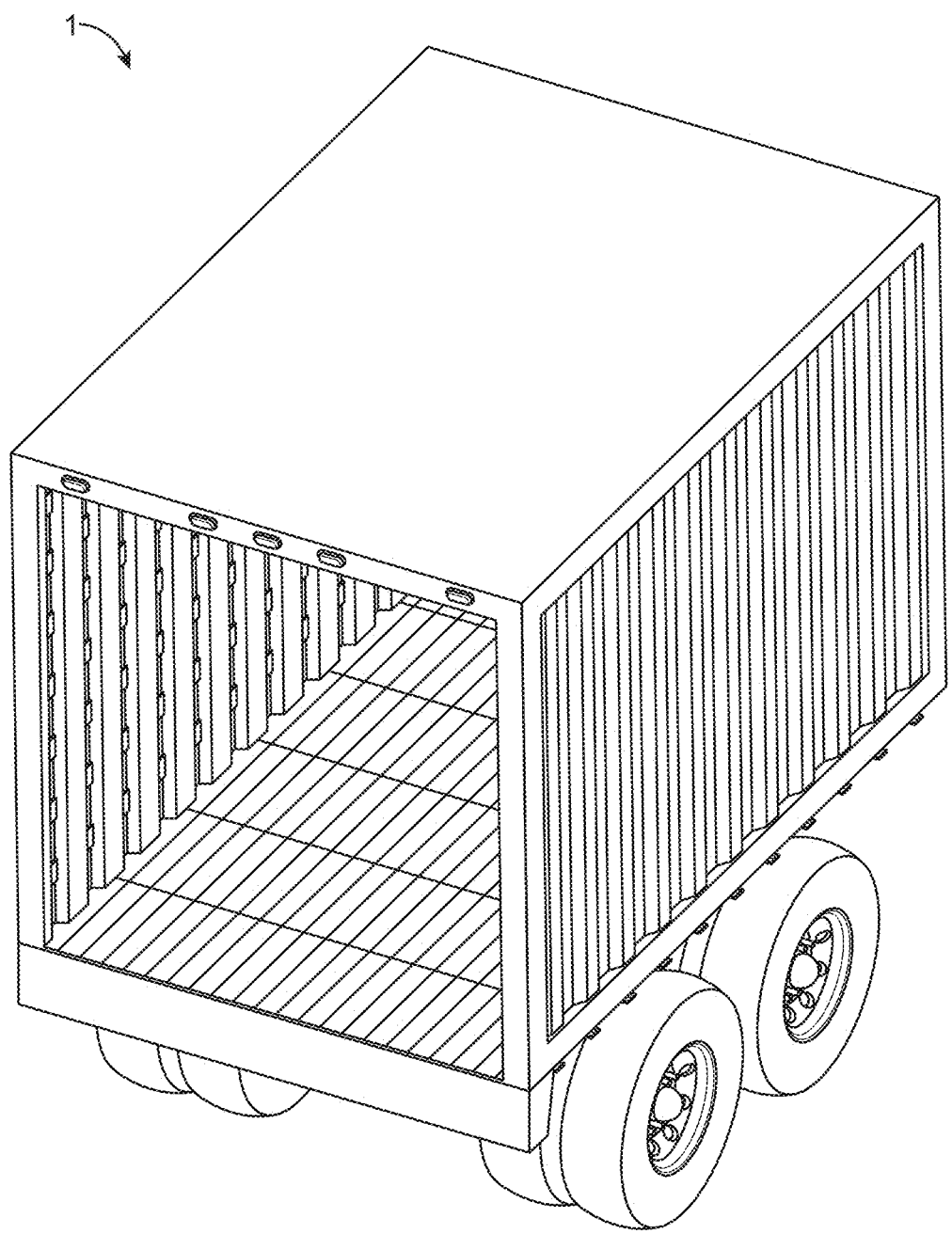
FIG. 1 shows an example vehicle, such as a truck with a rear opening, suitable for installing a lift gate, according to one embodiment.
Figure 13:
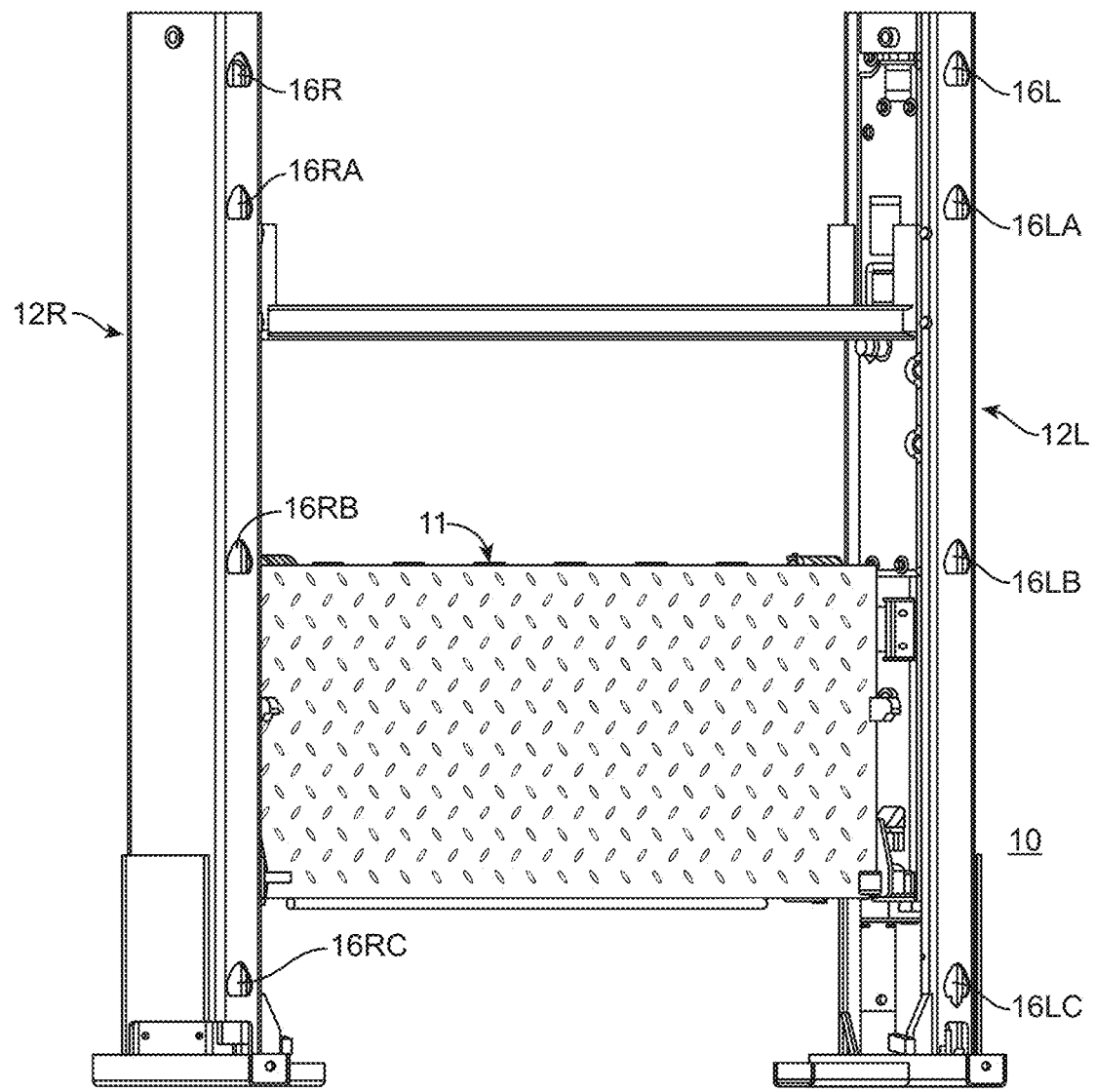
FIG. 13 shows a perspective view of an un-mounted lift gate, according to one embodiment.

FIG. 1 shows an example vehicle 1, such as truck with a rear opening, suitable for installing a lift gate. In one embodiment, a lift gate system comprises a load elevator in the form of a lift gate. FIG. 13 shows an embodiment of a lift gate 10. The lift gate 10 provides a dual lift system including said parallel pair of vertically extending columns, each having a vertically-disposed hydraulic cylinder for vertically raising and lowering a load carried by the pair of cylinders.

The lift gate includes a rigid H-frame having said parallel pair of upstanding columns. The columns contain a corresponding pair of vertically-disposed hydraulic cylinders having runners interconnected by a transverse stabilizing bar typically supporting a two-section foldable lifting platform actuated on each side by an actuating linkage system. The lift gate 10 includes a lift platform 11 supported between a left support column 12L and right support column 12R. The support columns 12L, 12R include actuators 300 for lowering/raising the platform 11.

Figure 16:
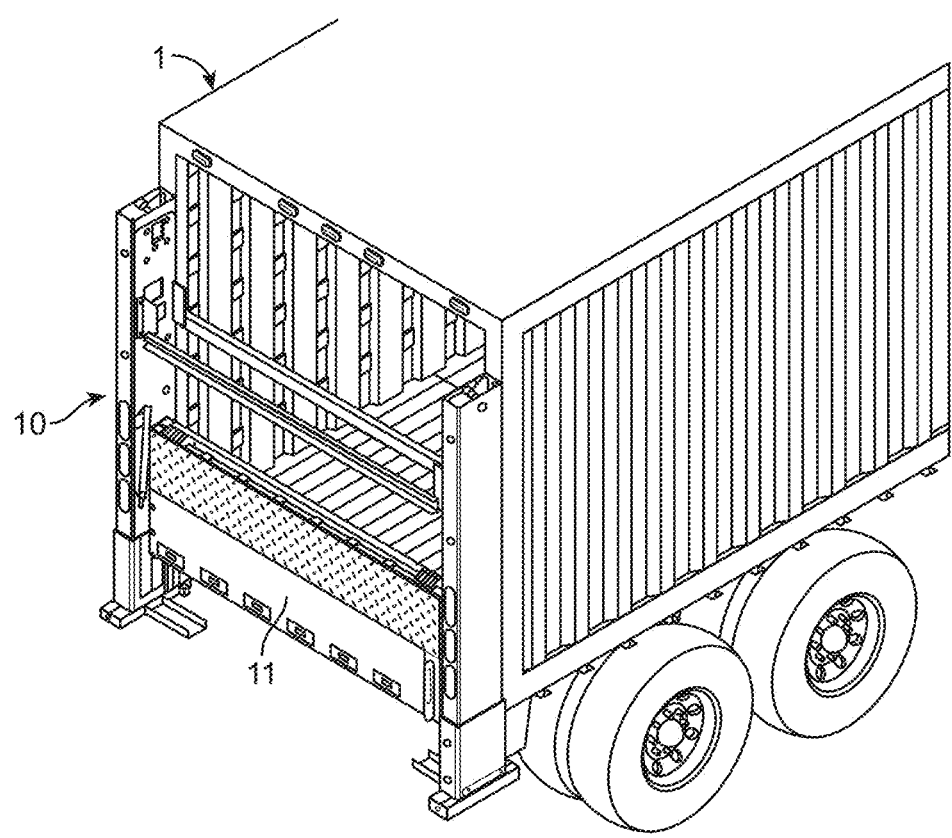
FIG. 16 shows the lift gate mounted at a structure such as an opening at the rear of the vehicle using a mounting system, according to one embodiment.

As shown in FIG. 16, the lift gate 10 is mounted at a structure such as an opening at the rear of the vehicle 1 using a mounting system in one embodiment. The lift gate 10 allows lifting payloads on the platform 11 from one level (e.g., the ground level) up to another level (e.g., the bed of the vehicle), or vice versa.

Figure 5:
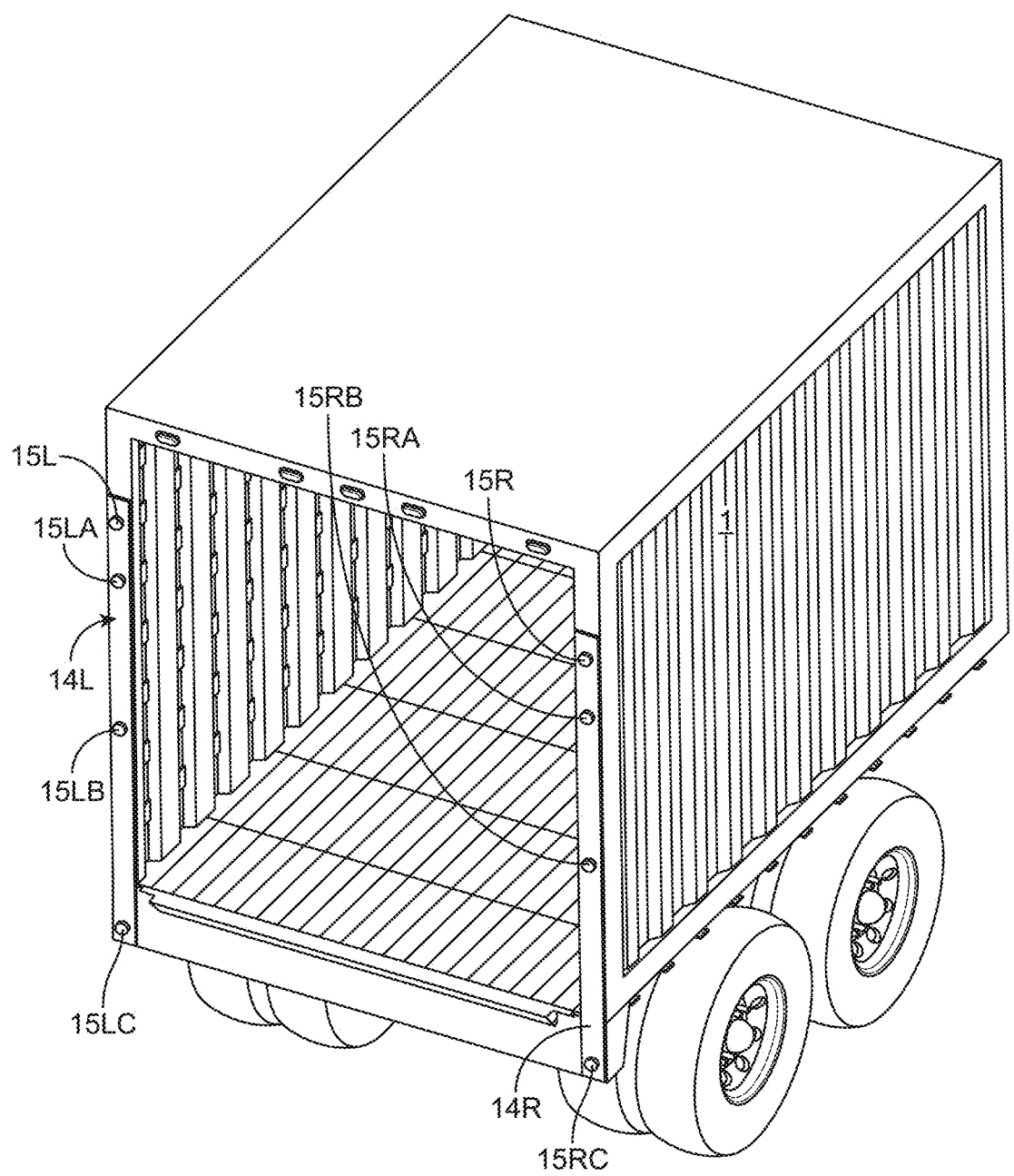
FIG. 5 shows a mounting system including a left mounting member and a right mounting member, according to one embodiment.

As shown in FIG. 5, in one embodiment, a mounting system according to an embodiment of the invention includes a left mounting member 14L and a right mounting member 14R. The mounting members 14L and 14R are for attachment onto left and right perimeters, respectively, of an opening in the vehicle body 1, such as by welding to the vehicle body.

In one example, each of the mounting members 14L, 14R comprises an elongate and essentially planar member (mounting plate). Each of the mounting members 14L, 14R can be attached to the vehicle body, such as by welding, for mounting the lift gate 10 thereon.

As shown in FIG. 5, in one embodiment, the mounting member 14L includes at least one support protrusion 15L, and the mounting member 14R includes at least one support protrusion 15R. The protrusions 15L and 15R comprise structures configured for supporting (e.g., hanging) the lift gate 10 on the mounting members 14L and 14R, respectively. The protrusions 15L and 14R can be of different configurations, examples of which are described herein.

As shown in FIG. 13, the right support column 12R is hollow and generally elongate with a rectangular cross section. Actuators for moving the platform 11 are disposed within the support column 12R. In one embodiment the support column 12R and includes an opening 16R on a front wall thereof.

Similarly, the left support column 12L is hollow and generally elongate with a rectangular cross section and includes an opening 16L on a front wall thereof. Actuators for moving the platform 11 are disposed within the support column 12L.

The openings 16L, 16R correspond to the protrusions 15L, 15R, respectively, for mounting the lift gate 10 (via the left and right support columns 12L, 12R) on the vehicle opening (via the left and right mounting members 14L, 14R).

Figure 2:
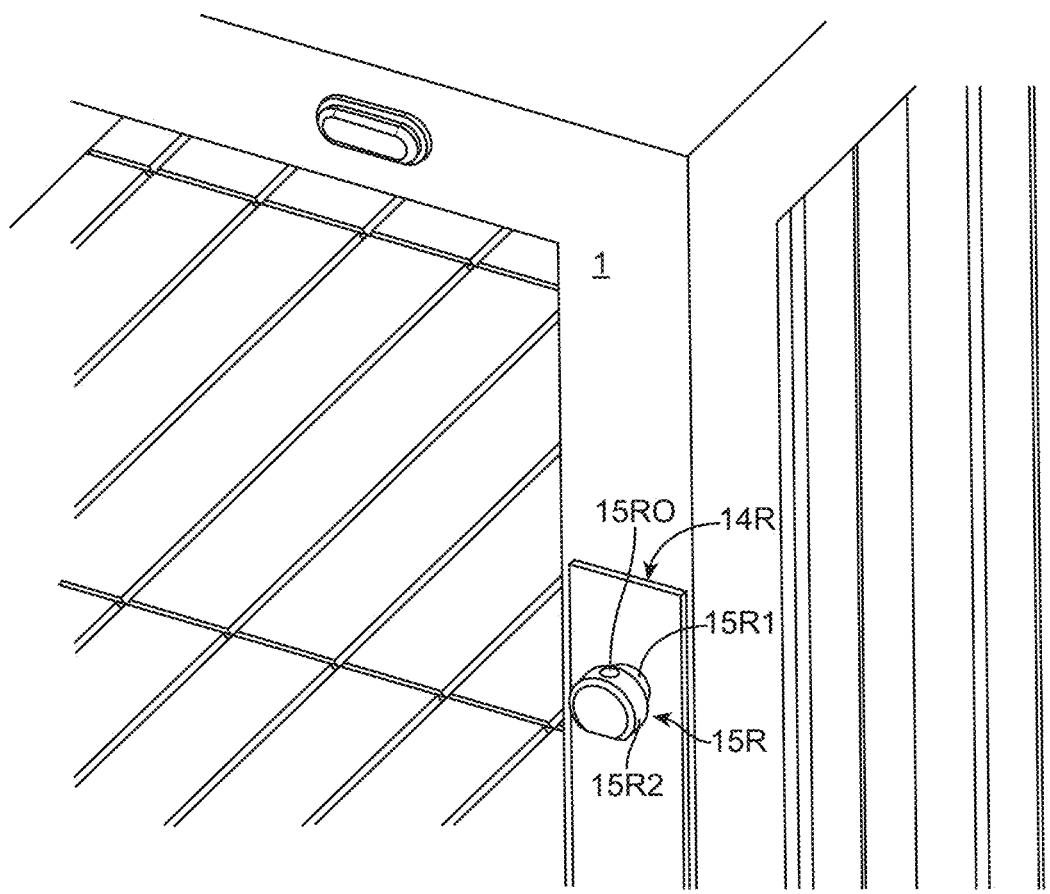
FIG. 2 shows a perspective view of one example configuration of a mounting member including a support protrusion mounted on an example vehicle, according to one embodiment.

One example configuration of the protrusion 15R is shown in perspective view in FIG. 2. In this example, the protrusion 15R is essentially cylindrical having a first cylindrical portion 15R1 and a second essentially cylindrical portion 15R2. The portion 15R2 is larger in diameter than the portion 15R1.

Figure 3A:
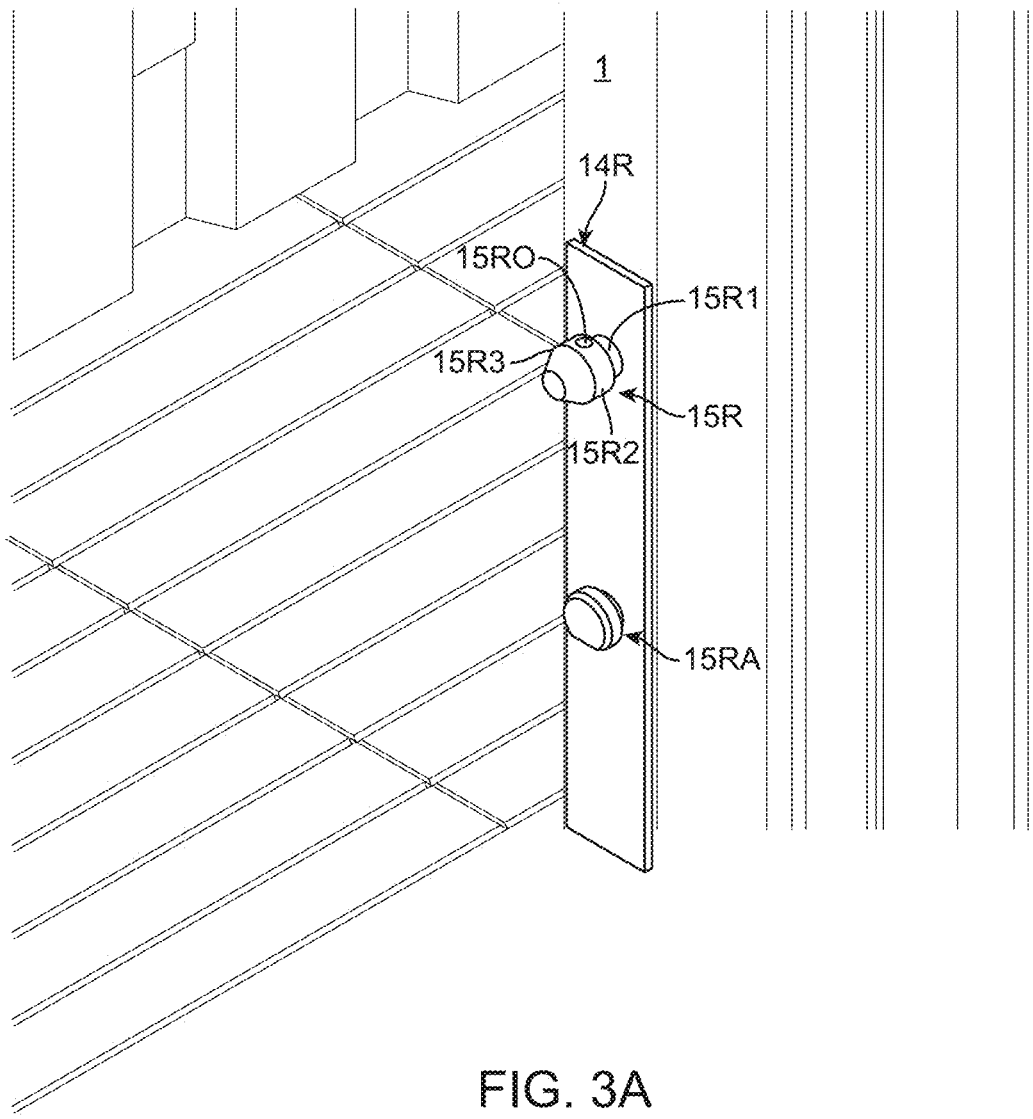
FIG. 3A shows a more detailed perspective view of a right side mounting member including a support protrusion, mounted on the vehicle, according to one embodiment.

Another example configuration of the protrusion 15R is shown in perspective view in FIG. 3A. In this example, the protrusion 15R is essentially conical having a first cylindrical portion 15R1, a second essentially cylindrical portion 15R2, and an essentially conical portion 15R3. The portion 15R2 is larger in diameter than the portion 15R1. The conical portion 15R3 can function as a guide for the corresponding opening 16R of said support column 12R as the lift gate 10 is moved towards the mounting member 14R for mounting onto the vehicle body 1.

Figure 3B:
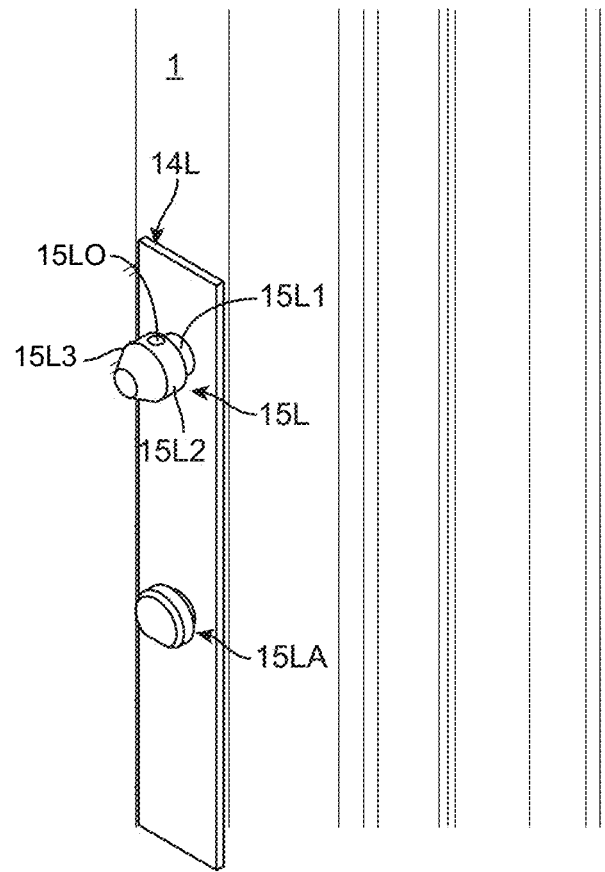
FIG. 3B shows a more detailed perspective view of a left side mounting member including a support protrusion, mounted on the vehicle, according to one embodiment.

An example configuration of the protrusion 15L is shown in perspective view in FIG. 3B. Similarly, the protrusion 15L is essentially conical having a first cylindrical portion 15L1, a second essentially cylindrical portion 15L2 and an essentially conical portion 15L3. The portion 15L2 is larger in diameter than the portion 15L1. The conical portion 15L3 can function as a guide for the corresponding opening 16L of said support column 12L as the lift gate 10 is moved towards the mounting member 14L for mounting on the vehicle 1.

In one embodiment the protrusions 15L, 15R and the corresponding openings 16L, 16R are sized and shaped to interrelate and engage. To mount the lift gate 10 on the vehicle body, in one example, the mounting members 14L, 14R are attached to the perimeter of an opening at the back of the vehicle 1.

Figure 4:
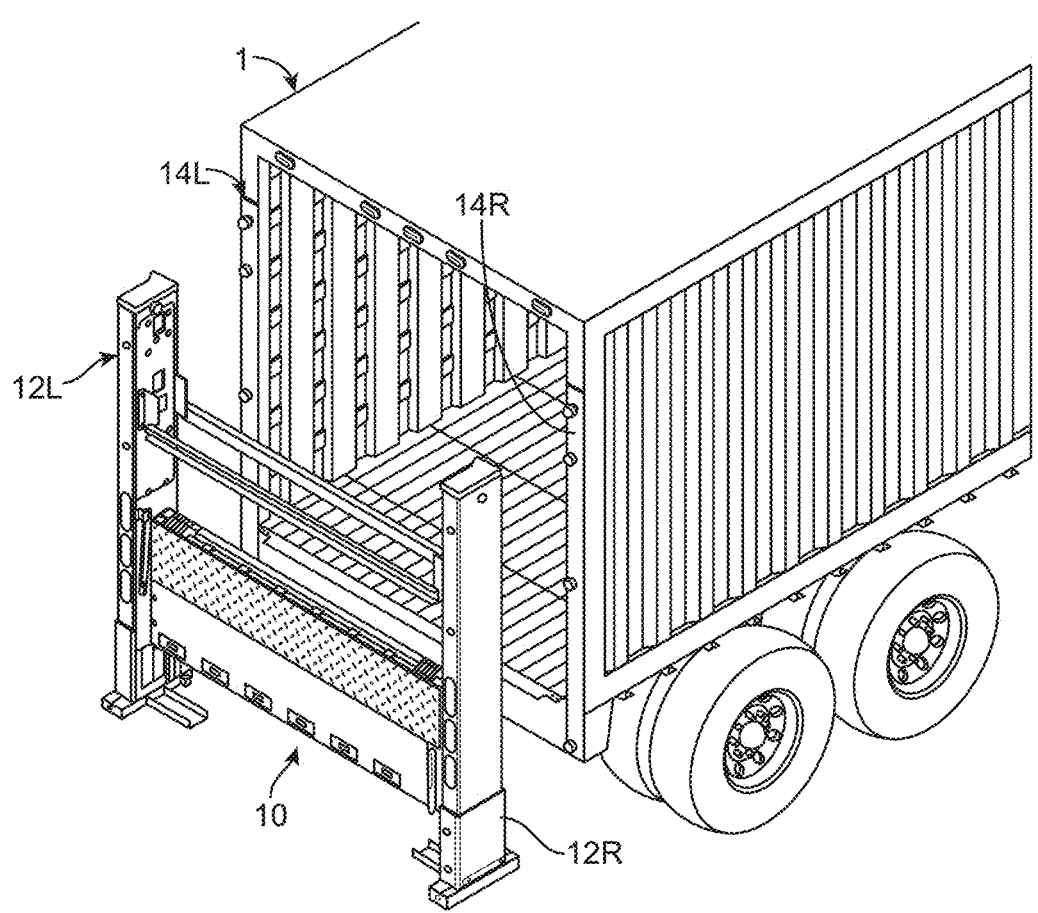
FIG. 4 shows a lift gate centered on the back of the vehicle, according to one embodiment.
Figure 6:
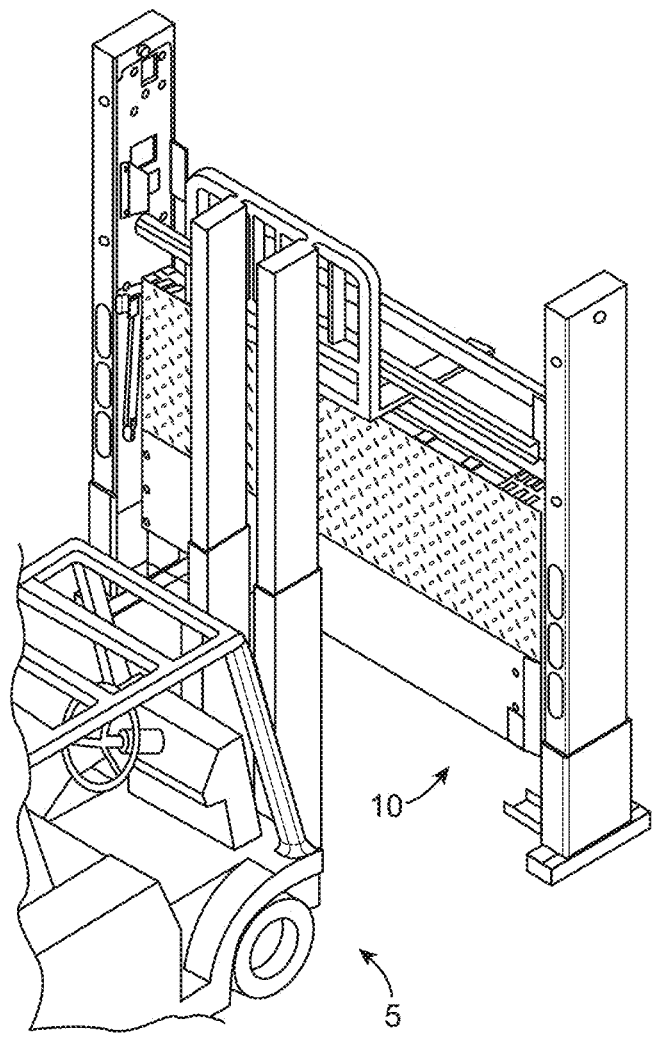
FIG. 6 shows a forklift centering a lift gate onto the back of the vehicle (not shown), according to one embodiment.

The lift gate 10 is centered on the back of the vehicle 1 as shown in FIG. 4 via a forklift 5 (FIG. 6) or overhead hoist, wherein openings 16L, 16R on the lift gate columns 12L, 12R line up with the respective protrusions 15L, 15R of the mounting members 14L, 14R on the vehicle 1.

Figure 7:
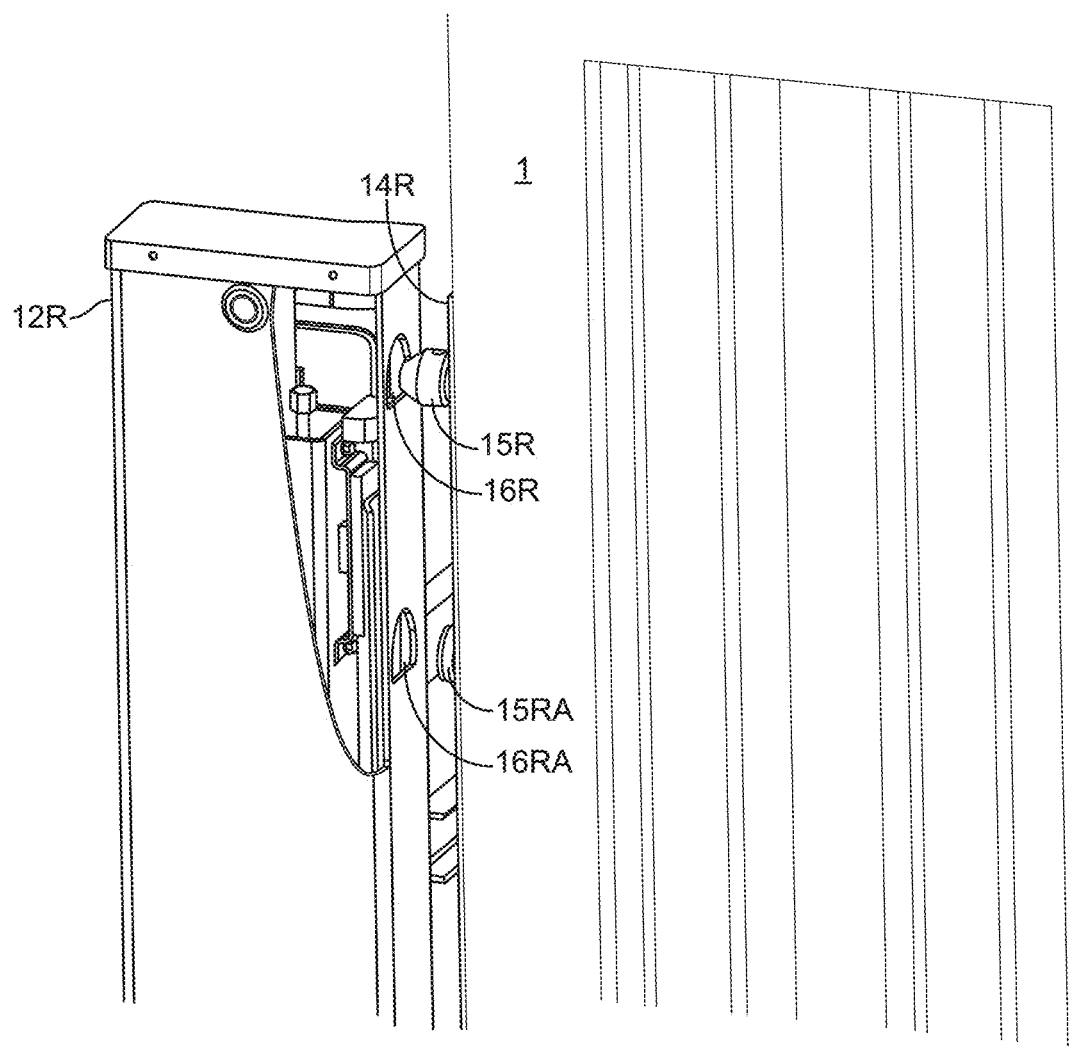
FIG. 7 shows a right side perspective view of the openings of a lift gate column aligned with the corresponding mounting member pre-mounted on the vehicle, according to one embodiment.
Figure 8:
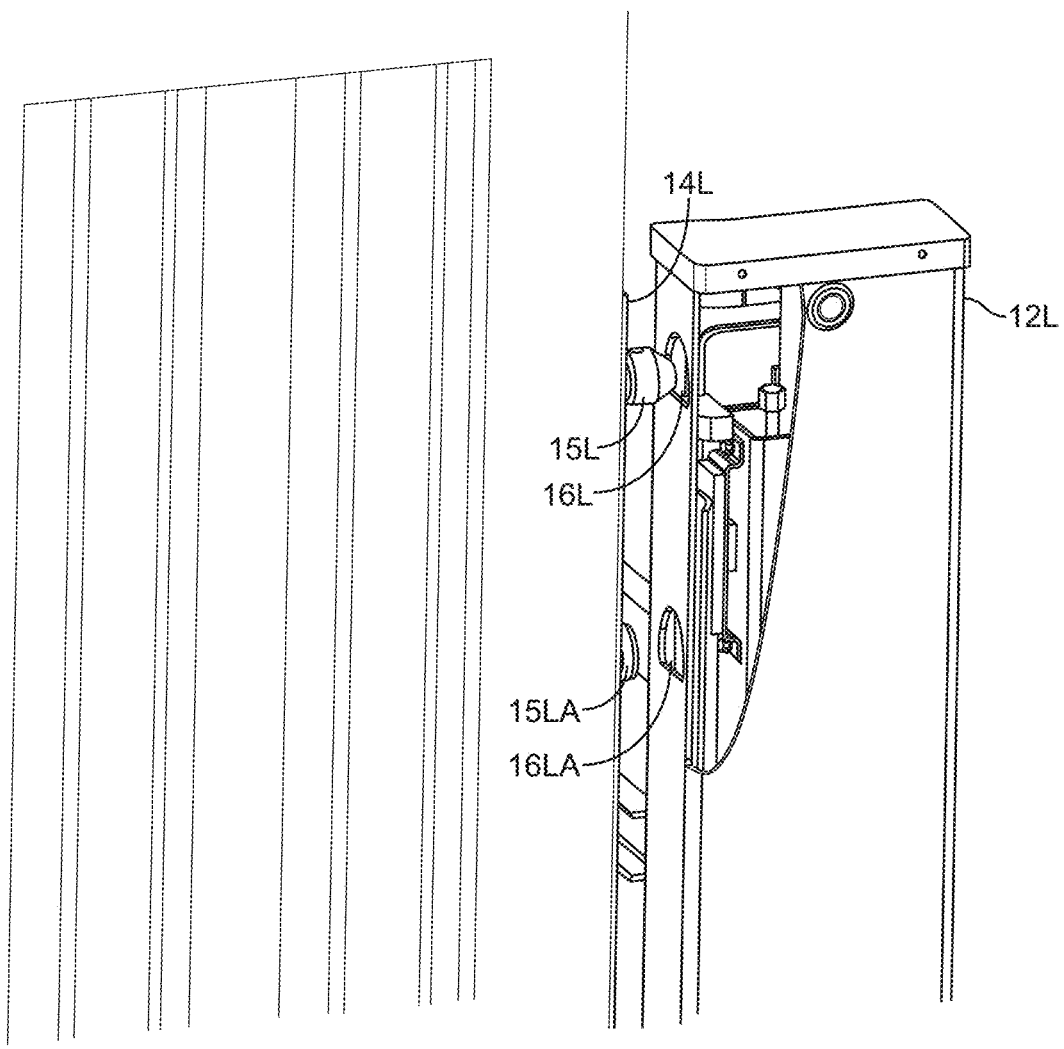
FIG. 8 shows a left side perspective view of the openings of a lift gate column aligned with the corresponding mounting member pre-mounted on the vehicle, according to one embodiment.
Figure 9:
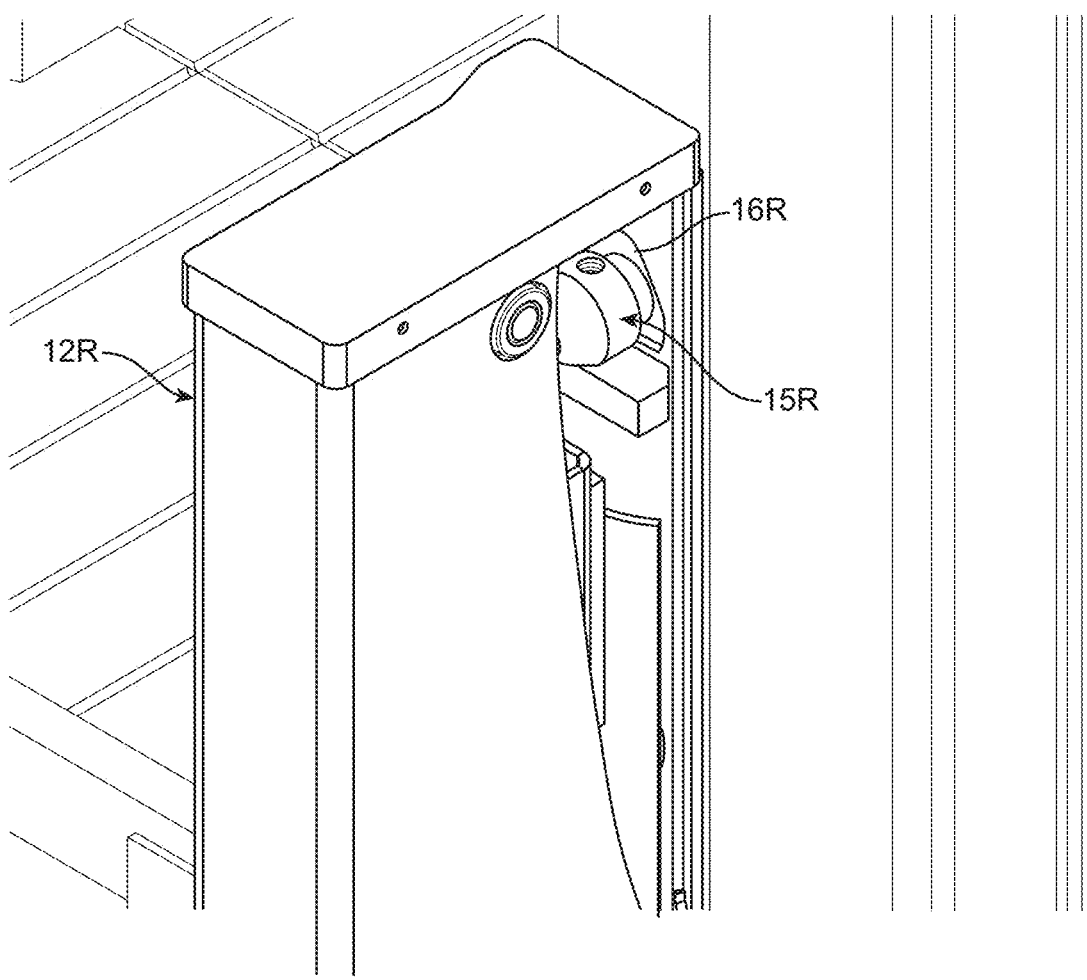
FIG. 9 shows a perspective view of the column openings in FIG. 8 receiving the protrusions of the corresponding mounting member such that the lift gate essentially hangs from the protrusions on the mounting member via the openings, according to one embodiment.
Figure 10:
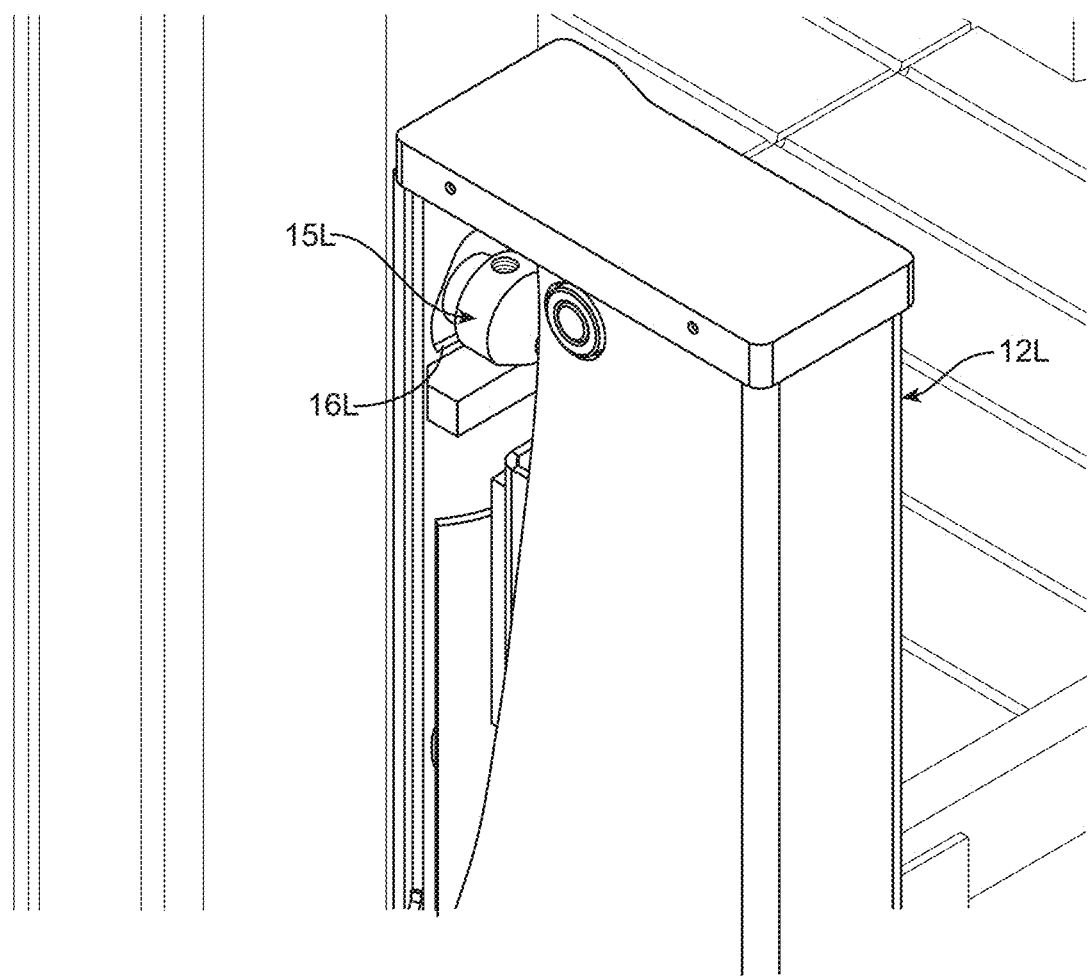
FIG. 10 shows a perspective view of the column openings in FIG. 7 receiving the protrusions of the corresponding mounting member such that the lift gate essentially hangs from the protrusions on the mounting member via the openings, according to one embodiment.
Figure 11:
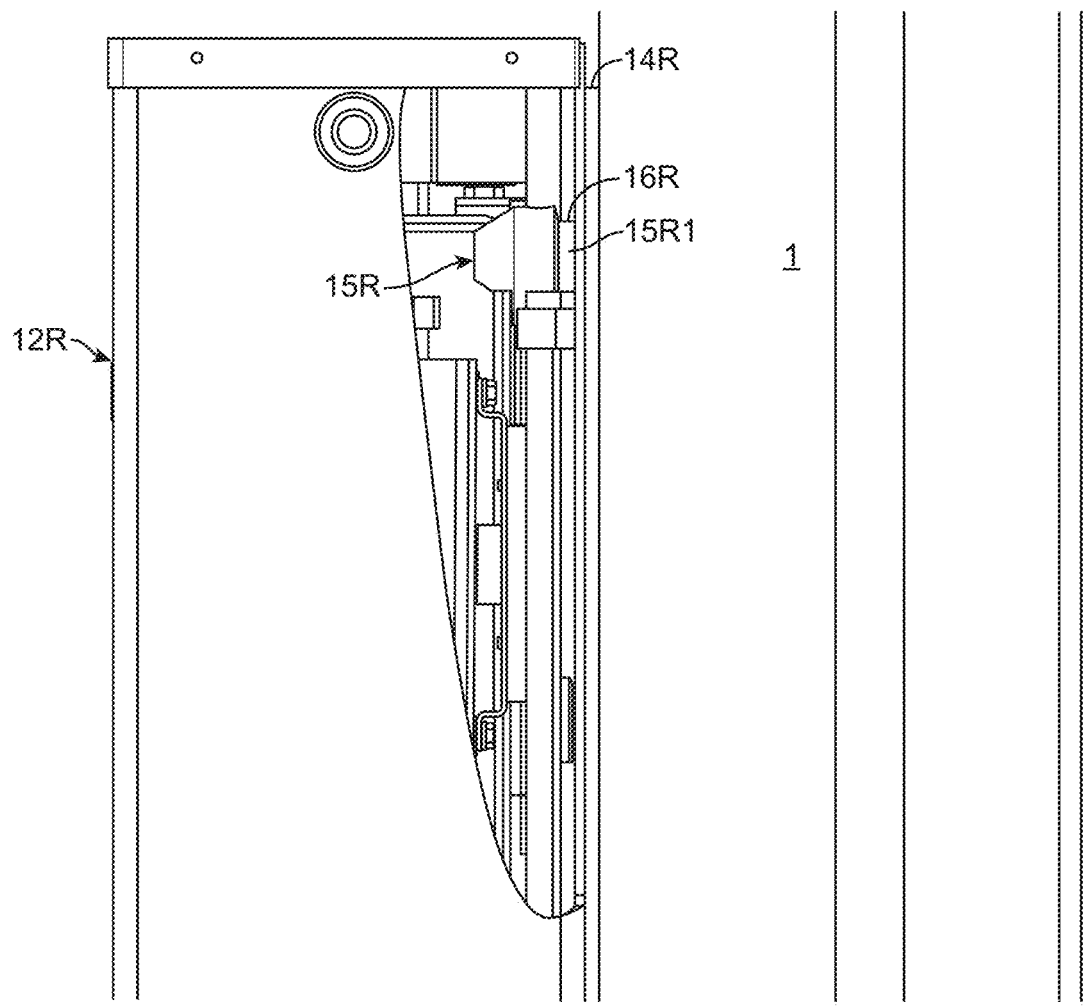
FIG. 11 shows a right side view corresponding to FIG. 9, according to one embodiment.
Figure 12:
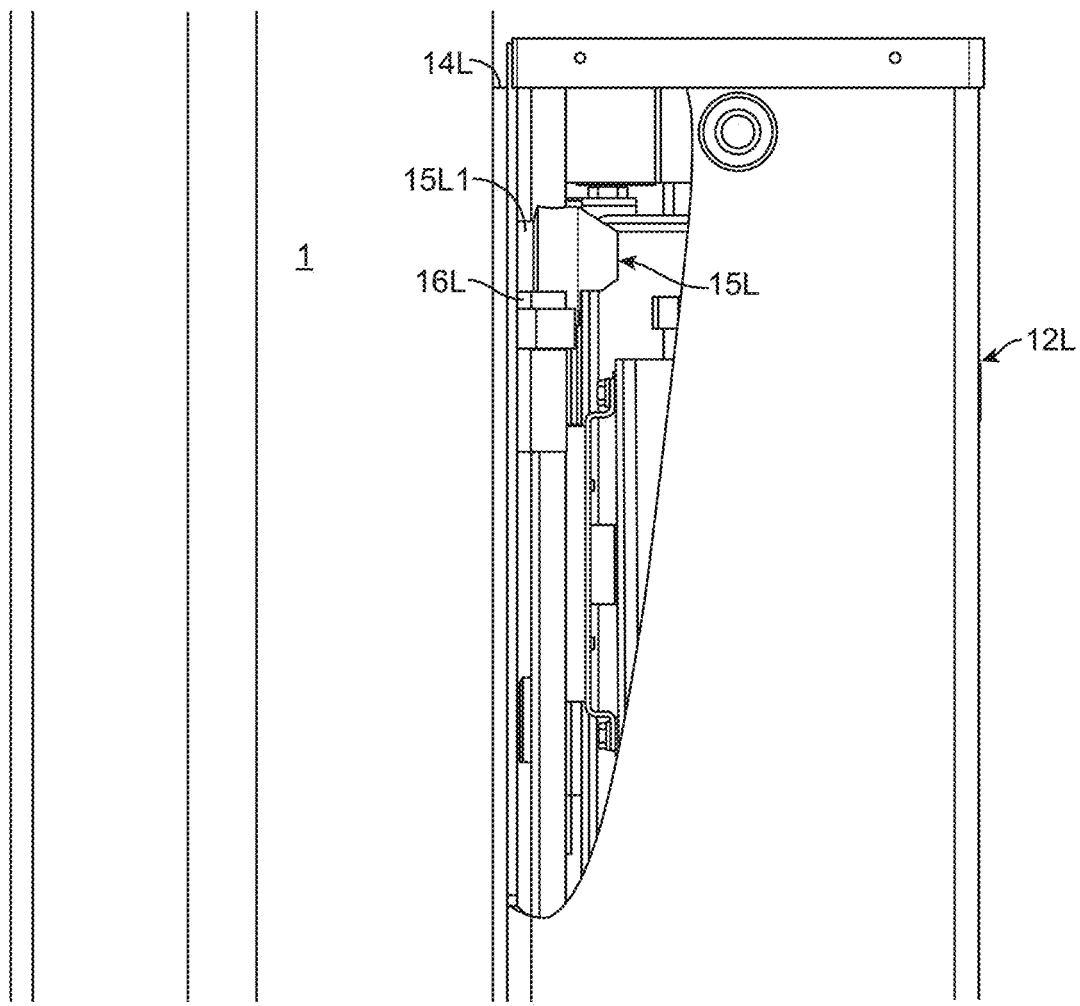
FIG. 12 shows a left side view corresponding to FIG. 10, according to one embodiment.

Specifically, as shown in FIGS. 7-8, the openings 16L, 16R of the lift gate columns 12L, 12R are aligned with the mounting members 14L, 14R pre-mounted on the vehicle, wherein the openings 16L, 16R receive the protrusions 15L, 15R as shown in perspective views in FIGS. 9-10, such that the lift gate 10 essentially hangs from the protrusions 15L, 15R on the mounting members via the openings 16L, 16R. FIGS. 11 and 12 show side views corresponding to FIGS. 9 and 10, respectively.

Figure 14:
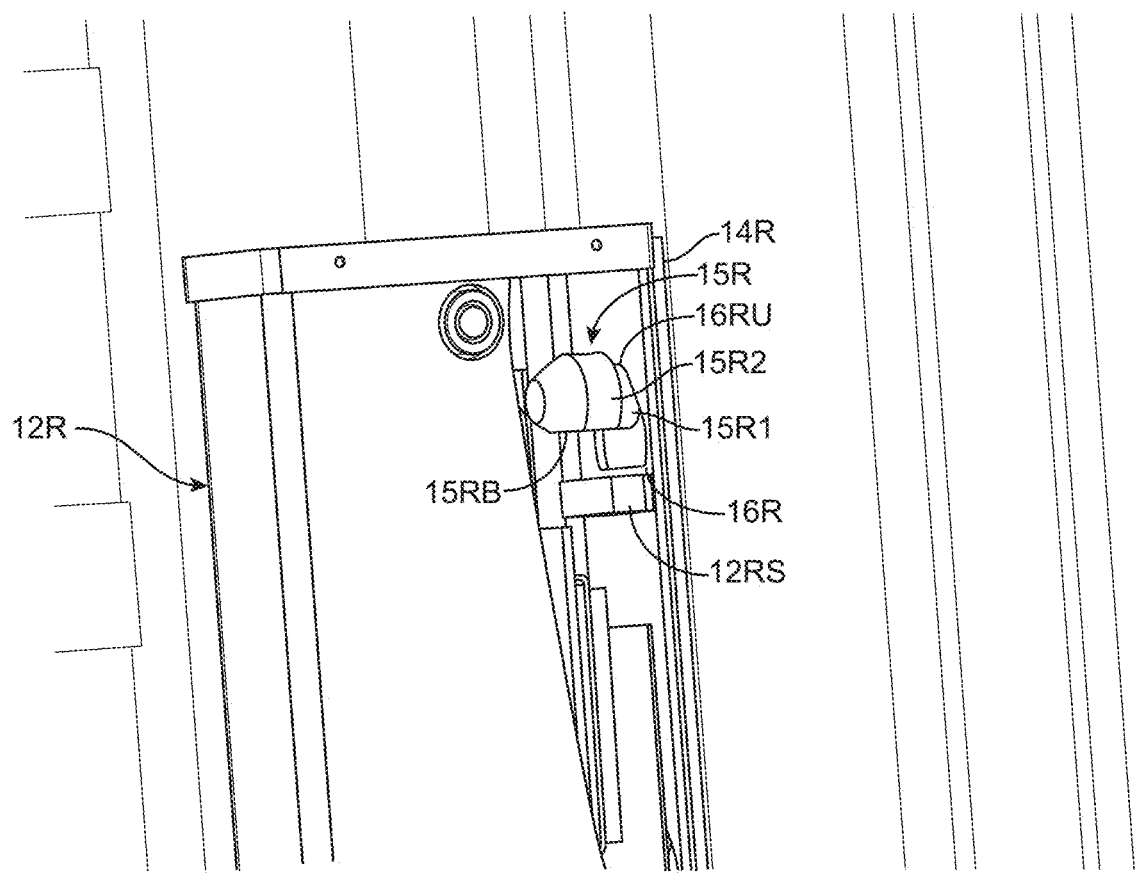
FIG. 14 shows a partially cut view of a support column in FIG. 9 receiving the protrusions of corresponding mounting member, according to one embodiment.

In one embodiment as shown in FIG. 14, once the corresponding opening 16R of the support column 12R receives the protrusion 15R, the lift gate 10 is released by the fork lift 5, wherein the support column 12R essentially hangs by its weight from the portion 15R1 of the protrusion 15R on the upper periphery 16RU of the opening 16R resting on the portion 15R1. The larger diameter portion 15R2 maintains the support column 12R, hanging from (resting on) the portion 15R1, between the mounting member 14R and the portion 15R2.

Figure 15:
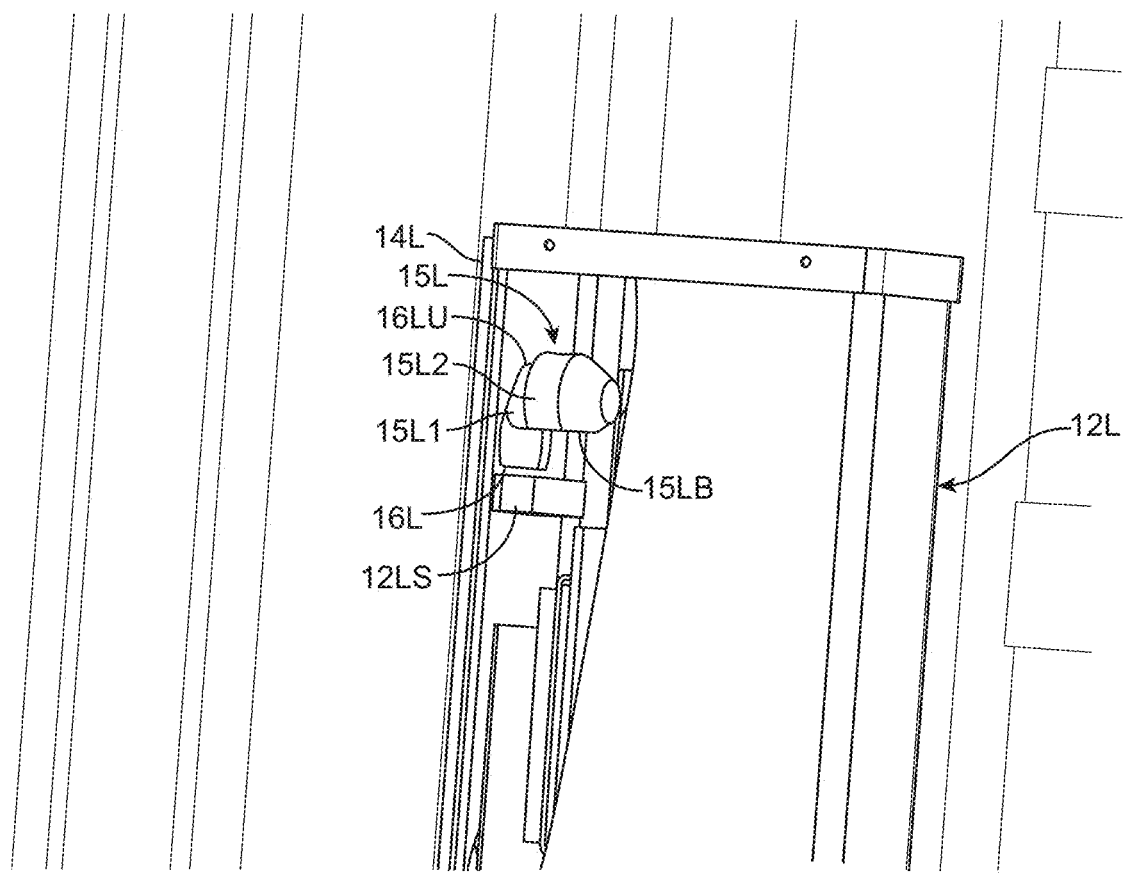
FIG. 15 shows a partially cut view of a support column in FIG. 10 receiving the protrusions of corresponding mounting member, according to one embodiment.

In this example as shown in FIG. 15, the protrusion 15L has a similar configuration to the protrusion 15R, and functions in the same manner in relation to the corresponding opening 16L of the support column 12L. The larger diameter portion 15L2 maintains the support column 12L, hanging from (resting on) the portion 15L1, between the mounting member 14L and the portion 15L2.

Once the corresponding opening 16L of the support column 12L receives the protrusion 15L, the lift gate 10 is released by the fork lift 5, wherein the support column 12L essentially hangs by its weight from the portion 15L1 of the protrusion 15L on the upper periphery 16LU of the opening 16L resting on the portion 15L1.

The larger diameter portion 15L2 maintains the support column 12L, hanging from the portion 15L1, between the mounting member 14L and the portion 15L2.

In one embodiment, the protrusions (hangers) 15R, 15L of vehicle installed mounting members 14R, 14L are weight bearing protrusions which bear the weight of the support columns and the lift platform of a mounted lift gate 10.

In the embodiments described herein, the openings 16R and 16L have a generally triangular shape without rounded vertices, however configuration of the openings 16R and 16L can be different depending on the configuration of the protrusions 15R and 15L. The curvature of the upper peripheries of the openings 16R and 16L are shaped to essentially match the curvature of the protrusion portions 15R1 and 15L1, respectively, for even distribution of the weight of the lift gate (and load) on the protrusion portions 15R1 and 15L1 via the upper peripheries of the openings 16R and 16L.

In one embodiment, a bottom section 15RB of the protrusion portion 15R2 is flat, as shown in FIG. 14. In one embodiment, a bottom section 15LB of the protrusion portion 15L2 is flat, as shown in FIG. 15.

Each mounting member (or mounting bracket) may include additional protrusions spaced from one another. For example, the mounting member 14R may further include additional protrusions 15RA, 15RB, and 15RC (FIG. 5). The support column 12R has additional openings 16RA, 16RB, and 16RC (FIG. 13) for receiving the corresponding protrusions 15RA, 15RB and 15RC (FIG. 5), respectively.

Said additional protrusions 15RA, 15RB, and 15RC may be similar to protrusion 15R in configuration. Said additional openings 16RA, 16RB and 16RC may be similar to the opening 16R in configuration. The additional protrusions may comprise weight bearing structures as in protrusion 15R.

Similarly, the mounting member 14L may further include protrusions 15LA, 15LB, and 15LC. The support column 12L has openings 16LA, 16LB and 16LC for receiving the corresponding protrusions 15LA, 15LB and 15LC, respectively.

In one embodiment, the mounting system further includes a securing mechanism for each support column to secure that support column to the corresponding mounting member on the vehicle 1. Referring to FIGS. 18-25, in a first implementation of said securing mechanism comprises a securing device 17R for the mounting member 14R to further secure the support column 12R to the mounting member 14R on the vehicle 1. The securing device 17R comprises a wedge member 17RW and a corresponding threaded bolt 17RB and threaded nut 17RN.

The wedge member 17RW is essentially L-shaped in profile, having a top portion 17RT and a transverse wedge-shaped portion 17RP. The top portion 17RT includes an opening 17RO therethrough for freely receiving the bolt 17RB. Further, as shown in FIG. 2, the protrusion 15R includes an opening 15RO through the portion 15R2 for receiving the bolt 17RB.

Figure 20:
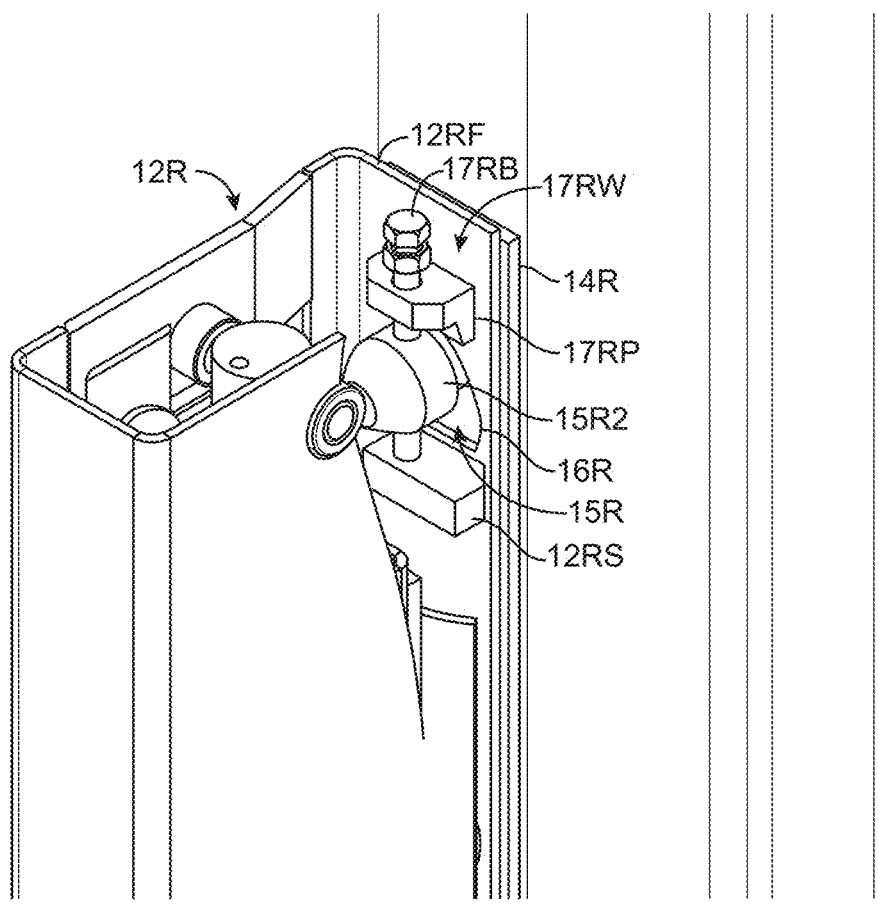
FIG. 20 shows a perspective view of an assembled securing mechanism comprising a securing device for a right side mounting member to secure the support column to the corresponding mounting member on the vehicle, according to one embodiment.

After the support column 12R is mounted (via the opening 16R) on the protrusion 15R of the mounting member 14R, as shown in FIG. 20, the wedge-shaped portion 17RP of the wedge member 17RW is placed within the support column 12R. Specifically, the wedge member 17RW is positioned between the larger diameter portion 15R2 of the protrusion 15R and the inner side of the front wall 12RF of the support column 12R.

The nut 17RN is threaded onto the bolt 17RB towards the head of the bolt 17RB, and then the bolt 17RB is inserted through the opening 17RO of the wedge member 17RW. The opening 17RO of the wedge member 17RW is not threaded and allows the bolt 17RB to freely insert therethrough.

However, the inner wall of the opening 15RO is threaded such that bolt 17RB must be threaded therethrough. The bolt 17RB is threaded through the opening 15RO of the protrusion 15R, until the tip of the bolt 17RB comes into contact with a fixed stop block 12RS on the inner face of the front wall 12RF of the support column 12R.

The stop block 12RS is positioned proximate to a lower periphery of the opening 16R. Specifically, as the bolt 17RB is threaded through the opening 15RO, the tip of the bolt 17RB moves towards the stop block 12RS and is eventually urged against the stop block 12RS.

This in turn causes the portion 15R1 of the protrusion 15R to be urged against the upper periphery of the opening 16R. This prevents motion of the support column 12R relative to the mounting member 14R in the vertical direction (i.e., up/down the mounting member 14R).

Figure 22:
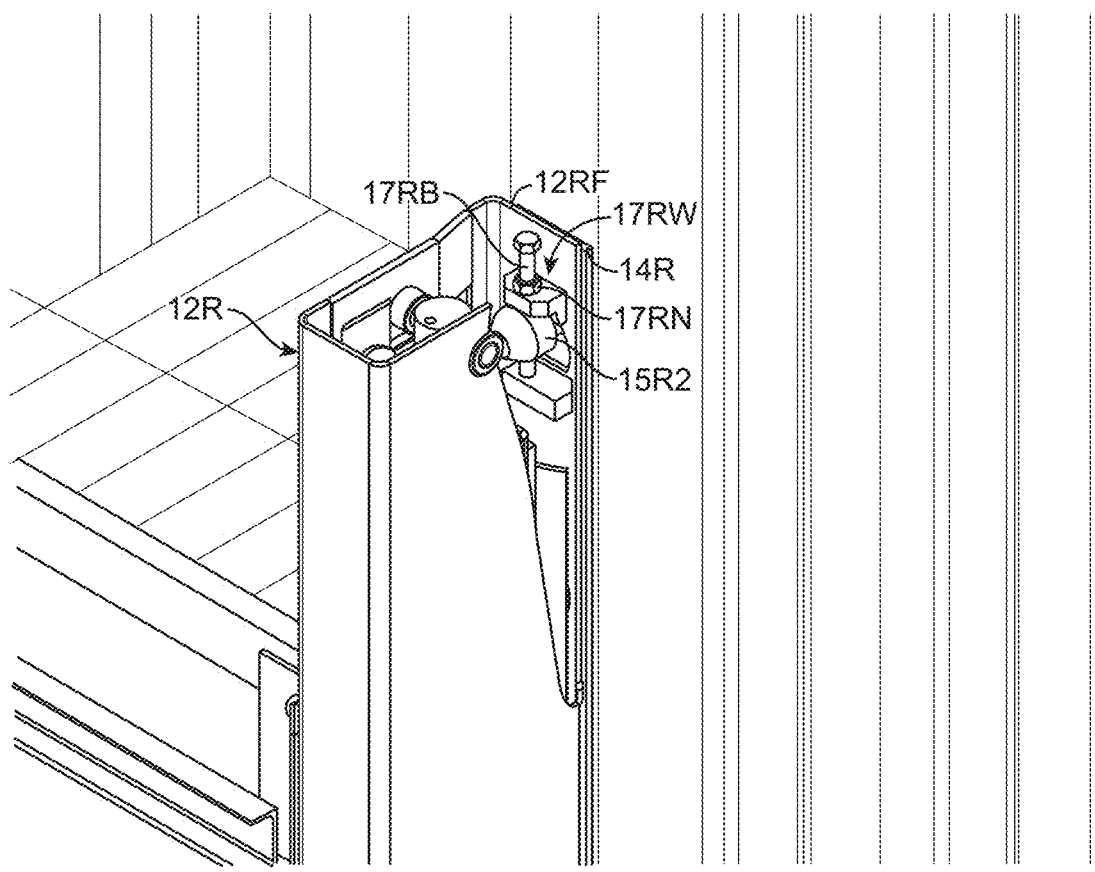
FIG. 22 shows another perspective view of an assembled securing mechanism comprising a securing device for a right side mounting member to secure the corresponding support column to the mounting member on the vehicle, according to one embodiment.

In order to secure the support column 12R to the mounting member 14R in the horizontal direction (i.e., towards/away from the mounting member 14R), the nut 17RN is threaded down the bolt 17RB towards the wedge member 17RW to urge the wedge-shaped portion 17RP between (and against) the portion 15R2 of the protrusion 15R and the support column wall 12RF, as shown in FIG. 22.

Figure 24:
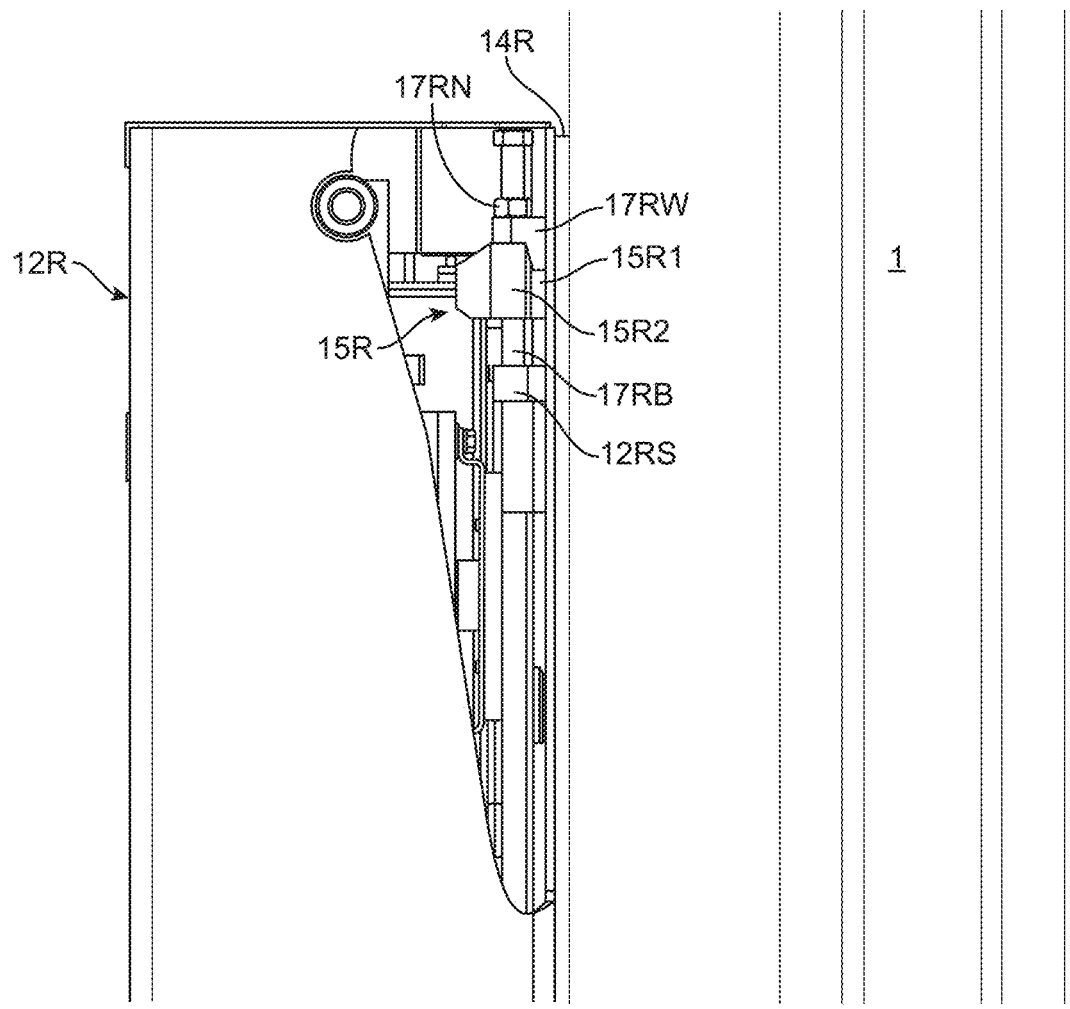
FIG. 24 shows a side view of a right side securing mechanism comprising a securing device for a mounting member to secure the corresponding support column to the mounting member on the vehicle, according to one embodiment.

In effect, the wedge-shaped portion 17RP essentially fills a gap between the protrusion portion 15R2 and the support column wall 12RF, causing the wall 12RF to be urged against the mounting member 14R, thereby preventing horizontal (i.e., towards/away from the mounting member 14R) motion of the upper periphery of the opening 15R of the column 12R on the protrusion portion 15R1 of the mounting member 14R. FIG. 24 shows a side view corresponding to FIG. 22.

The left side support column 12L, mounting member 14L and protrusion 15L are similar to the right side support column 12R, mounting member 14R and protrusion 15R, described above and as shown in FIG. 19. The left side also includes a securing device similar to the securing device 17R of the right side.

Figure 19:
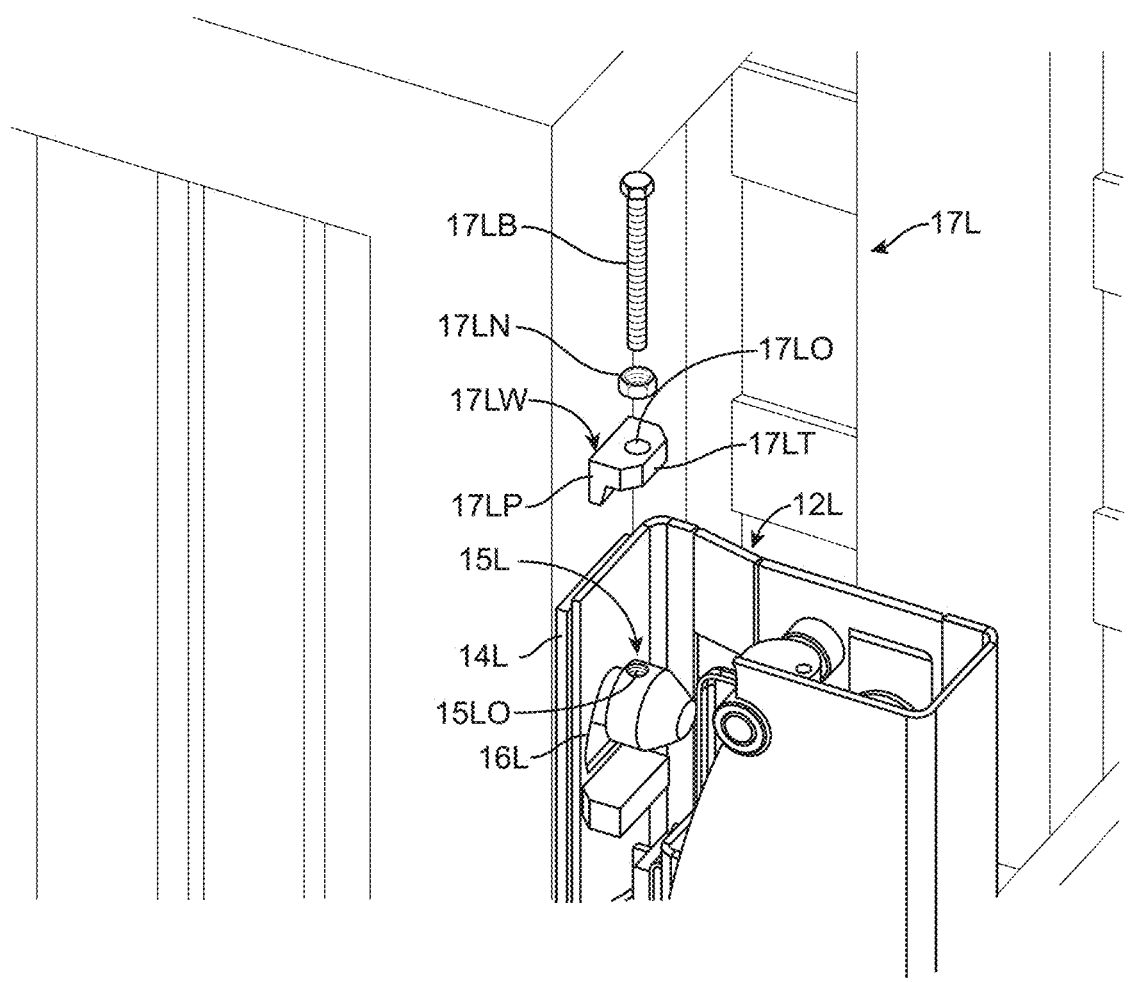
FIG. 19 shows another exploded perspective view of a securing mechanism comprising a securing device for a mounting member to secure the support column to the corresponding mounting member on the vehicle, according to one embodiment.

In one embodiment as shown in FIG. 19, similarly for securing the support column 12L to the mounting member 14R on the vehicle, the mounting system further includes a securing device 17L for the mounting member 14L, wherein the device 17L comprises a wedge member 17LW and corresponding threaded bolt 17LB and threaded nut 17LN.

The wedge member 17LW is essentially L-shaped in profile, having a top portion 17LT and a transverse wedge-shaped portion 17LP. The top portion 17LT includes an opening 17LO therethrough for receiving the bolt 17LB. Further, the protrusion 15L includes an opening 15LO through the portion 15L2 for receiving the bolt 17LB.

Figure 21:
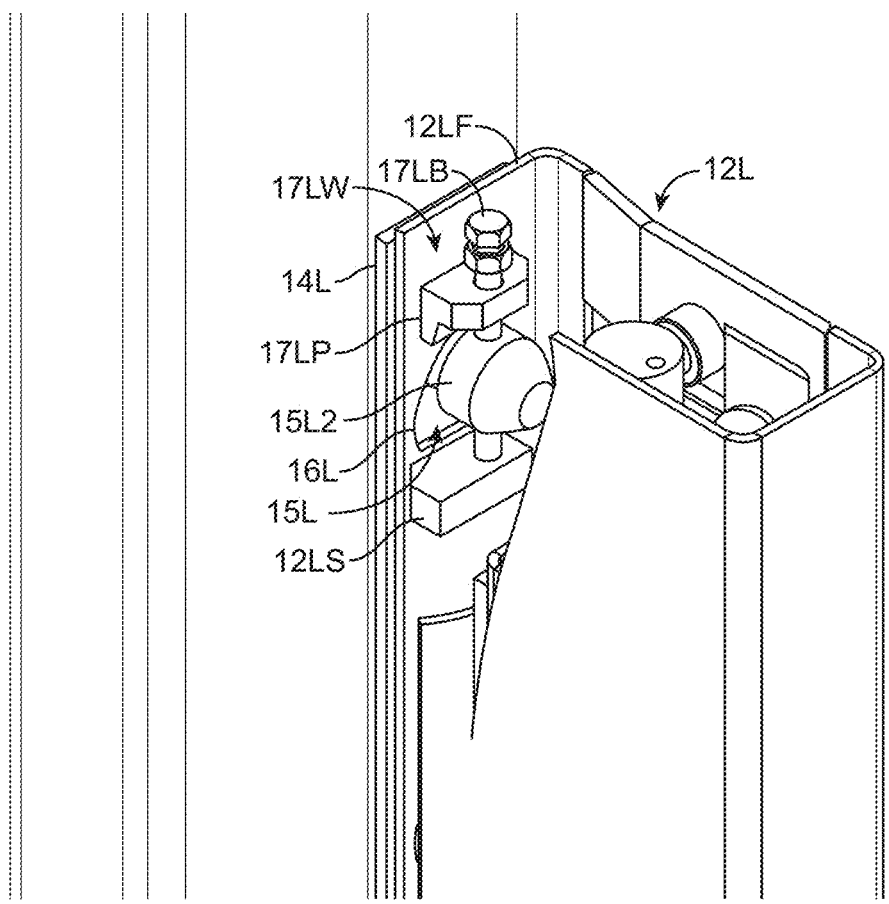
FIG. 21 shows a perspective view of an assembled securing mechanism comprising a securing device for a left side mounting member to secure the corresponding support column to the mounting member on the vehicle, according to one embodiment.

After the support column 12L is mounted (via the opening 16L) on the protrusion 15R of the mounting member 14L, as shown in FIG. 21, the wedge-shaped portion 17LP of the wedge member 17LW is placed within the support column 12L, between the larger diameter portion 15L2 of the protrusion 15L and the inner side of the front wall 12LF of the support column 12L.

The nut 17LN is threaded onto the bolt 17LB to move towards the head of the bolt 17LB, and then the bolt 17LB is inserted through the opening 17LO of the wedge member 17LW. The bolt 17LB is also threaded through the opening 15LO of the protrusion 15L, until it rests against a fixed stop block 12LS on the inner face of the front wall 12LF of the support column 12L.

The stop block 12LS is positioned proximate to a lower periphery of the opening 16L. The opening 17LO of the wedge member 17LW is not threaded and allows the bolt 17LB to freely insert therethrough. However, the inner wall of the opening 15LO is threaded such that bolt 17LB must be threaded therethrough.

As the bolt 17LB is threaded through the opening 15LO, the tip of the bolt 17LB moves towards the stop block 12LS and is eventually urged against the stop block 12LS (FIG. 21), which in turn causes the portion 15L1 of the protrusion 15L to be urged against the upper periphery of the opening 16L. This prevents motion of the support column 12L relative to the mounting member 14L in the vertical direction (i.e., up/down on mounting member 14R).

Figure 23:
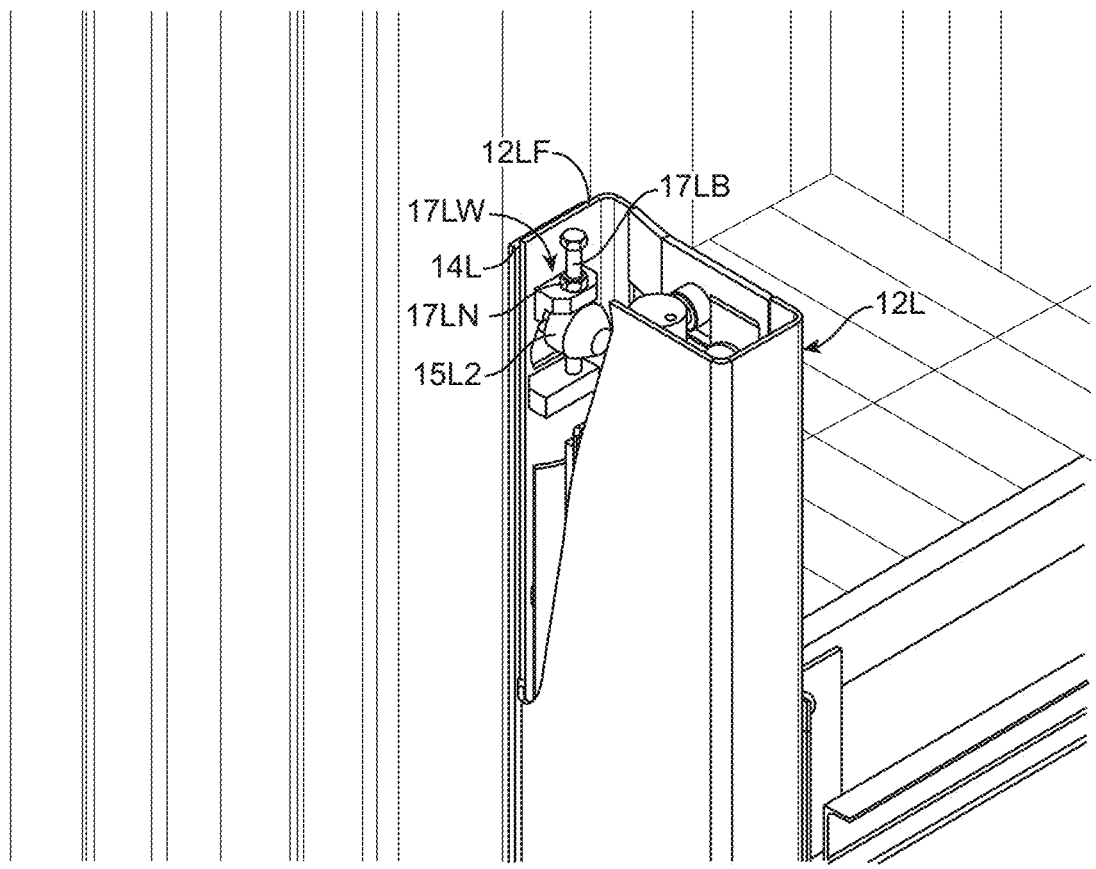
FIG. 23 shows another perspective view of an assembled securing mechanism comprising of a securing device for a right side mounting member to secure the corresponding support column to the mounting member on the vehicle, according to one embodiment.

In order to secure the support column 12L to the mounting member 14L in the horizontal direction (i.e., towards/away from the mounting member 14L), the nut 17LN is threaded down the bolt 17LB towards the wedge member 17LW to urge the wedge-shaped portion 17LP between (and against) the portion 15L2 of the protrusion 15L and the support column wall 12LF, as shown in FIG. 23.

Figure 25:
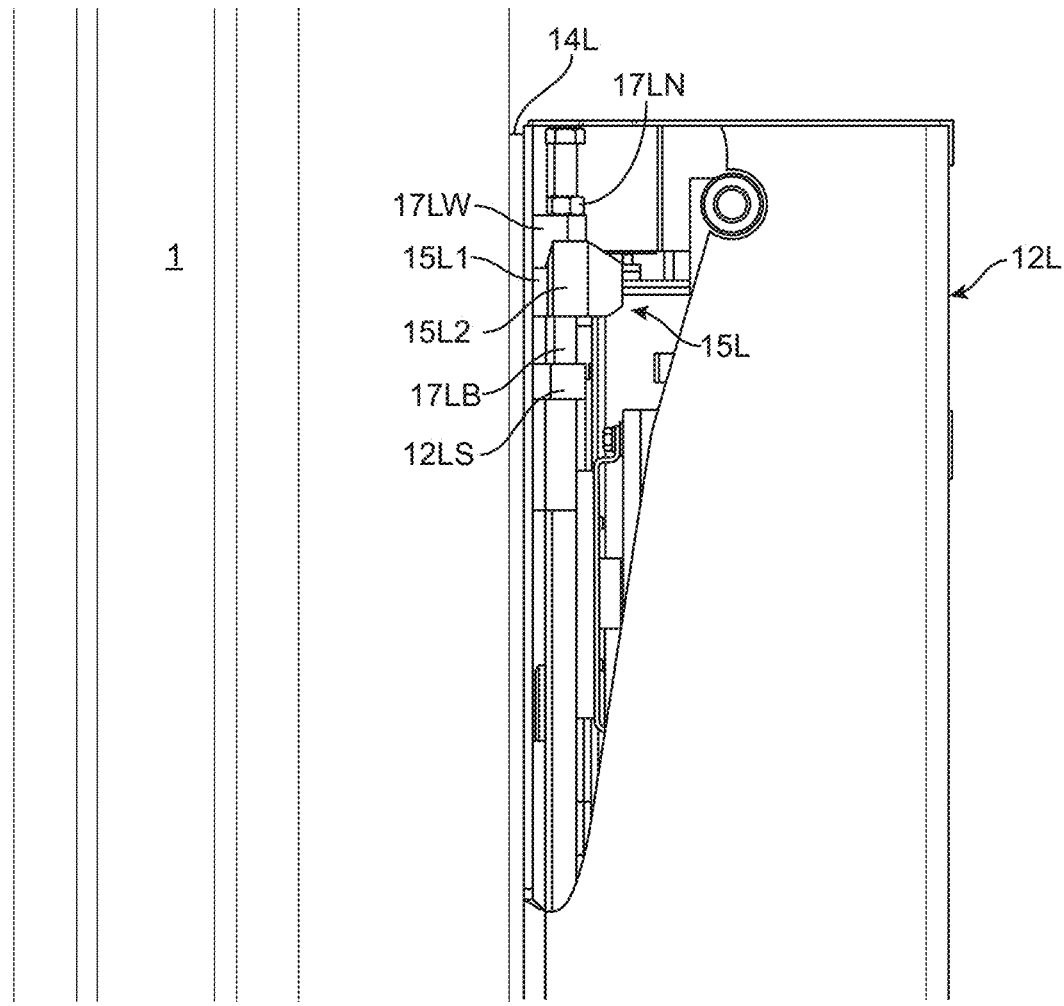
FIG. 25 shows a side view of a left side securing mechanism comprising a securing device for a mounting member to secure the corresponding support column to the mounting member on the vehicle, according to one embodiment.

In effect, the wedge-shaped portion 17LP essentially fills a gap between the protrusion portion 15L2 and the support column wall 12LF, causing the wall 12LF to be urged against the mounting member 14L, thereby preventing horizontal motion (i.e., towards/away from the mounting member 14L) of the upper periphery of the opening 15L of the column 12L on the protrusion portion 15L1 of the mounting member 14L. FIG. 25 shows a side view corresponding to FIG. 23.

Figure 17:
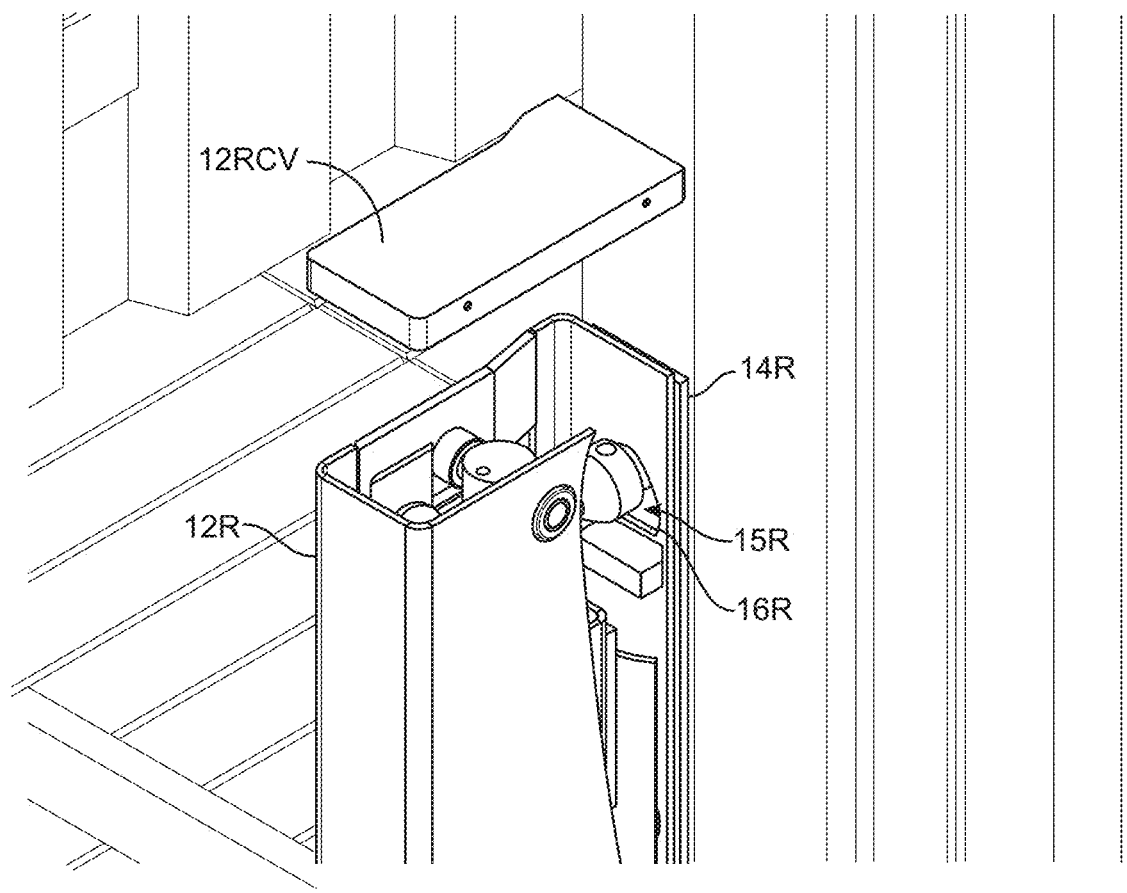
FIG. 17 shows a mounting column cover for a support column, according to one embodiment.
Figure 18:
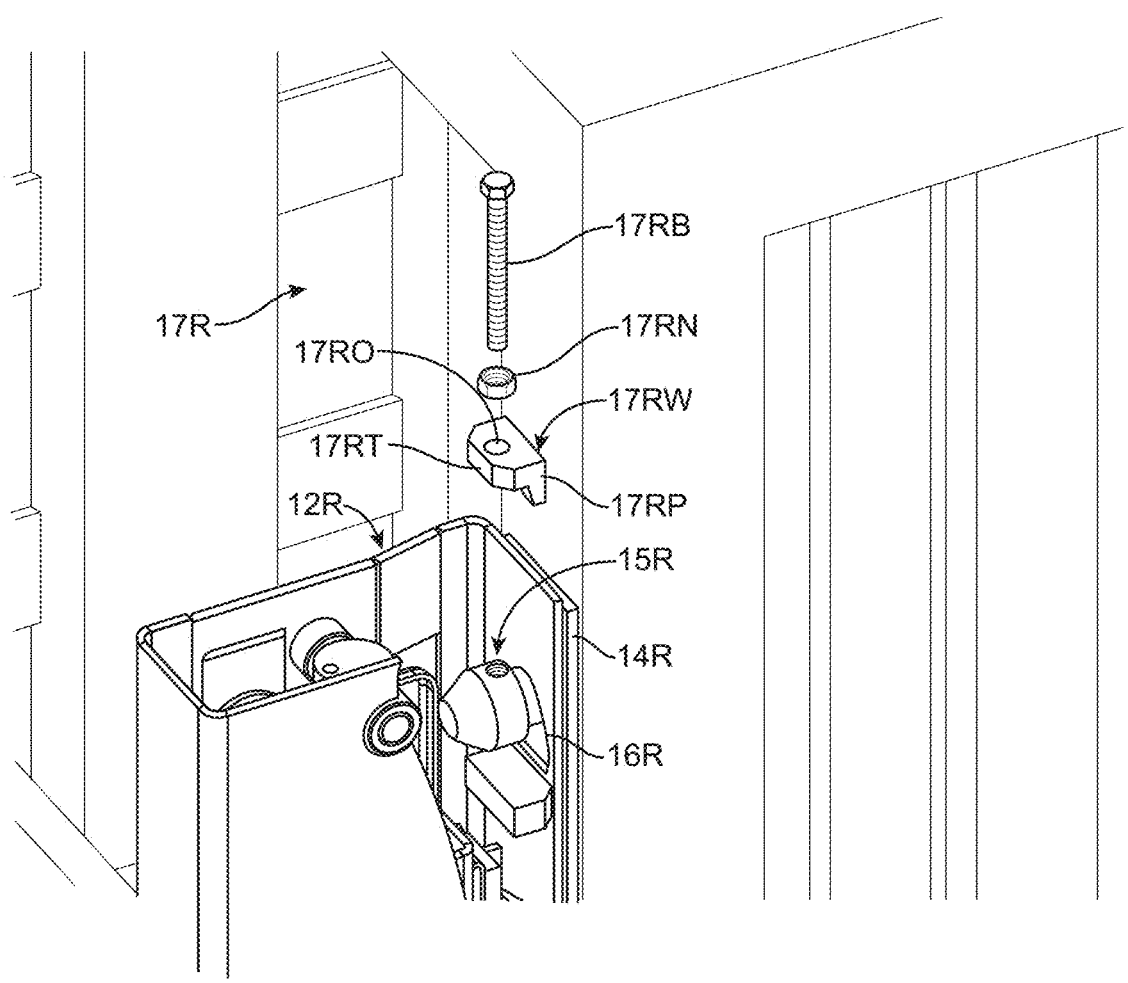
FIG. 18 shows an exploded perspective view of a securing mechanism comprising a securing device for a mounting member to secure the corresponding support column to the mounting member on the vehicle, according to one embodiment.
Figure 26:
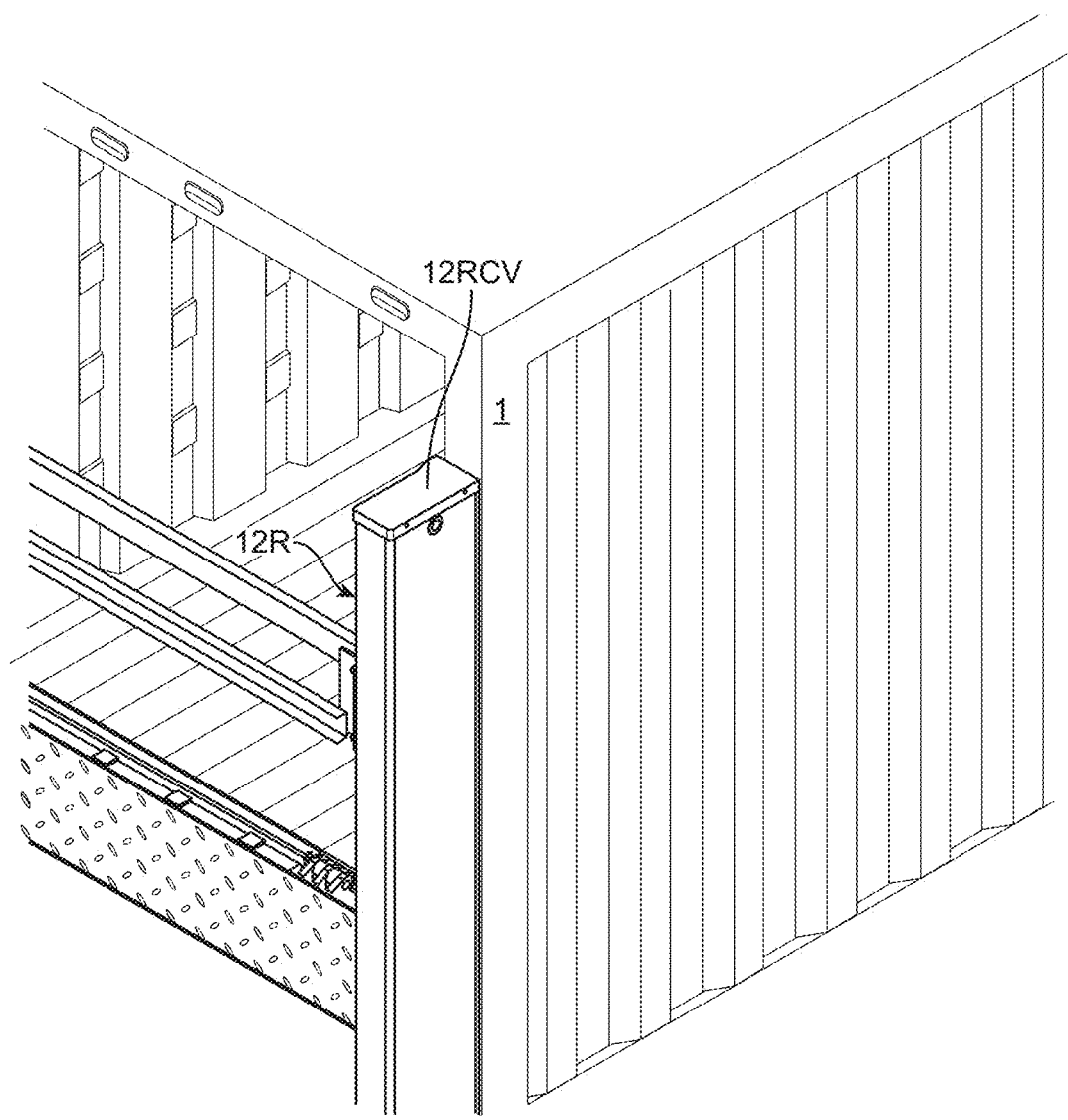
FIG. 26 shows a mounted support column, according to one embodiment.

After mounting the lift gate 10 on the mounting members 14L, 14R, and securing the lift gate 10 using the securing devices 17R, 17L, a cover is placed on top of each support column. FIG. 17 shows a cover 12RCV for the support column 12R. FIG. 26 shows the cover 12RCV placed on the support column 12R. The support column 12L has a similar cover.

Figure 27:
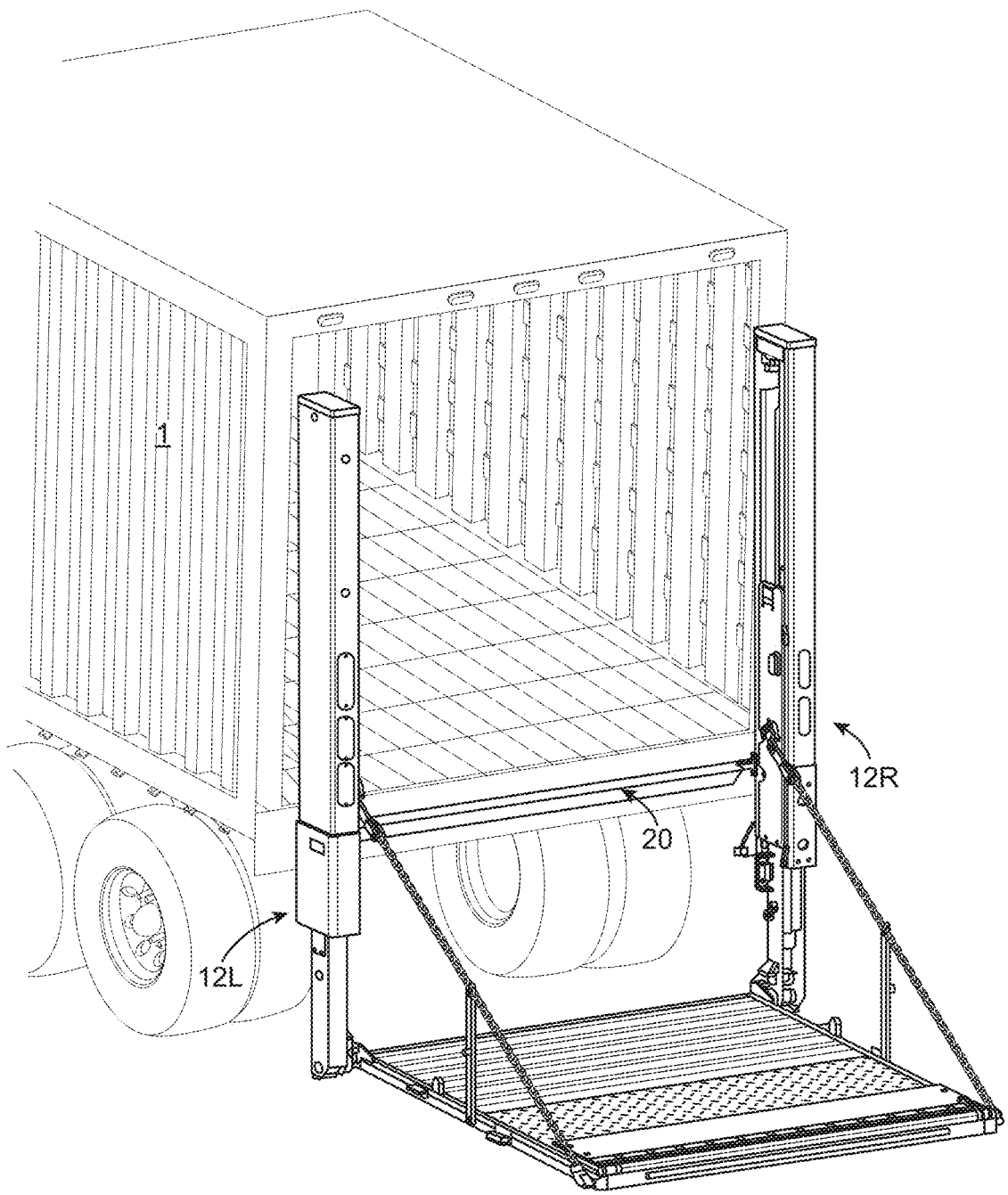
FIG. 27 shows a perspective view of the lift system as mounted on a vehicle opening using a mounting system, according to one embodiment.
Figure 28:
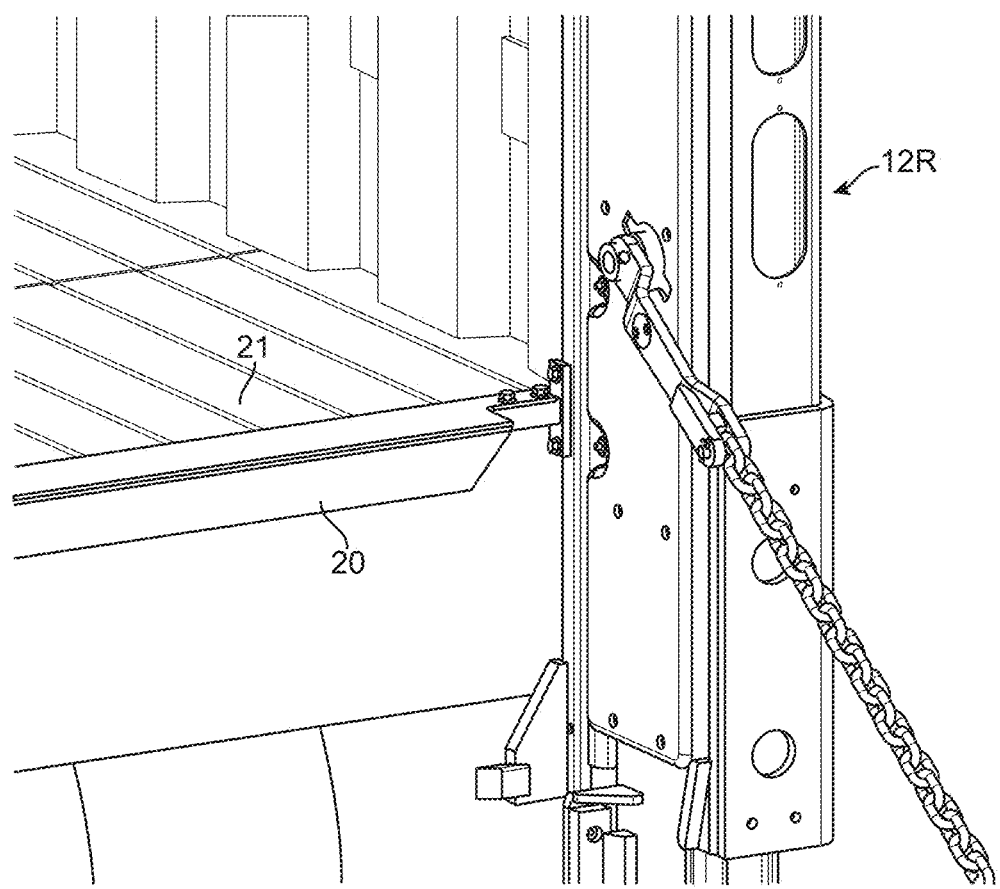
FIG. 28 shows a partial perspective view of the lift system shown in FIG. 27, according to one embodiment.
Figure 29:
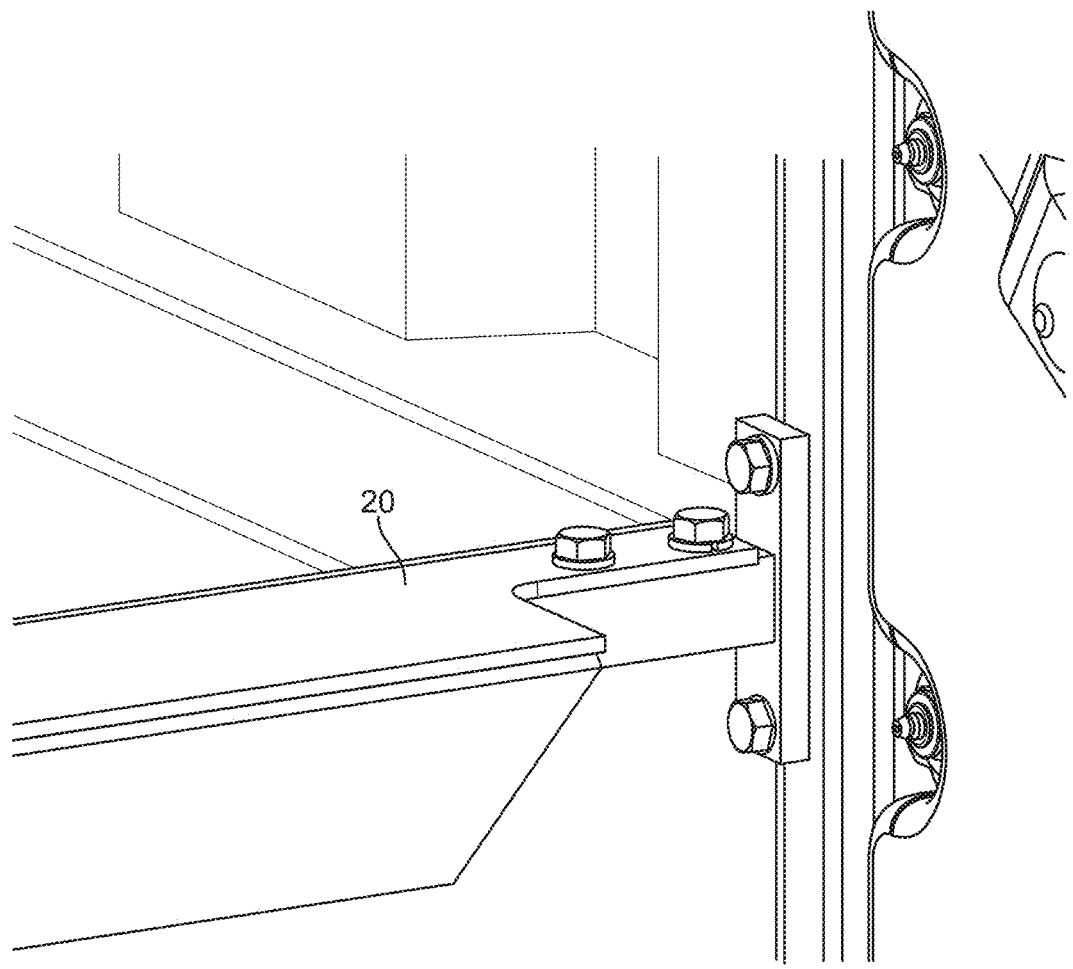
FIG. 29 shows another partial perspective view of the lift system shown in FIG. 27, according to one embodiment.

In one embodiment, the lift system further provides an essentially elongate rectangular extension plate 20 (FIGS. 27, 28, 29), which may also be attached to the vehicle 1, essentially flush with the vehicle bed 21 (FIG. 28) of the vehicle 1, such that in operation, when the lift platform 11 is raised to the vehicle bed 21, there is substantially continuous surface from the vehicle bed 21 to the lift platform 11 to ease movement of loads between the vehicle bed and the lift platform.

FIGS. 30-38 illustrate a second implementation of the aforementioned securing mechanism for each support column to secure that support column to the corresponding mounting member on the vehicle 1, according to an embodiment of the mounting system disclosed herein.

Figure 30:
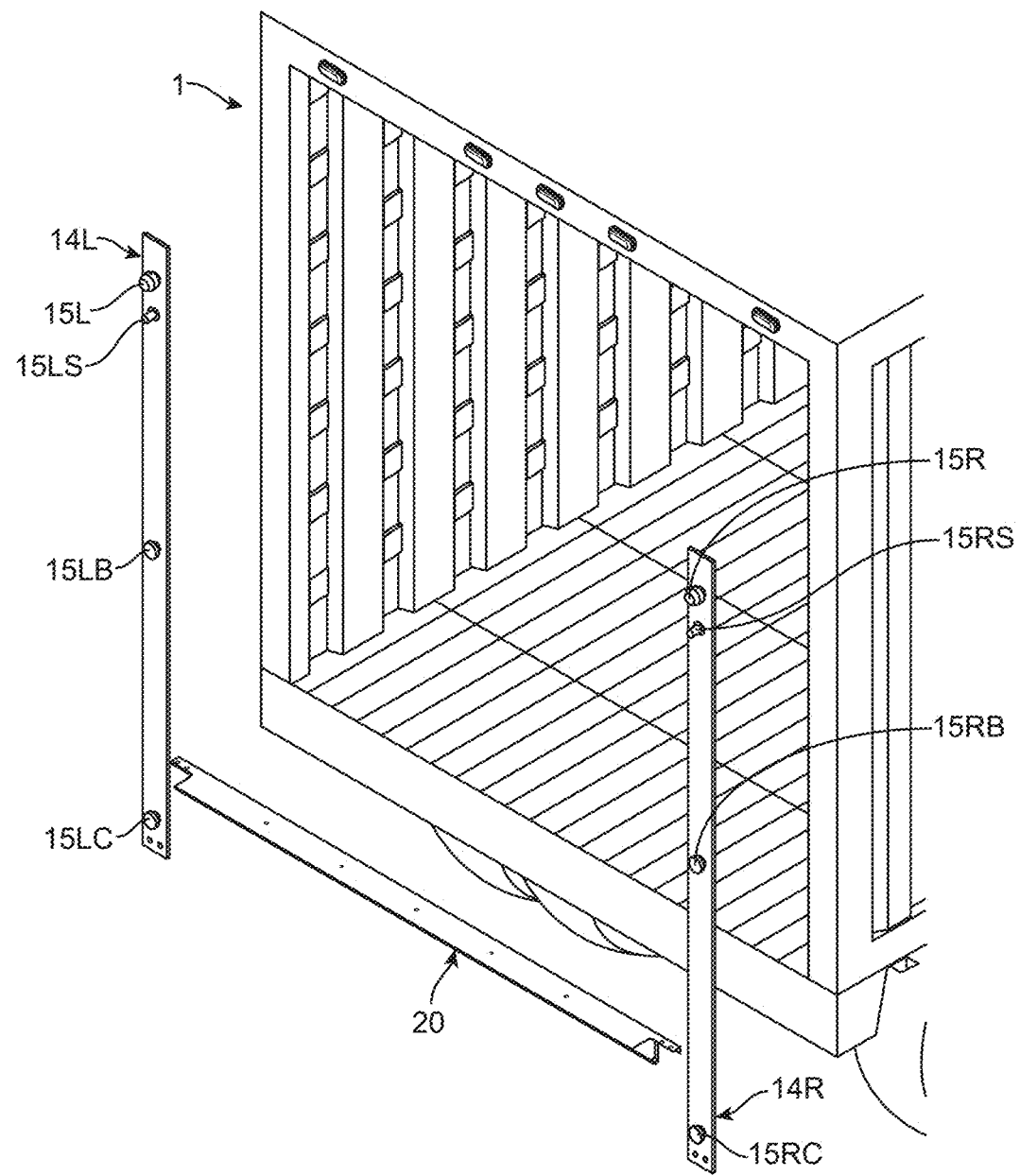
FIG. 30 illustrates another embodiment of the mounting members.
Figure 31:
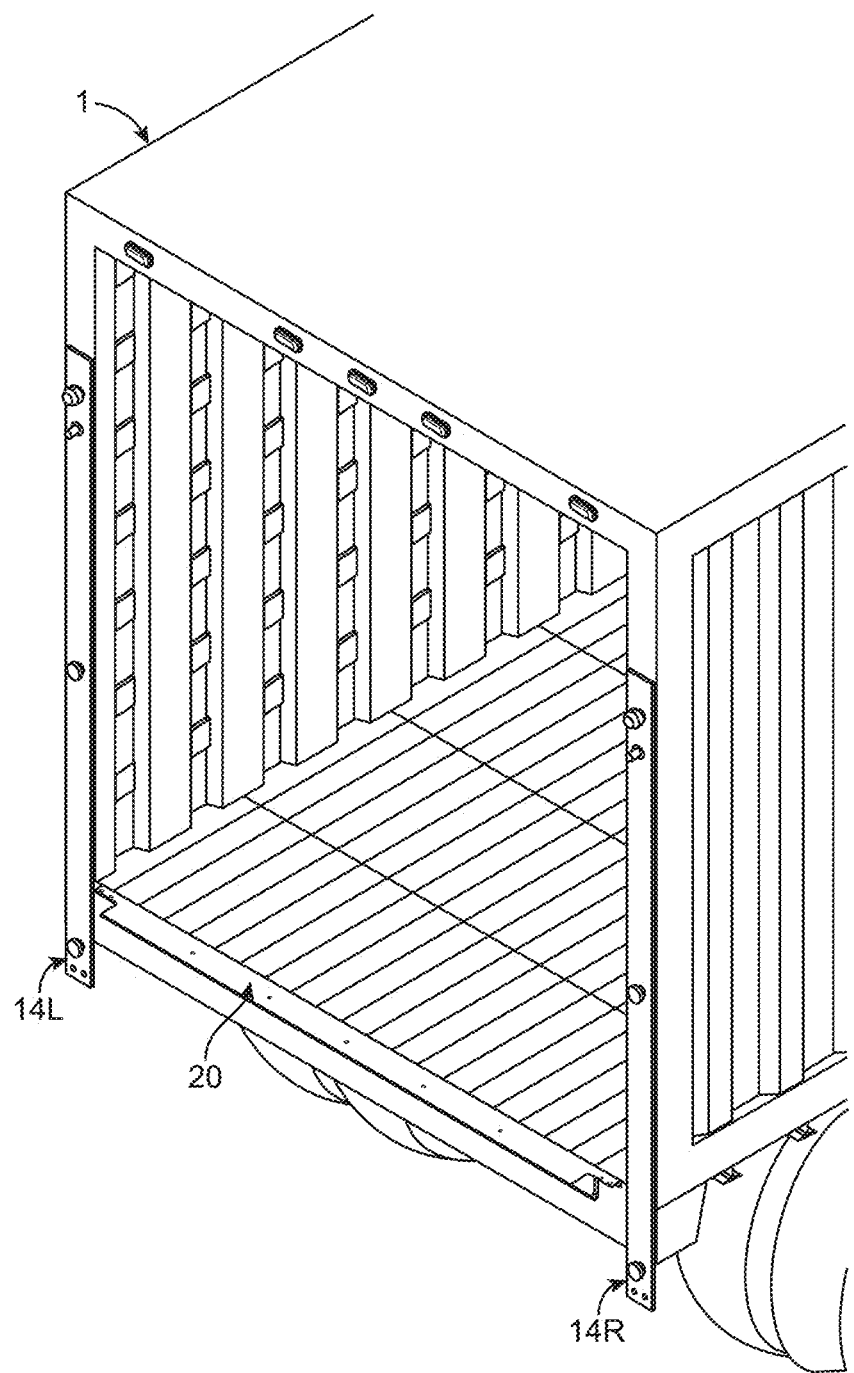
FIG. 31 illustrates the mounting members of FIG. 30 attached to a vehicle opening, according to one embodiment.
Figure 32:
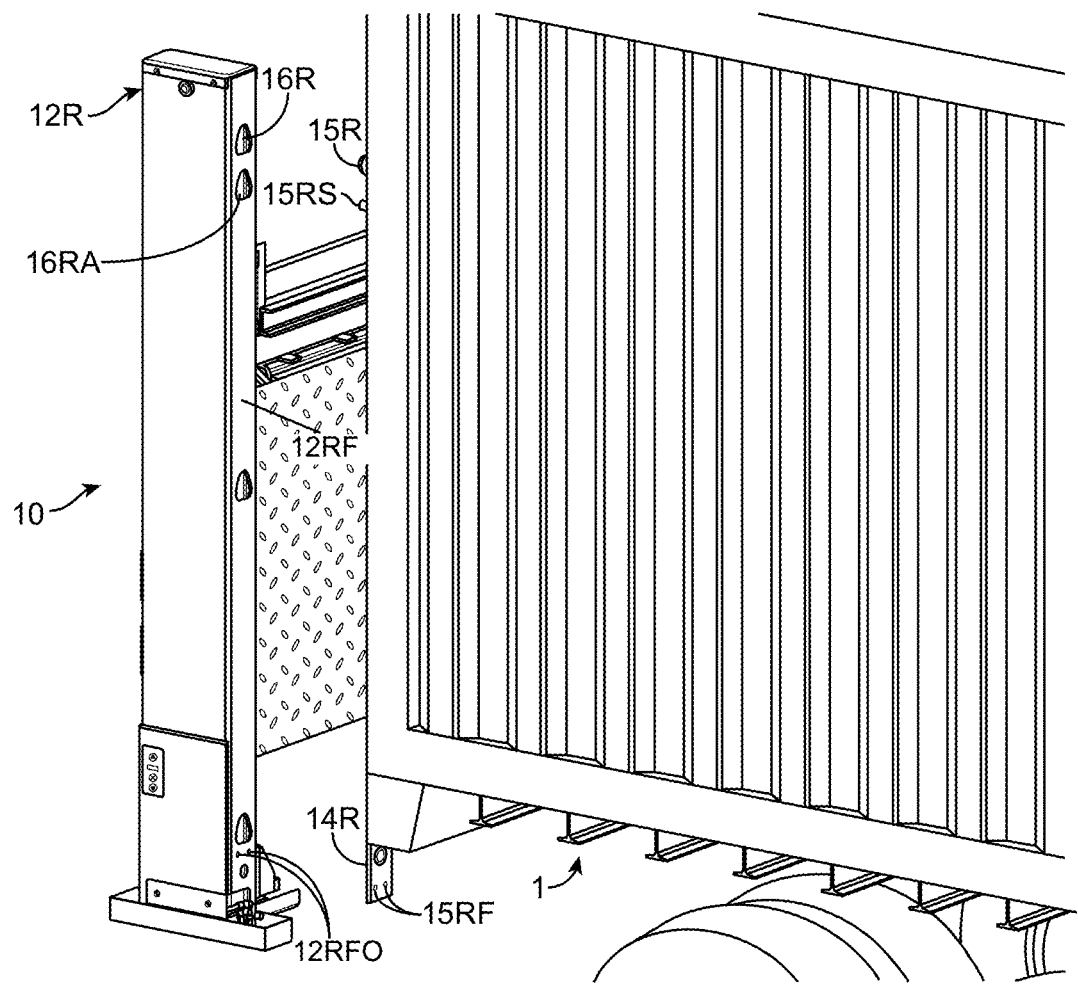
FIG. 32 shows a perspective view of a lift gate aligned with the rear opening of the vehicle, for mounting on mounting members of FIG. 31, according to one embodiment.
Figure 35A:
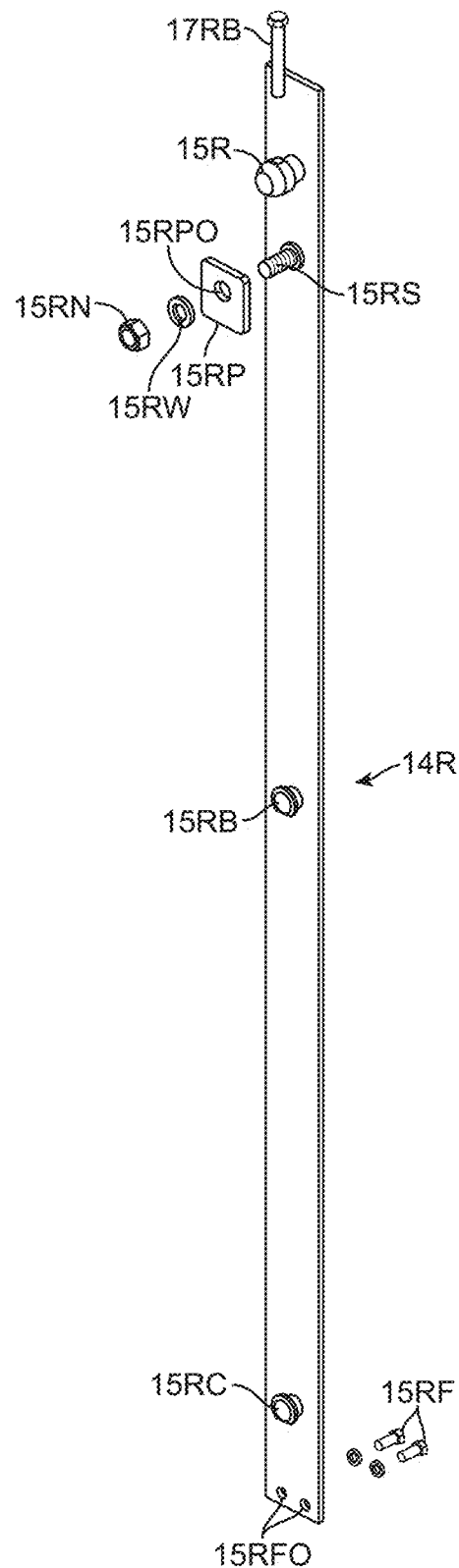
FIG. 35A shows a more detailed view of a right side mounting member in FIG. 30, according to one embodiment.
Figure 35B:
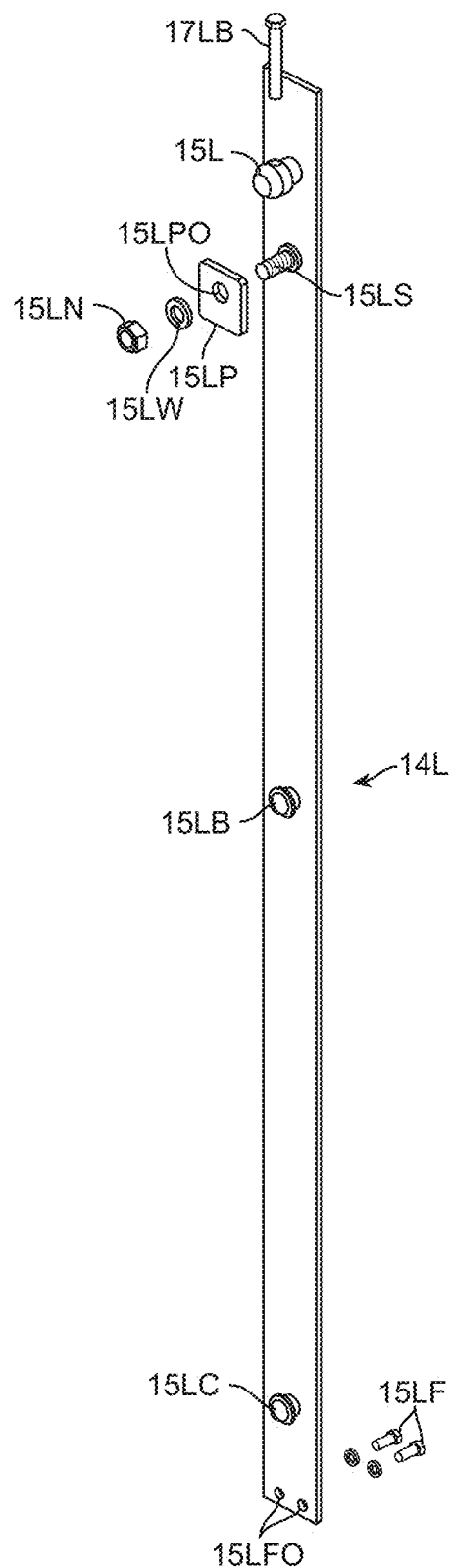
FIG. 35B shows a more detailed view of a left mounting member in FIG. 30, according to one embodiment.

FIG. 30 illustrates another embodiment of the mounting members 14L, 14R, and the extension plate 20, apart from the vehicle 1. FIG. 31 illustrates the mounting members 14L, 14R, and the extension plate 20, mounted to the vehicle 1. In this second implementation, as shown in FIG. 32, the securing mechanism for the mounting member 14R and corresponding column 12R includes a coupling protrusion 15RS comprising a threaded screw, in place of the protrusion 15RA on the mounting member 14R. FIG. 35A shows a more detailed view of mounting member 14R. FIG. 35B shows a more detailed view of mounting member 14L.

Similarly, the securing mechanism for the mounting member 14L and corresponding column 12L includes a coupling protrusion 15LS comprising a threaded screw, in place of the protrusion 15LA on the mounting member 14L. The securing mechanism for the mounting member 14L and corresponding column 12L is similar to that described hereinbelow for the mounting member 14R and corresponding column 12R, and therefore not described in detail.

FIG. 32 shows the lift gate 10 aligned with the rear opening of the vehicle 1, for mounting on mounting members 14L, 14R. As shown in FIG. 32, the protrusions 15R and 15RS on the mounting member 14R essentially align with receiving openings 16R and 16RA, respectively, on the corresponding column 12R. The threaded screw 15RS is positioned relative to the protrusion 15R such that the threaded screw 15RS is essentially aligned with the opening 16RA when the protrusion 15R is aligned with the opening 16R.

Figure 33:
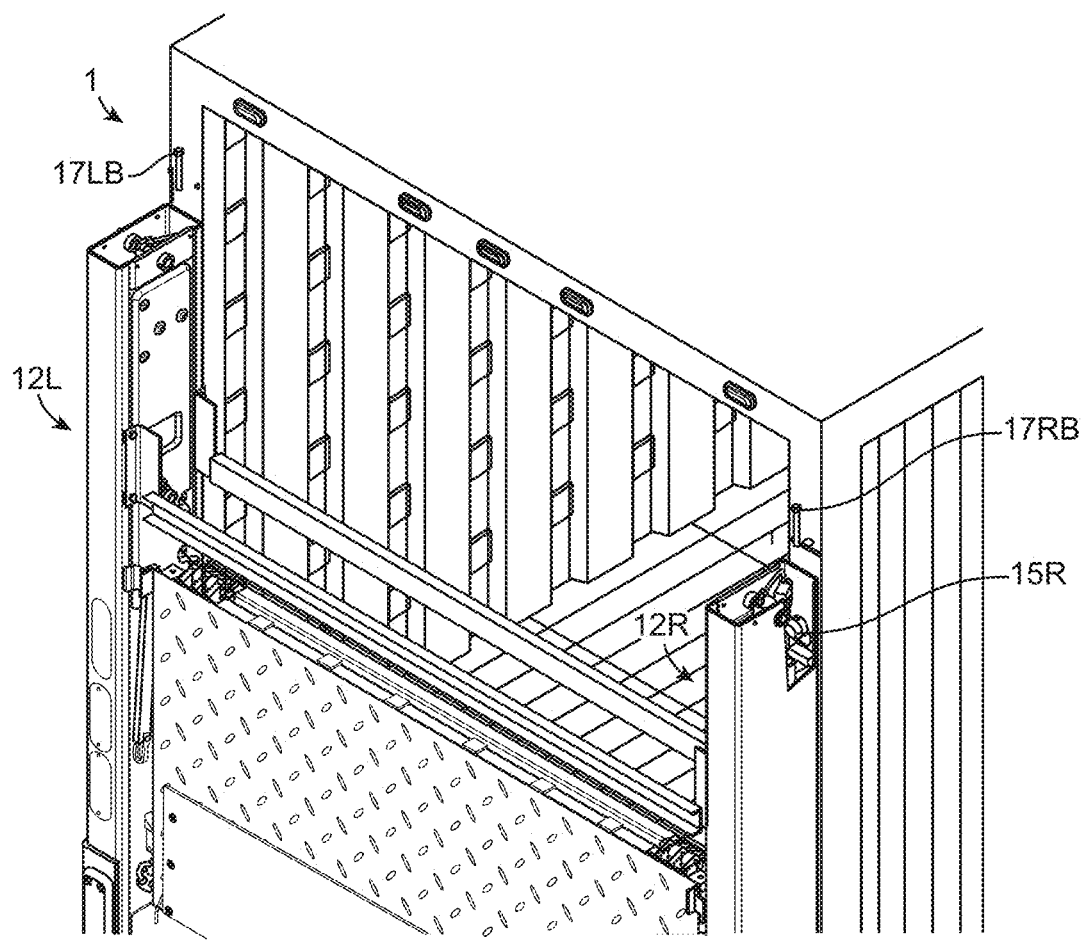
FIG. 33 shows a perspective view of the lift gate support as mounted on the mounting members of FIG. 31, according to one embodiment.

FIG. 33 shows a view of the columns 12R and 12L of the lift gate 10 as mounted on the mounting members 14R and 14L, respectively, on the vehicle opening. The protrusion 15R is received by the opening 16R on the column 12R. The protrusion 15L is received by the opening 16R on the column 12L. The screw 15LB is aligned with opening 15RO of the protrusion 15R, and screw 15RB is aligned with opening 15LO of the protrusion 15L, for threading.

Figure 34:
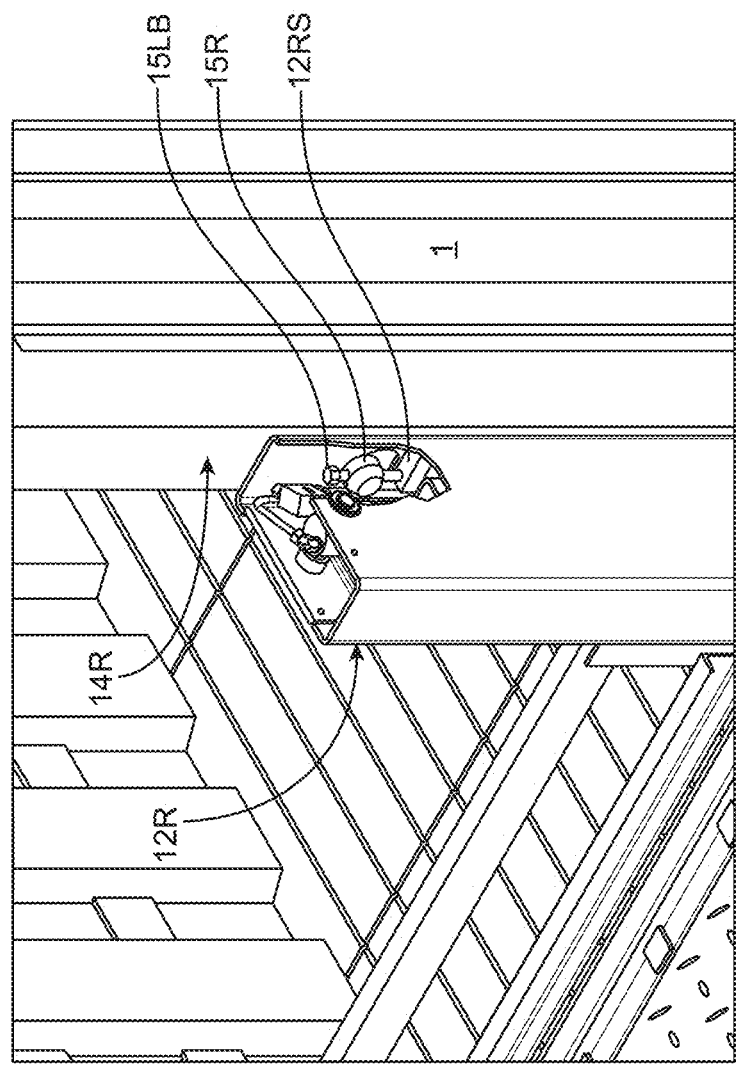
FIG. 34 shows a partial view of a right side support column as mounted on the corresponding mounting member on the vehicle opening in FIG. 31, according to one embodiment.

FIG. 34 shows a partial view of the column 12R of the lift gate 10 as mounted on the mounting member 14R on the vehicle opening. The protrusion 15R is received by the opening 16R on the column 12R. The screw 15LB is threaded in the opening 15RO of the protrusion 15R until the tip of the screw is urged against the block 12RS.

Figure 36:
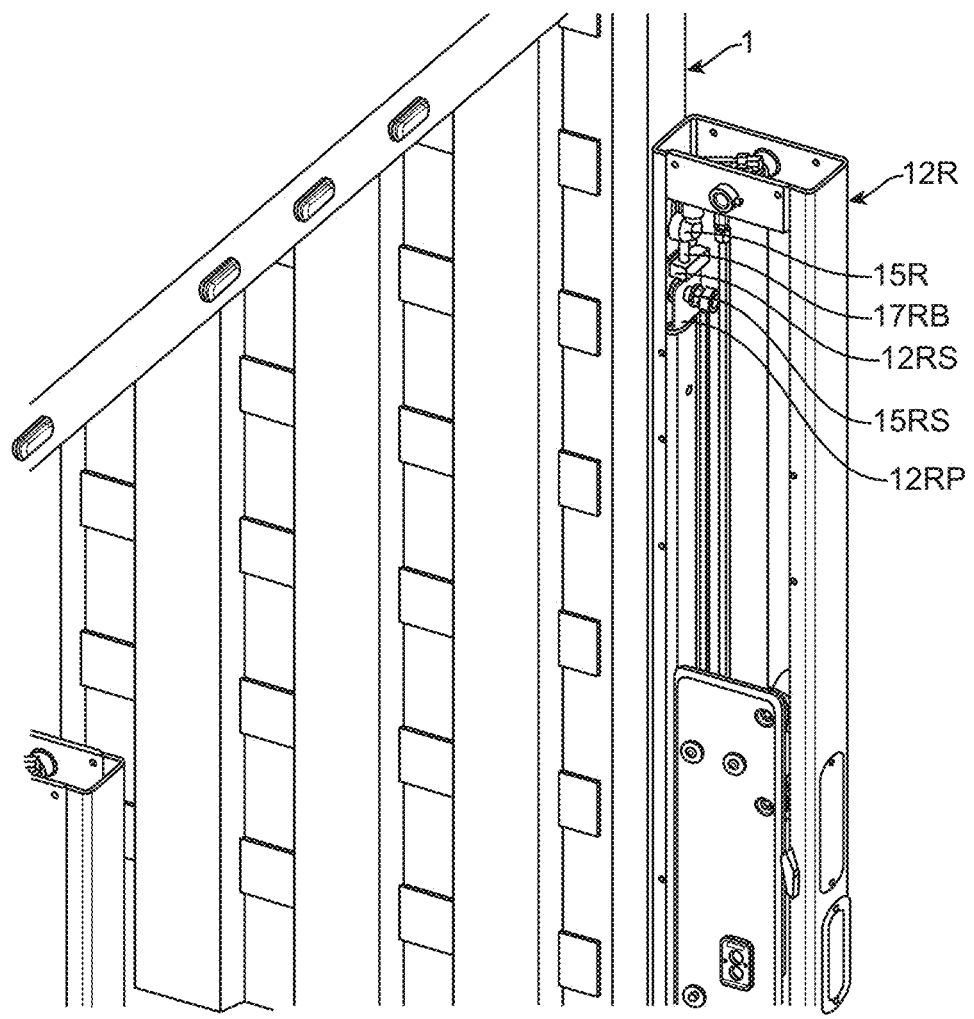
FIG. 36 shows a partial view of the interior of right side support column of the lift gate as mounted on the corresponding mounting member in FIG. 31, according to one embodiment.
Figure 37A:
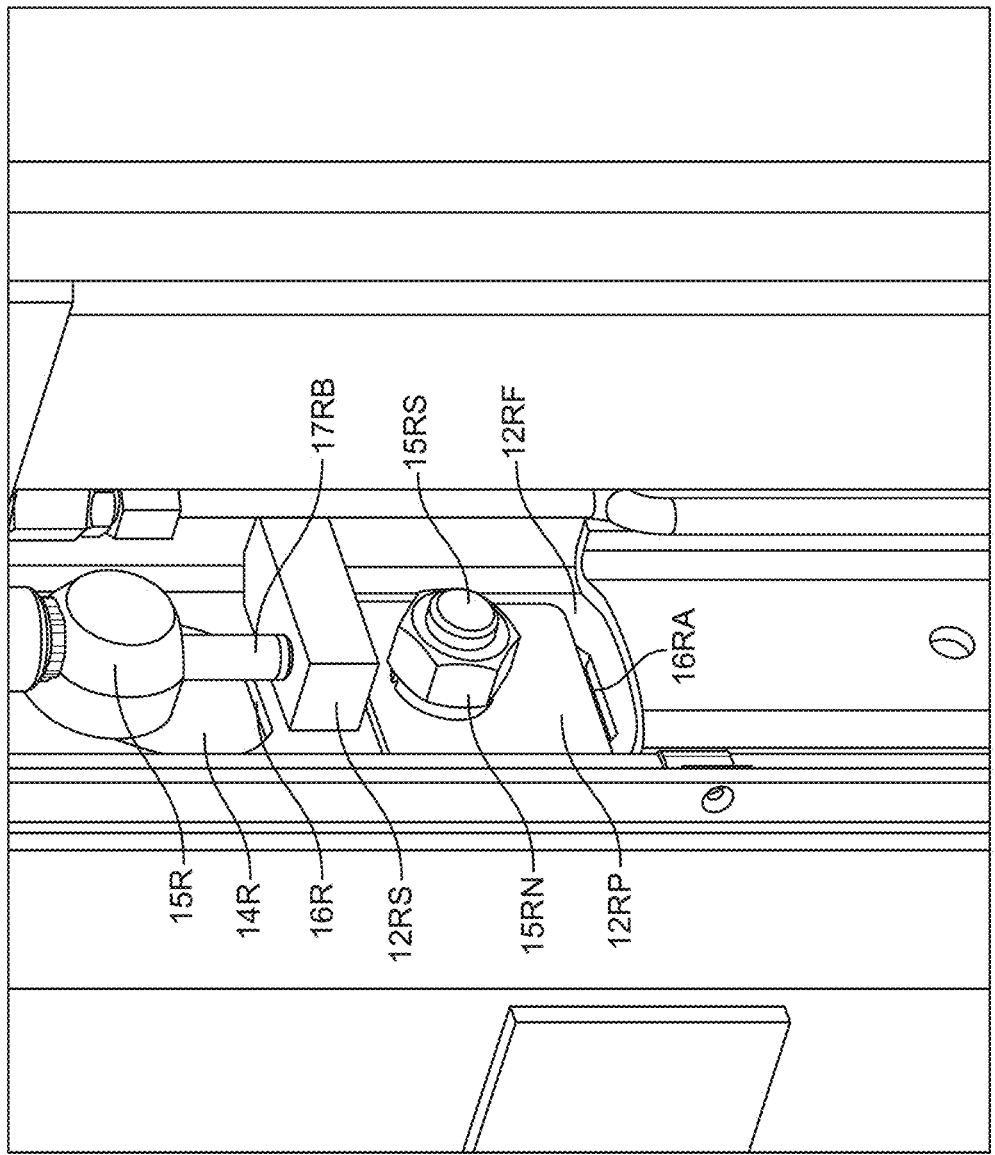
FIG. 37A shows a more detailed view of the interior of right side support column of the lift gate as mounted on the corresponding mounting member in FIG. 31, according to one embodiment.

FIG. 36 shows a partial view of the interior of column 12R of the lift gate 10 as mounted on the mounting member 14R on the vehicle opening. FIG. 37A shows a more detailed view of the interior of column 12R of the lift gate 10 as mounted on the mounting member 14R on the vehicle opening. The securing mechanism for the mounting member 14R further comprises a securing plate 15RP having an opening 15RPO for receiving the screw 15RS therethrough. The securing mechanism for the mounting member 14R further includes a threaded nut 15RN and washer 15RW (FIG. 35A), wherein the nut 15RN is configured for threaded engagement with the screw 15RS.

In mounting the column 12R on the mounting member 14R, the screw 15RS is positioned through the opening 16RA on the column 12R, then the plate 15RP (which is larger the opening 16RA) is mounted on the screw 15RS such that the screw 15RS passes through the opening 15RPO (FIG. 35A), such that the inner face of the front wall 12RF of the support column 12R is maintained between the mounting member 14R and the plate 15RP (FIG. 35A).

Then, the washer 15RW is placed on the screw 15RS and the nut 15RN is threaded on the screw 15RS to urge the plate 15RP against the inner face of the front wall 12RF of the support column 12R. This prevents horizontal motion (i.e., towards/away from the mounting member 14R) of the column 12R on the protrusion portion 15R1 of the mounting member 14R. In this embodiment, the wedge member 17RW need not be used since the plate 15RP maintains the column 12R against the mounting member 14R, as described.

As shown in FIG. 35B, the securing mechanism for the mounting member 14L further comprises a securing plate 15LP having an opening 15LPO for receiving the screw 15LS therethrough. The securing mechanism for the mounting member 14L further includes a threaded nut 15LN and washer 15LW, wherein the nut 15LN is configured for threaded engagement with the screw 15LS.

Figure 37B:
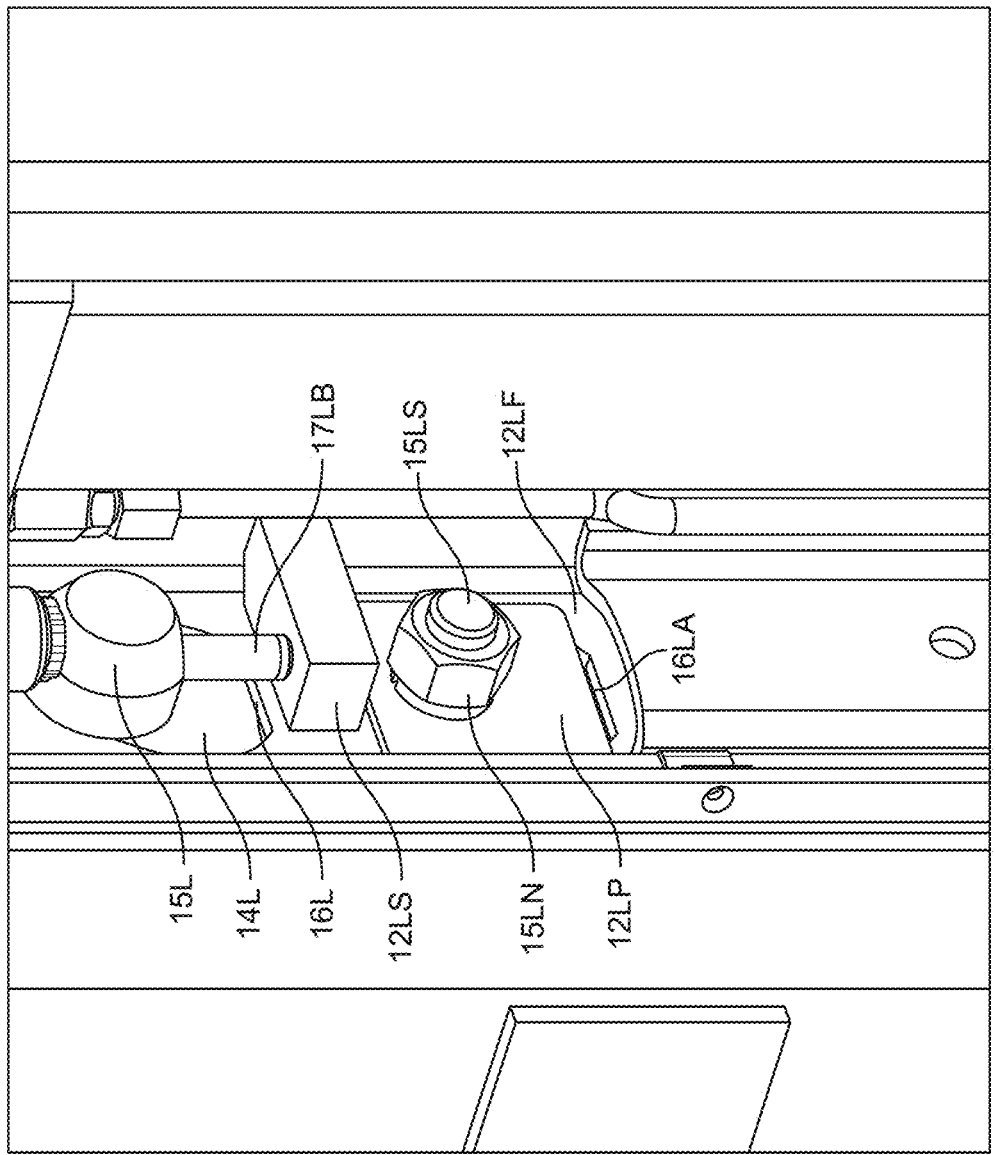
FIG. 37B shows a more detailed view of the interior of left side support column of the lift gate as mounted on the corresponding mounting member in FIG. 31, according to one embodiment.

FIG. 37B shows a more detailed view of the interior of column 12L of the lift gate 10 as mounted on the mounting member 14L on the vehicle opening. In mounting the column 12L on the mounting member 14L, the screw 15LS is positioned through the opening 16LA on the column 12L, then the plate 15LP (which is larger the opening 16LA) is mounted on the screw 15LS such that the screw 15LS passes through the opening 15LPO, such that the inner face of the front wall 12LF of the support column 12L is maintained between the mounting member 14L and the plate 15LP.

Then, the washer 15LW is placed on the screw 15LS and the nut 15LN is threaded on the screw 15LS to urge the plate 15LP against the inner face of the front wall 12LF of the support column 12L. This prevents horizontal motion of the column 12L on the protrusion portion 15L1 of the mounting member 14L.

Figure 38:
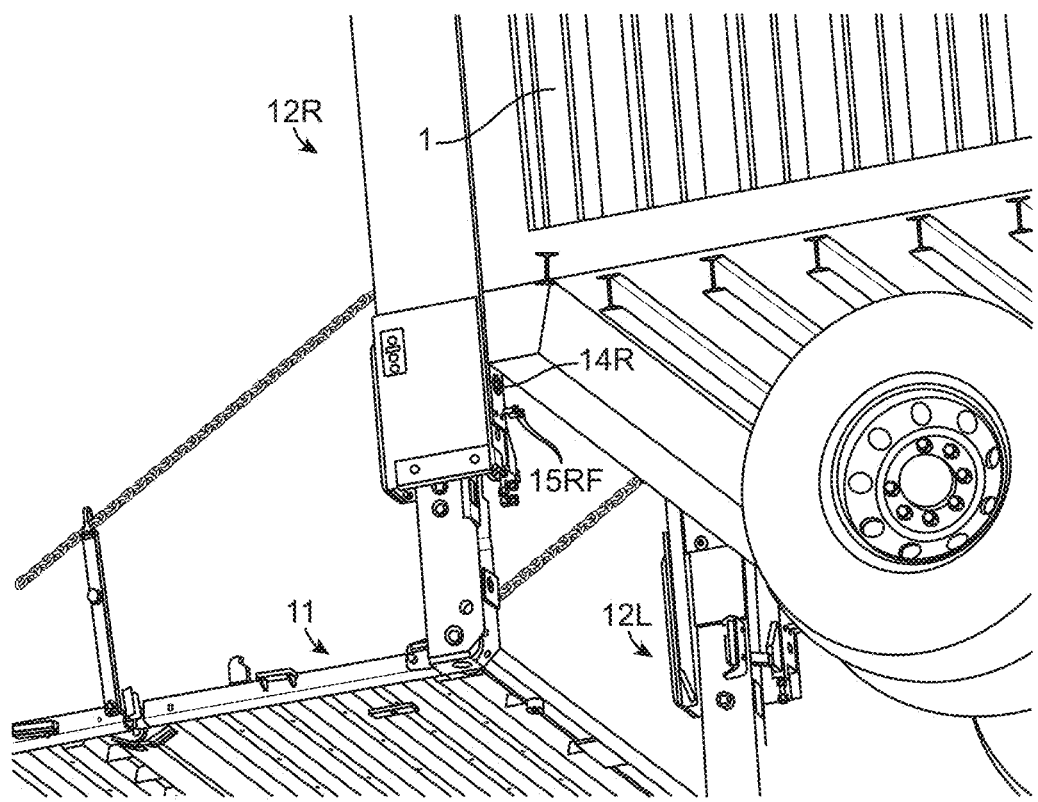
FIG. 38 shows a perspective view of the right side column as mounted on the corresponding mounting member, wherein the openings of the column are aligned with the openings of the mounting member shown in FIG. 35A, according to one embodiment.

As shown in FIG. 35A, in one embodiment, the lift system further provides a pair of fastening screws 15RF for additionally securing a lower portion of the column 12R to a lower portion of the mounting member 14R. The mounting member 14R has corresponding openings 15RFO for receiving the threaded screws therethrough. As shown in FIG. 32, the face 12RF of the column 12R includes corresponding openings 12RFO for threadedly receiving the screws 15RF, to further secure the column 12R to the mount member 14R. FIG. 38 shows column 12R as mounted on the mounting member 14R, wherein the openings 12RFO of the column 12R are aligned with the openings 15RFO of the mounting member 14R (FIG. 35A), and screws 15RF are to be threaded therethrough to further secure the mounting member 14R and column 12R together. The mounting member 14L and column 12L are also further secured together using a similar mechanism.

As shown in FIG. 35B, similarly in one embodiment the lift system further provides a pair of fastening screws 15LF for additionally securing a lower portion of the column 12L to a lower portion of the mounting member 14L. The mounting member 14L has corresponding openings 15LFO for receiving the threaded screws therethrough. As shown in FIG. 32, the face 12LF of the column 12L includes corresponding openings 12LFO for threadedly receiving the screws 15LF, to further secure the column 12L to the mount member 14L.

In the embodiments described herein, the mechanisms for mounting the column 12L on the mounting member 14L and securing them together, are similar (and preferably identical) to the mechanisms for mounting the column 12R on the mounting member 14R, and securing them together. The mounting system can be made from a rigid material such as a metal.

Figure 39:
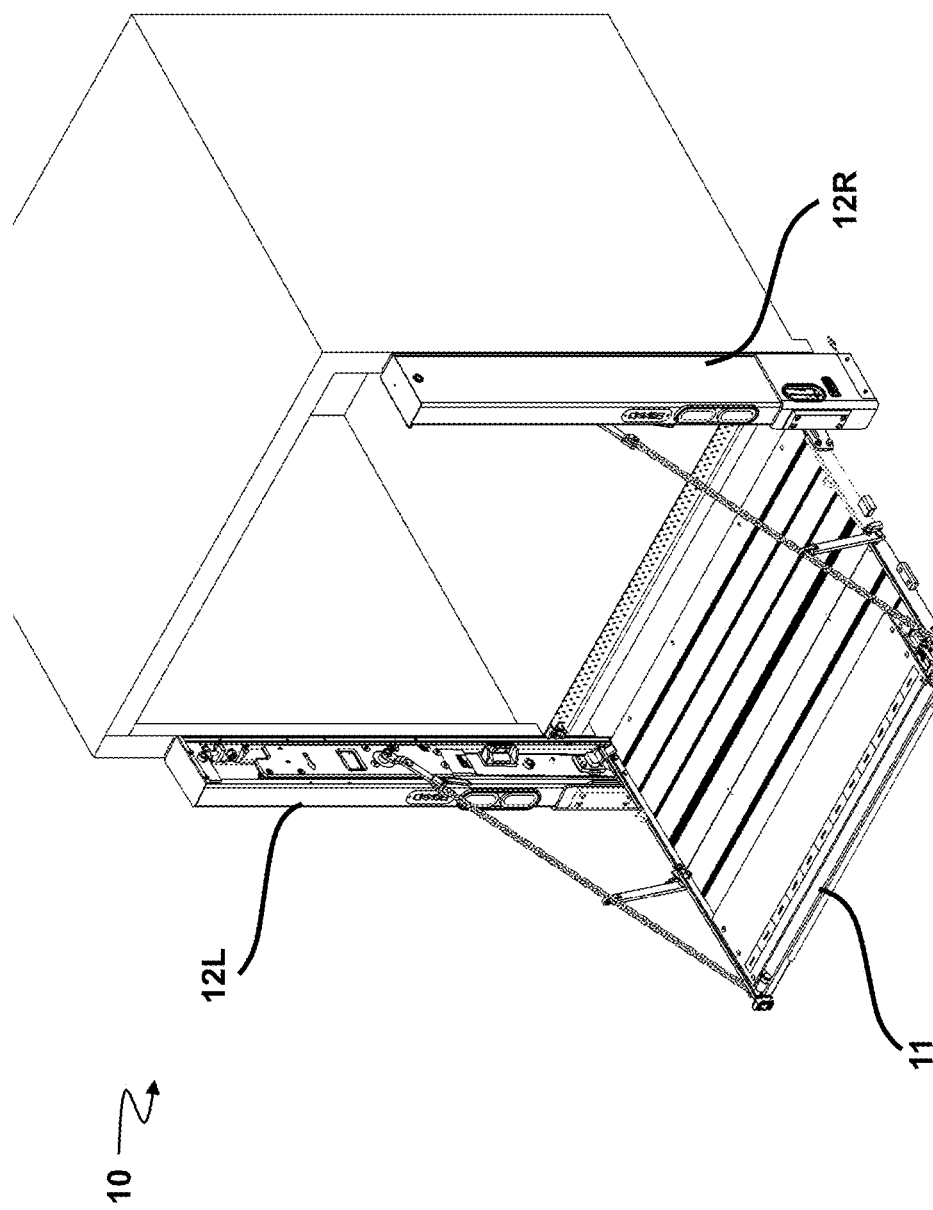
FIG. 39 is a perspective view of a lift system (lift gate) mounted on the rear end of a vehicle, according to one embodiment.

With reference to FIG. 39, the present embodiments include a lift gate mounted on the rear end of a vehicle. In an embodiment, a vehicle, such as a truck with a rear opening, may be suitable for installing a lift gate. The lift gate 10 comprises a lift gate platform 11, a left column 12L, and a right column 12R.

The components of the lift gate 10 can line up substantially along with an x, y, and z-axis. FIG. 39 shows the left support column 12L and right support column 12R parallel along the height of the columns 12L, 12R with the y-axis, while being parallel along the columns 12L, 12R depth along the z-axis. The lift gate platform 11 is configured orthogonal between the left support column 12L and right support column 12R and extends out from the rear of the vehicle along the z-axis. The length of the lift gate platform 11 extends parallel to the x-axis.

The left column 12L and right column 12R can be parallel with each other along the y-axis and the z-axis, and orthogonal to the lift gate platform 11. The lift gate platform 11 can attach to both the left column 12L and right column 12R to provide support for lifting and lowering the lift gate platform 11.

In an embodiment, the lift gate 10 may provide a dual lift system including a parallel pair of vertically extending columns 12L, 12R, each column 12L, 12R having a vertically-disposed hydraulic cylinder for vertically raising and lowering a load carried by the pair of cylinders. The lift gate 10 can include a rigid H-frame having a parallel pair of upstanding support columns 12L, 12R. In one embodiment, the left and right columns 12L, 12R can contain a corresponding pair of vertically-disposed hydraulic cylinders having runners interconnected by a transverse stabilizing bar supporting a two-section foldable lift gate platform 11 actuated on each side by an actuating linkage system. The lift gate 10 can include a lift gate platform 11 supported between a left support column 12L and a right support column 12R, which themselves may include actuators for lowering and/or raising the platform.

Figure 40:
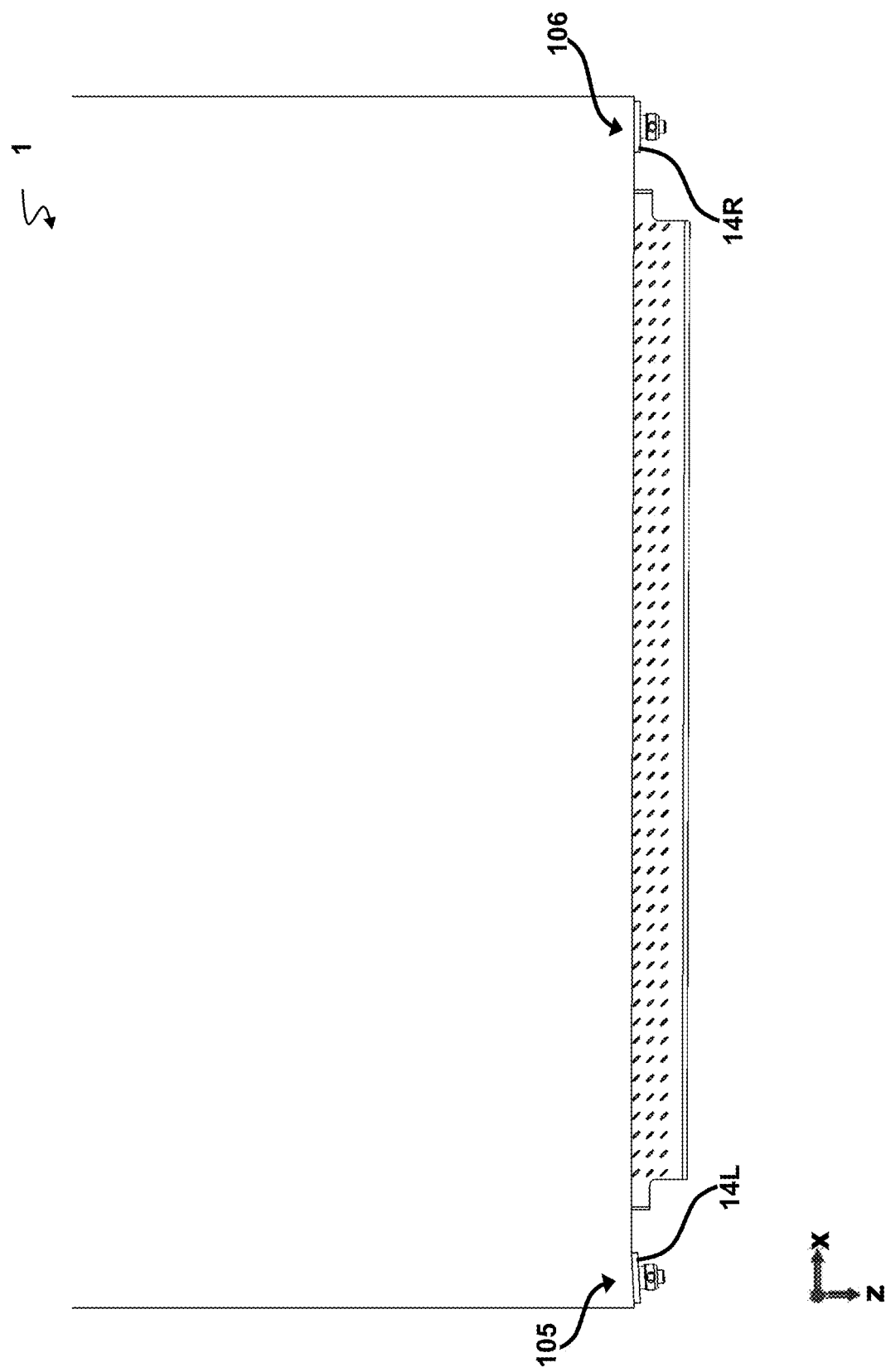
FIG. 40 shows an overhead view of one example configuration of a left mounting member and a right mounting member attached to the rear of a vehicle, according to one embodiment.

FIG. 40 shows a left mounting member 14L and right mounting member 14R attached to the rear of a structure 1. The left and right mounting members 14L, 14R can line up substantially along with an x, y, and z-axis. For example, the height of the left and right mounting members 14L, 14R can be configured to be parallel along the y-axis, while the width of the left and right mounting members 14L, 14R extend along the x-axis, and the extrusions of the left mounting member 14L and right mounting member 14R can extend parallel outward along the z-axis. Similarly, the left and right mounting members 14L, 14R can each be affixed to a left mounting point 105 and right mounting point 106 respectfully. The left and right mounting points 105, 106 can be parallel with each other along the x-axis, and extending their outward facing sides where the left and right mounting members 14L, 14R can be mounted parallel with each other with respect to the z-axis.

FIG. 40 shows the left mounting member 14L not substantially parallel with the right mounting member 14R along the z-axis. The lift gate may be configured to attach and/or function on the rear end of a structure 1 such as, but not limited to, a truck with a rear opening. The structure 1 can have left and right lift gate mounting members 14L, 14R attached to each side of the truck 1 at left and right mounting points 105, 106. Under certain conditions, the left mounting point 105 or right mounting point 106 of the structure 1 can become bent inward or outward with respect to the x-axis. The structure 1 depicted in FIG. 40 has a left mounting point 105 that is bent outward with respect to the rear of the structure 1 compared to the non-bent right mounting point 106. In these situations, the left mounting point 105 and right mounting point 106 of the structure 1 are not substantially parallel with each other with respect to the x-axis.

Figure 41:
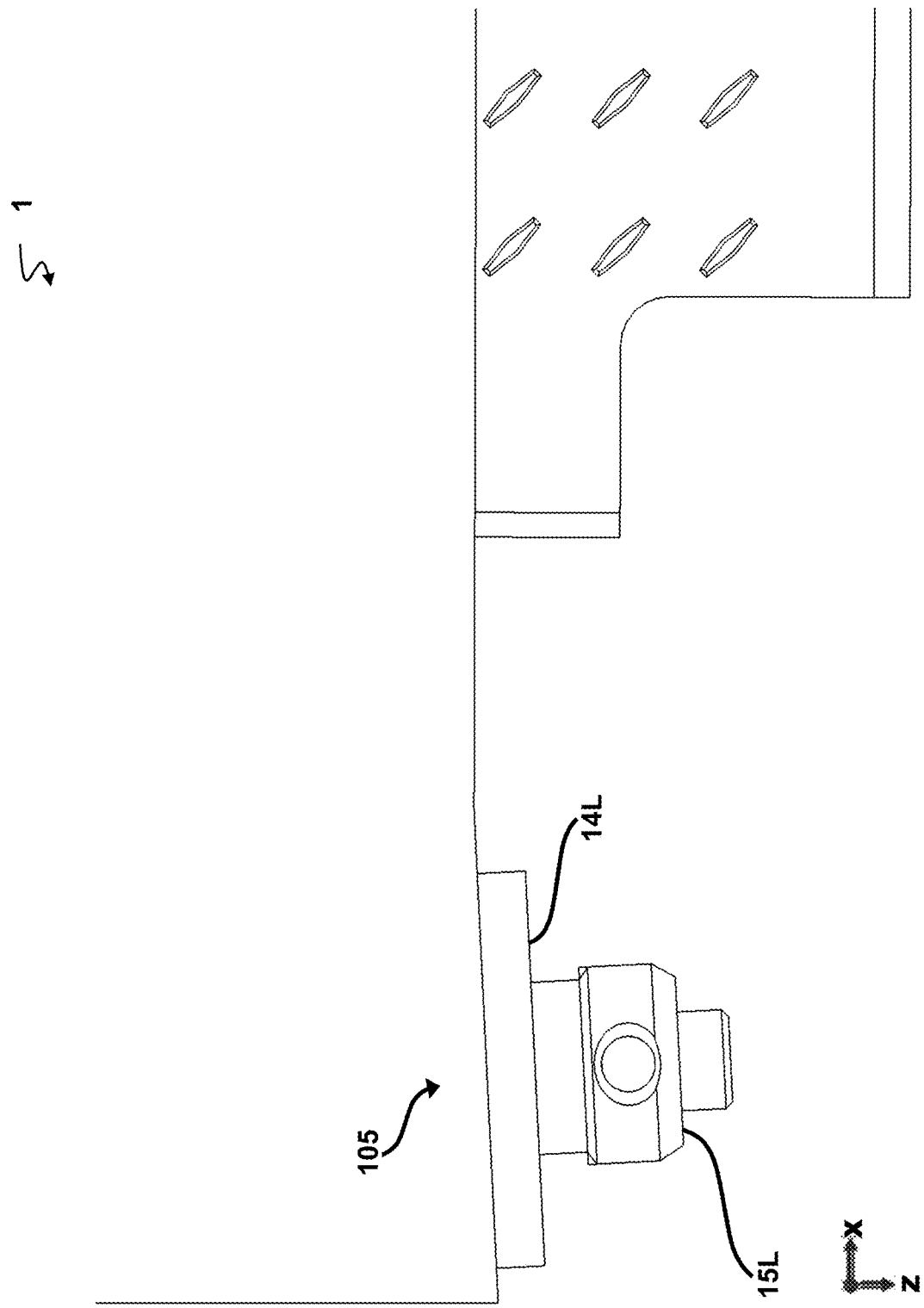
FIG. 41 shows a more detailed overhead view of a left mounting member extending outward from the rear of the vehicle, according to one embodiment.

As shown in FIG. 41, under certain circumstances a structure 1 may have a rear end that has a mounting member 14L mounted to at least one mounting point 105. The mounting member 14L may have a protrusion 15L that extends from the mounting member 14L which can allow for the hanging of a lift gate onto the structure 1. When a structure 1 has a bent left mounting point 105, the mounting member 14L can extend outward from the rear of the structure 1 such that it becomes non-parallel along the x-axis with respect to the right mounting member (14R, See FIG. 40) on the other side of the structure 1.

Figure 42:
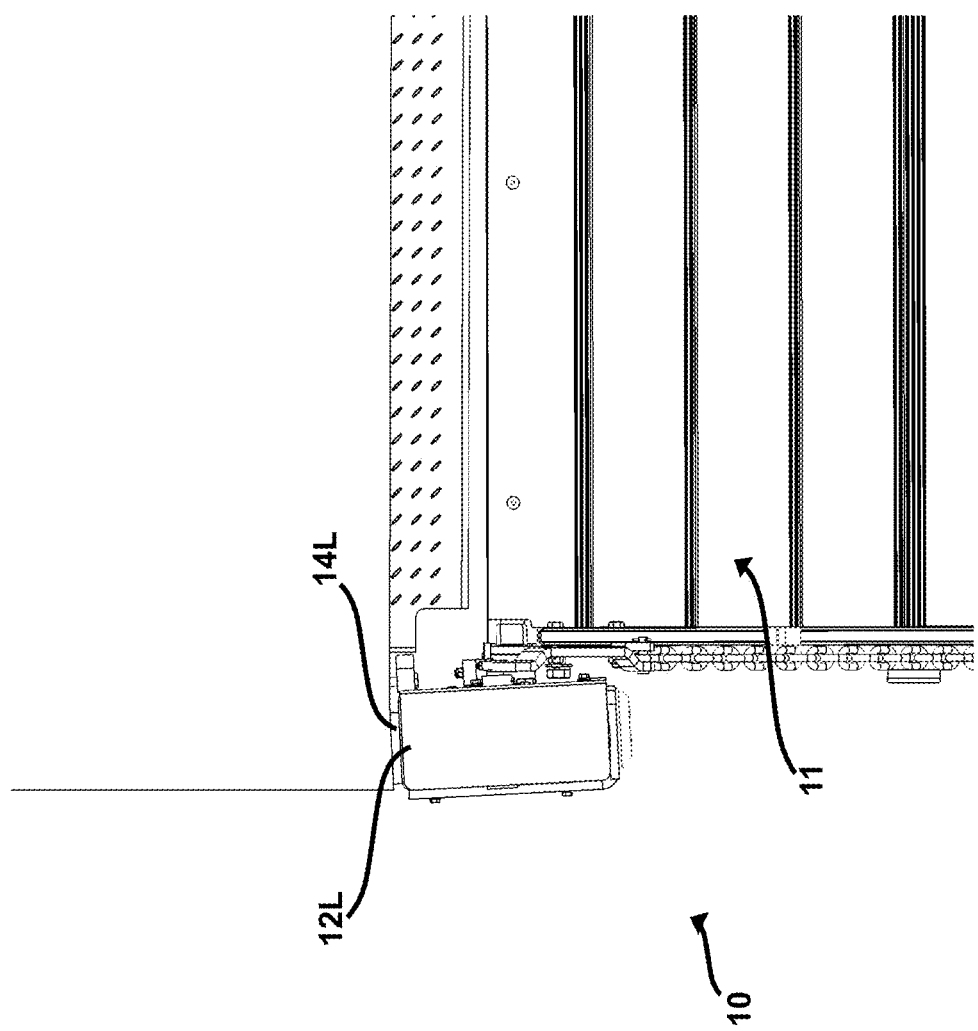
FIG. 42 shows an overhead view of a lift gate mounted at the left mounting member that is not substantially parallel with the right mounting member along the z-axis, according to one embodiment.

With reference to FIG. 42, the present embodiments include a lift gate 10 mounted at the left mounting member 14L that is not substantially parallel with the right mounting member along the x-axis. In one embodiment, the lift gate may be designed to mount the left support column 12L and right support column (not shown) flush against their respective mounting members (14L, 14R, See FIG. 40). In response to being mounted flush on a non-parallel left mounting member 14L of a structure 1, the left support column 12L may also become non-parallel respective to the other support column along the x-axis. As a result, the pair of non-parallel lift gate support columns may result in the inability for the lift gate platform 11 to be raised and/or lowered. In an embodiment, the left support column 12L may need to be adjusted to make the left support column 12L substantially parallel with respect to the x-axis to the other support column (not shown) to facilitate proper usage of the lift gate platform 11.

While a variety of lift gate systems are described above with reference to FIGS. 39-42, the specific configurations and arrangements of mounting members and support columns are largely dependent upon the requirements or applications of the users. For example, it can be appreciated by those skilled in the art that the exact types, shapes, and materials of the lift gate mounting system can comprise any number of shapes and sizes. Additionally, the direction of the bend on the vehicle may be inward as well as outward, and can appear on either or both ends of the vehicle.

Figure 43:
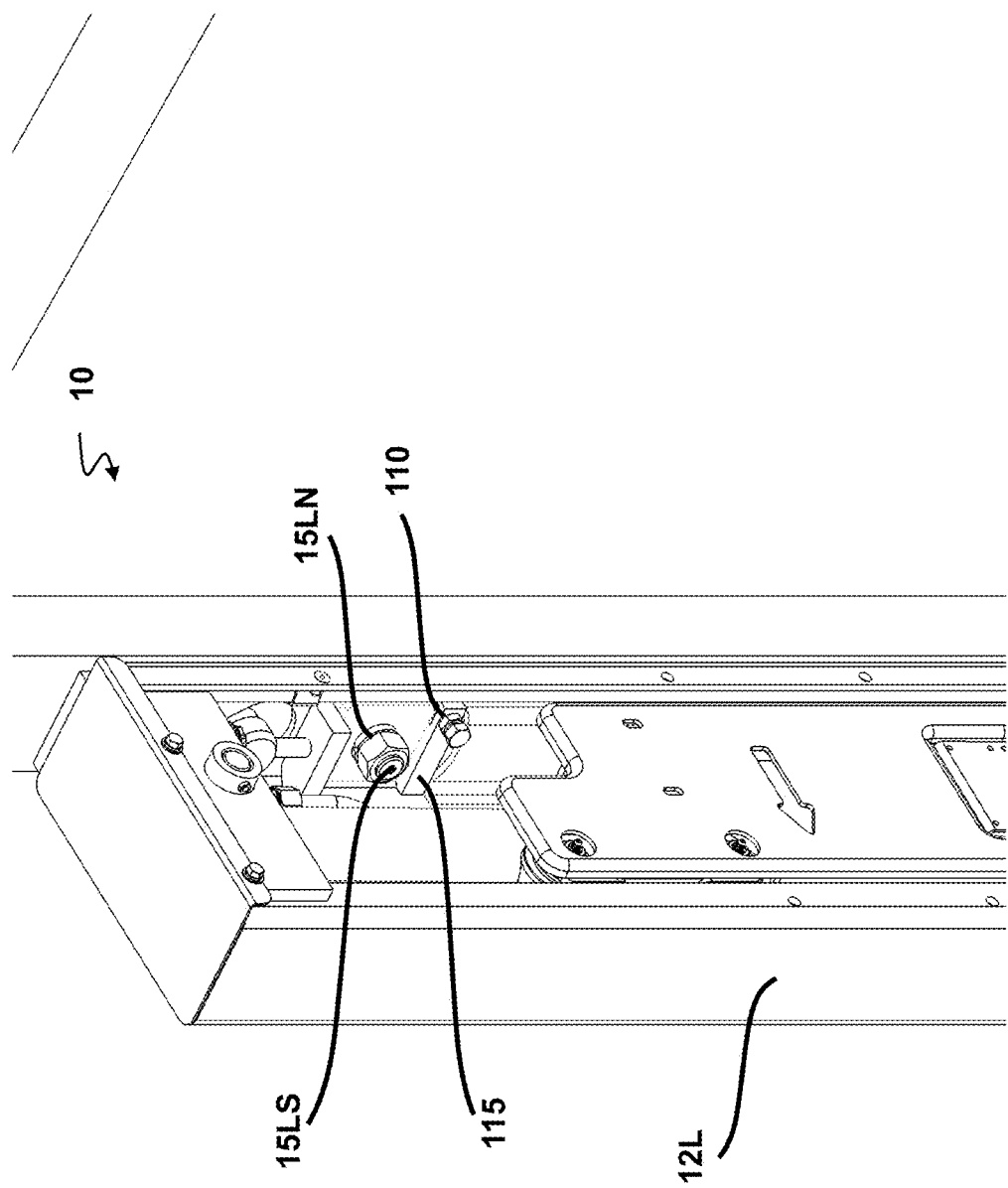
FIG. 43 shows a perspective view of the interior of the left column of the lift system with an upper support block and upper correction mechanism installed, according to one embodiment.

With reference to FIG. 43, the present embodiments include the left column 12L of the lift gate 10 with an upper support block 115 and upper correction mechanism 110 installed. The upper correction mechanism 110 may be a bolt, rod, or any other device to provide support between the upper support block 115 and the structure 1, lift gate 10, or mounting member 14L. Similarly, the upper support block 115 may be any shape, size, and/or thickness to support and align the upper correction mechanism 110 relative to the structure 1, lift gate 10, or mounting member 14L. In a number of embodiments, the lift gate 10 may include the upper correction mechanism 110 with the upper support block 115 that can allow for a non-flush mounting of the left support column 12L to facilitate a more parallel orientation, with respect to the x-axis, between the left and right support columns, allowing for proper use of the lift gate platform to move upwards and/or downwards. The left support column 12L can be secured to the mounting member through the use of a coupling protrusion 15LS on the mounting member being mated with a threaded nut 15LN. In an embodiment, the coupling protrusion 15LS is a threaded bolt that can be matched to the threaded nut 15LN. The coupling of the threaded nut 15LN with the coupling protrusion 15LS can secure the left support column 12L against the mounting member and ensures a flush fit between them.

In one embodiment, the upper support block 115, which may be a rectangular solid metal bar with a threaded female hole positioned on the inner side, can be utilized to better support an upper correction mechanism 110, which may be a threaded male bolt suitable for pairing with the upper support block 115. The upper support block 115 may be installed by the factory during initial production of the lift gate system. In other embodiments, the upper support block 115 may be installed after production. In certain embodiments, the upper support block 115 may be welded into the left support column 12L. Those skilled in the art will recognize that an upper support block 115 and upper correction mechanism 110 can be installed in both the left and right support columns in a mirror fashion, and only a single column is shown in FIG. 43 to simplify the illustrative and/or descriptive process. In an embodiment, the upper support block 115 has a hole that is matched to the upper correction mechanism 110 such that they may couple together to create a tighter fit. The threaded female hole in the upper support block 115 is matched with a hole in the outer casing of the support column 12L such that the upper correction mechanism 110 may extend through the upper support block 115 and through the outside of the support column 12L to rest against the mounting member and/or vehicle.

Figure 44A:
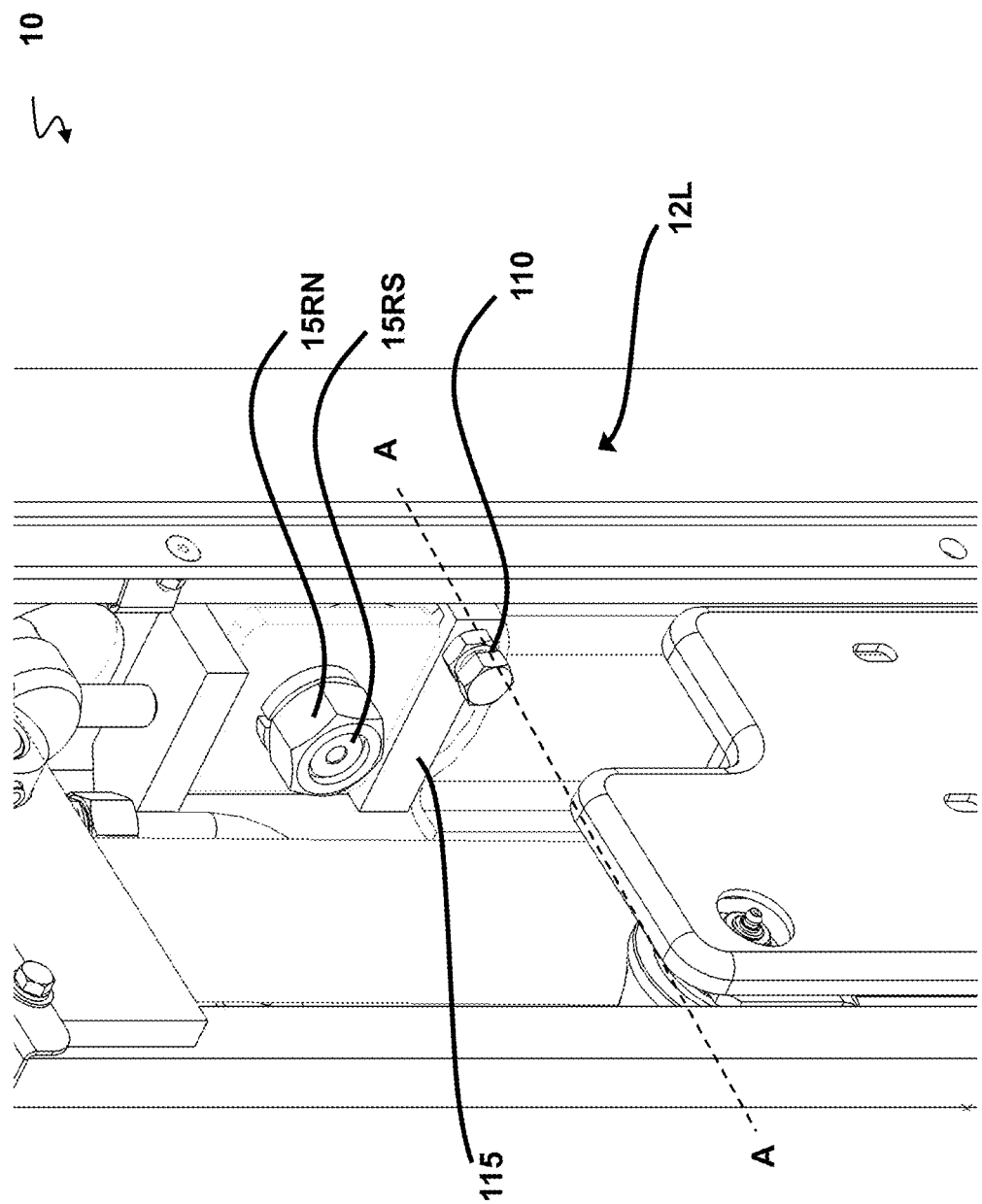
FIG. 44A shows a more detailed perspective view of the interior of the left column of the lift system with the upper support block and upper correction mechanism installed according to one embodiment.

With reference to FIG. 44A, the present embodiments include a left column 12L of the lift gate 10 with the upper support block 115 and upper correction mechanism 110 installed according to one embodiment. When a correction is desired in the mounting of the lift gate 10, a user may begin the correction process by loosening the threaded nut 15RN from the coupling protrusion 15RS. Those skilled in the art would recognize that to safely correct one support column in this fashion, the other support column must be securely mounted and attached to the vehicle. The loosening of the threaded nut 15RN can be done such that the amount of distance between the nut 15RN and the wall of the support column 12L is roughly equal to the amount of correction needed to facilitate such correction. The upper correction mechanism 110 can be tightened to create a force between the vehicle/mounting member and the left support column 12L. The force created between the vehicle/mounting member and the left support column 12L is enough to push the support column 12L away from the vehicle/mounting member such that a non-flush mounting is possible. In one embodiment, the upper correction mechanism 110 can be engaged until a substantially parallel orientation with respect with the z-axis occurs between the support column 12L being corrected and the other support column (not pictured).

With reference to FIG. 44B, the present embodiments include the upper support block 115 and upper correction mechanism 110. The lift gate 10 may include the upper support block 115 and the upper correction mechanism 110 for producing a non-flush mounting of the left support column 12L to the left mounting member 14L. In one embodiment, the upper support block 115 can have a threaded female hole that can mate with the threaded upper correction mechanism 110. The left support column 12L can have a matching hole in the vehicle-facing side of the left support column 12L such that the upper correction mechanism 110 can be extended through the upper support block 115 and support column 12L to press against the mounting member 14L. The engagement of the upper correction mechanism 110 can create a force that may push the support column 12L away from the mounting member 14L along the x-axis.

Figure 45:
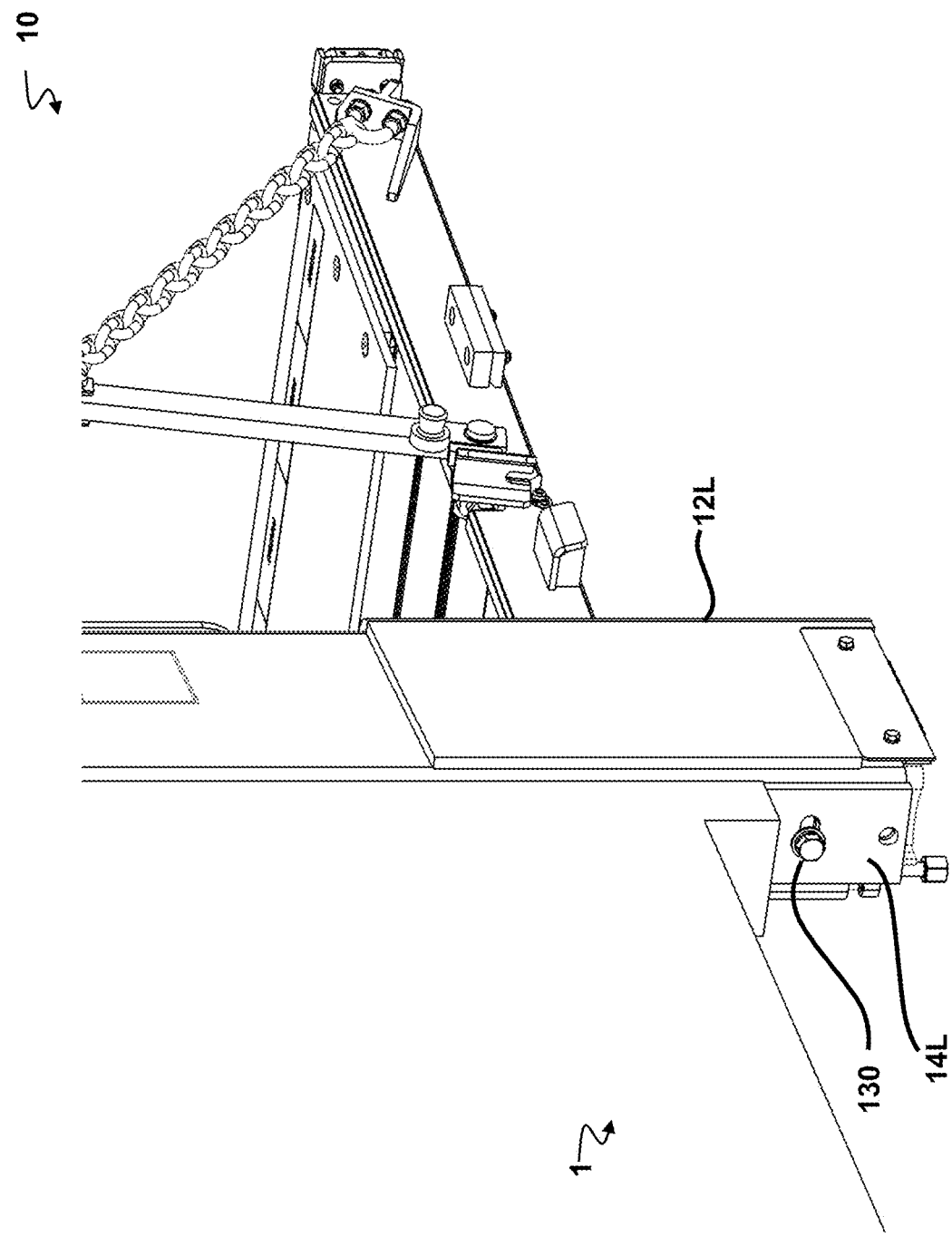
FIG. 45 shows a lower rear perspective view of the lift system attached to the rear of a vehicle with a lower mounting mechanism installed on the left mounting member, according to one embodiment.

With reference to FIG. 45, the present embodiments include the lift system 10 attached to the rear of the structure 1 with a lower mounting mechanism 130 installed on the left mounting member 14L. In an embodiment, a lower mounting mechanism 130, being a male threaded bolt that may be utilized by a female hole on the mounting member 14L to facilitate a tighter mounting of the lift gate 10 to the mounting member 14L. The lower mounting mechanism 130 may be loosened to facilitate a correction to the corresponding left support column 12L. The loosening of the lower mounting mechanism 130 can be done at the same time as the loosening of the threaded nut on the coupling protrusion in order as illustrated in the discussion of FIG. 43 to allow for free movement of the support column 12L during the correction process. Once the correction of the support column 12L has been completed, the lower mounting mechanism 130 may be engaged again until tightened.

While a variety of lift gate systems and correction processes are described above with reference to FIGS. 43-45, the specific configurations and arrangements of mounting members and support columns are largely dependent upon the requirements or applications of the users. For example, it can be appreciated by those skilled in the art all depicted parts and processes can be found, installed and/or utilized in both left and right support columns in a mirror and/or similar fashion, and only a single column is shown in certain FIGS. to simplify the illustrative and/or descriptive process.

Figure 46:
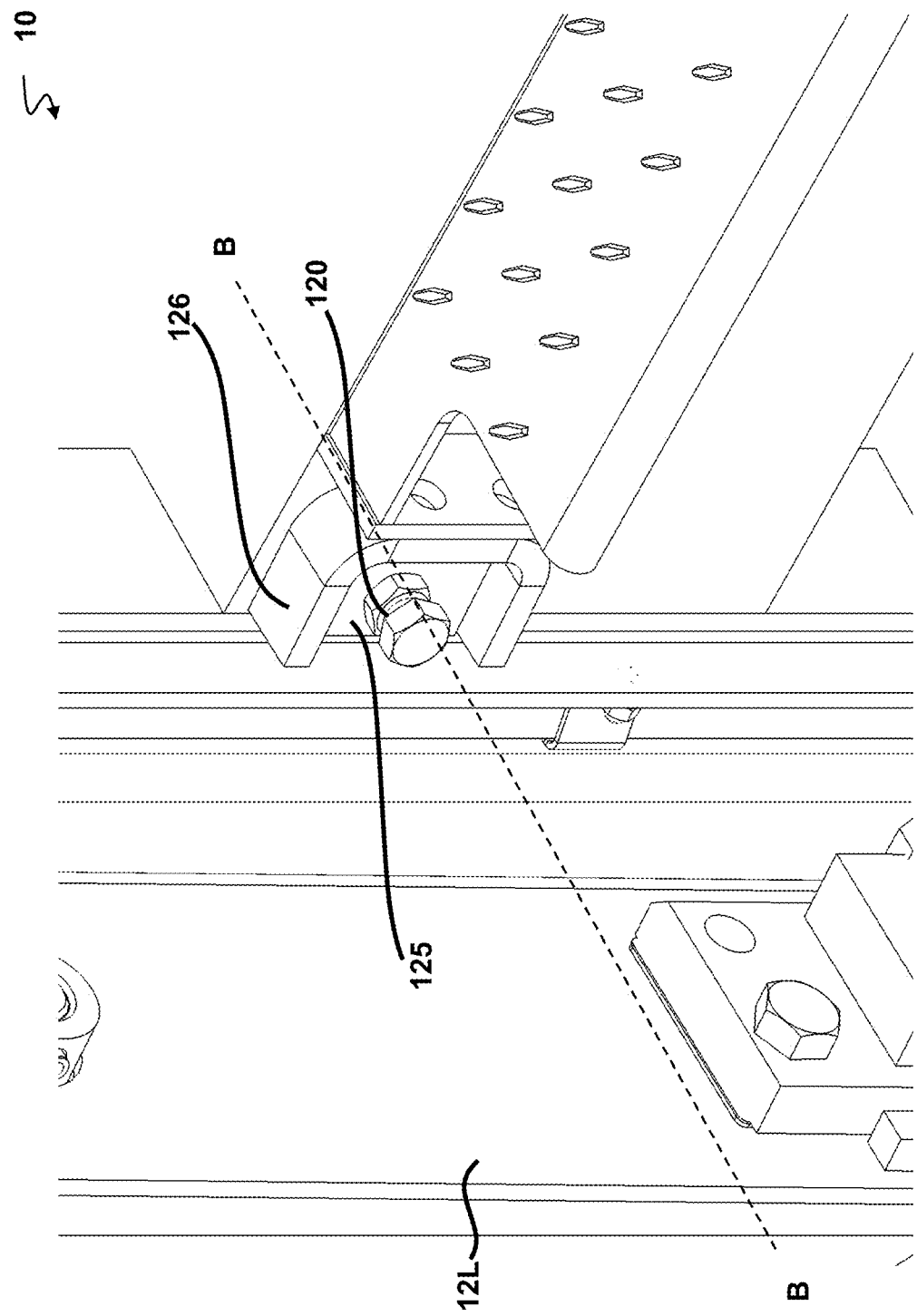
FIG. 46 shows a left side perspective view of a lower correction structure attached to the left side lift gate column with a lower support block installed and a lower correction mechanism engaged, according to one embodiment.

With reference to FIG. 46, the present embodiments include a lower correction structure 126 attached to the right side of the left support column 12L with a lower support block 125 installed and a lower correction mechanism 120 engaged. The lower correction mechanism 120 may be a bolt, rod, or any other device to provide support between the structure 1, lift gate 10, or mounting member 14L. Similarly, the lower correction structure 126 may be any shape, size, and/or thickness to support and align the lower correction mechanism 120 relative to the structure 1, lift gate 10, or mounting member 14L. The lift gate 10 may have the lower correction structure 126, which may be essentially a u-shaped element with three walls and two openings on one wall, and may be installed at the factory. In one embodiment, the lower support block 125, which may be a rectangular block with a central opening, may be installed after purchase by a user. In other embodiments, the lower support block 125 may be welded onto the lower correction structure 126. It can be appreciated by those skilled in the art that the lower support block 125 may be installed in locations other than inside of the lower correction structure 126 and can in fact be added to any location on the lift gate 10 that provides sufficient support for the proper usage of the lower correction mechanism 120. The lower support block 125 has a threaded hole that goes through the central area of the lower support block 125. The lower correction mechanism 120, which can essentially be a male threaded bolt, can be mated with the threaded hole in the lower support block 125. The mating and tightening of the lower correction mechanism 120 with the lower support block 125 can act as an additional (or primary) source of corrective force to provide for a non-flush mounting between the left support column 12L and the mounting member. The lower correction mechanism 120 can be engaged, such that the support columns may become substantially parallel with each other with respect to the x-axis. The lower correction mechanism 120 can be tightened after the upper correction mechanism 110 has been utilized to facilitate the non-flush mounting.

Figure 47:
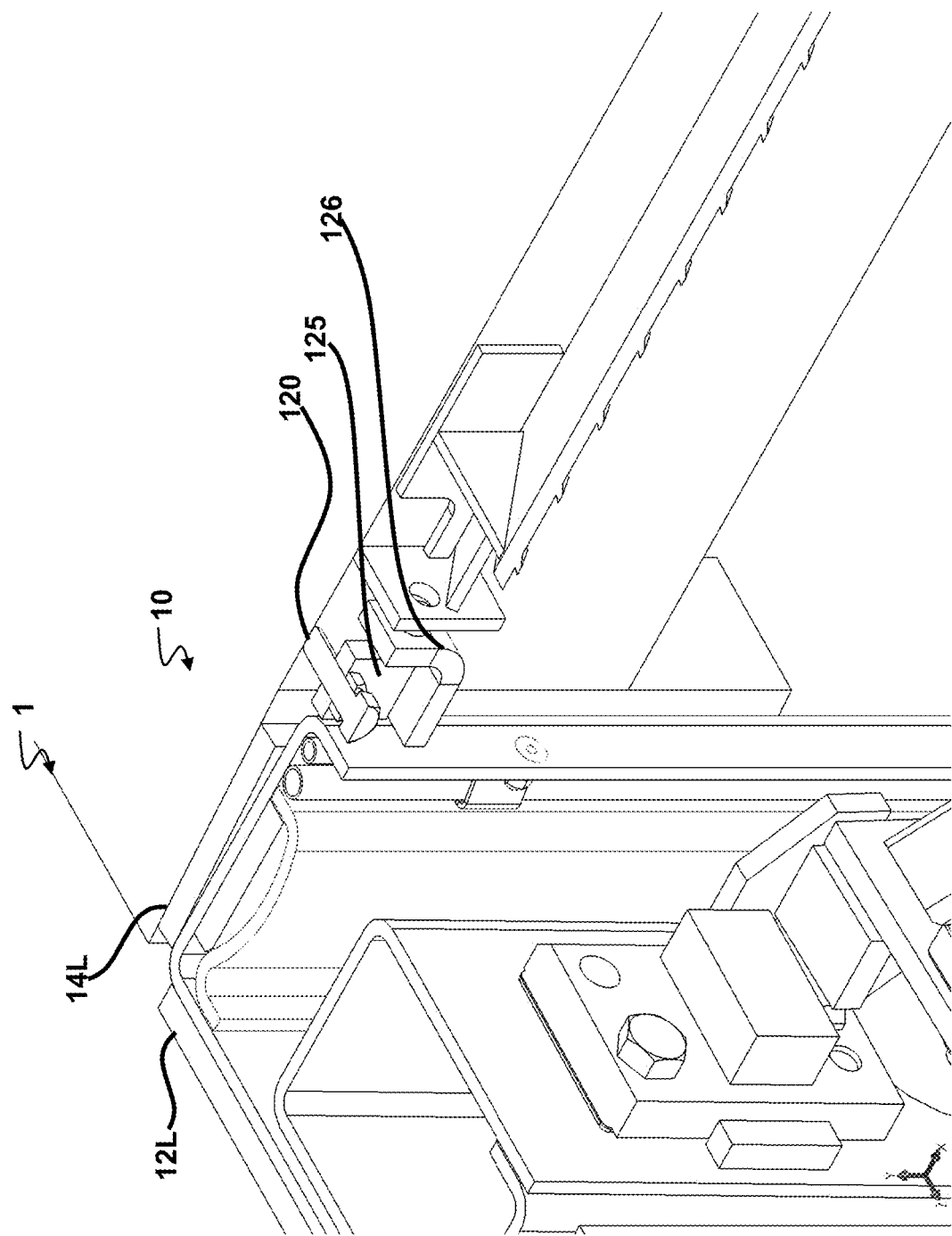
FIG. 47 shows a left side perspective cross-section of the lower correction structure of FIG. 46 about line B-B attached to the lift gate column with a lower support block installed and the lower correction mechanism engaged, according to one embodiment.

With reference to FIG. 47, the present embodiments include the lower correction structure 126 attached to the left support column 12L with a lower support block 125 installed and the lower correction mechanism 120 engaged. The lift gate 10 may have the lower correction mechanism 120 engaged against the surface of the structure 1. The lower correction mechanism 120 is secured in place by the lower support block 125, which is itself attached to the support column 12L by the lower correction structure 126. The left support column 12L can be mounted against a mounting member 14L which is attached to the structure 1 such that the left support column 12L is substantially parallel with the right support column 12R (not pictured) along the x-axis. The lower correction mechanism 120 can be increasingly engaged to create enough force to push the left support column 12L away from the mounting member 14L. In certain embodiments, this engagement process can be continued until the left support column 12L is substantially parallel enough with the right support column (not pictured) with respect with the x-axis such that proper operation of the lift gate platform (not pictured) is possible.

Figure 48A:
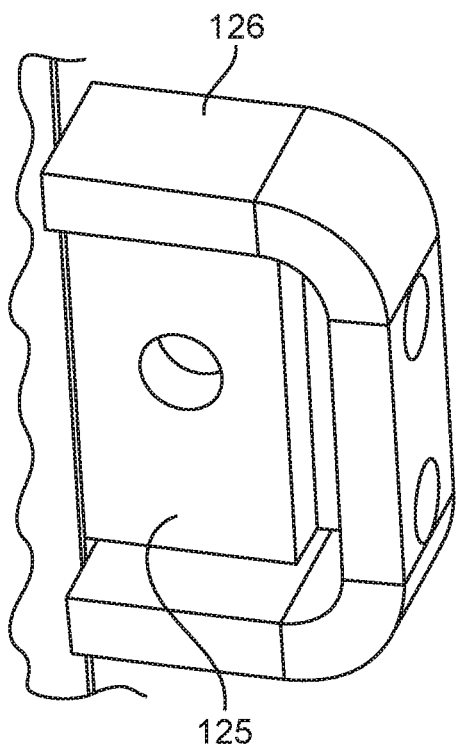
FIG. 48A shows a more-detailed perspective view of the lower correction structure attached to a lift gate column with the lower support block installed, according to one embodiment.

With reference to FIG. 48A, the present embodiments include the lower correction structure 126 attached to a lift gate column with the lower support block 125 installed. In one embodiment, the lower support block 125 can be welded against the truck and/or against the lower correction structure 126. In other embodiments, the lower support block 125 and lower correction structure 126 can be manufactured as a single piece to either be installed at the factory or utilized as an after-purchase item.

Figure 48B:
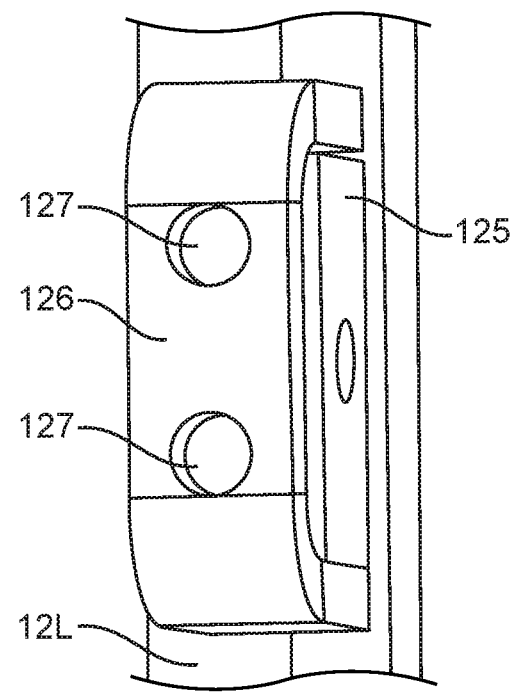
FIG. 48B shows a side view of the lower correction structure attached to a lift gate column with the lower support block installed, according to one embodiment

With reference to FIG. 48B, the present embodiments include the lower correction structure 126 attached to the left support column 12L with the lower support block 125 installed. In one embodiment, the lower correction structure 126 may contain at least one of a plurality of holes 127 on a side of the lower correction structure 126 opposite from the side attached to the left support column 12L. The plurality of holes 127 in the side of the lower correction structure 126 can be used for extension purposes. For example, the plurality of holes 127 of the lower correction structure 126 can be large enough to allow a bolt to connect two structures together even when the holes 127 are misaligned with the corresponding holes on the connecting structures.

Figure 48C:
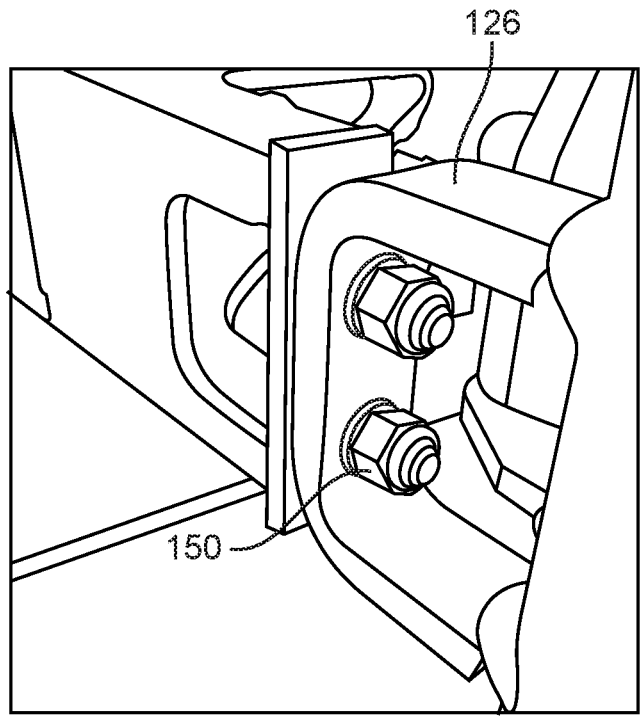
FIG. 48C shows a perspective view of a lower correction structure attached to a lift gate column with extension mechanisms engaged, according to one embodiment.

With reference to FIG. 48C, the present embodiments include a lower correction structure 126 attached to a lift gate column with extension mechanisms 150 engaged. In an embodiment, the lower correction structure 126 can be utilized as an extension by allowing for at least one mechanism 150 to be attached between the lower correction structure 126 and another structure such as, but not limited to, an extension plate of the vehicle.

While a variety of lower correction structures and correction mechanism engagements are described above with reference to FIGS. 46-48C, the specific configurations and arrangements of the lower support block and corresponding lower correction mechanism are largely dependent upon the requirements or applications of the users. For example, it can be appreciated by those skilled in the art that a user who desires the lower support structure to be utilized for extension purposes, may have the lower support block attached elsewhere on the lift gate mounting system. Additionally, each lower correction structure and lower correction mechanism can be affixed to either a left or right support column.

Figure 49:
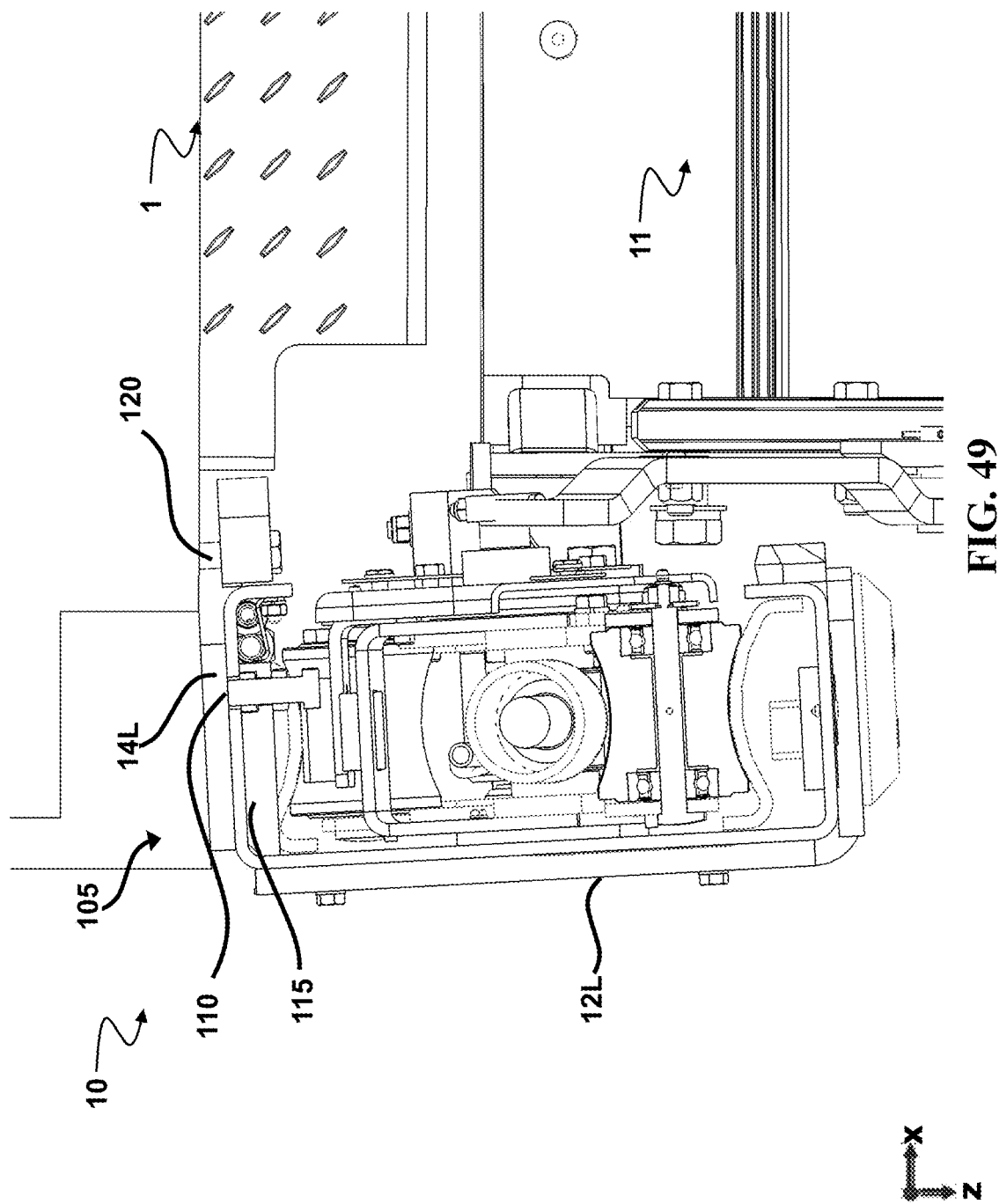
FIG. 49 shows an overhead cross-section view of the left support column of a lift system with an upper support block, upper correction mechanism, and lower correction mechanism mounted at the left mounting member that is not substantially parallel with the right mounting member along the z-axis, according to one embodiment.

With reference to FIG. 49, the present embodiments include the left support column 12L of a lift system 10 with an upper support block 115, upper correction mechanism 110, and lower correction mechanism 120 mounted at the left mounting member 14L that is not substantially parallel with the right mounting member (not pictured) along the x-axis. The support column 12L can be mounted flush to the structure 1 by being mounted on a mounting member 14L attached to the back of the structure 1. The lift gate 10 can have an upper correction mechanism 110 and lower correction mechanism 120 that may provide corrections to the mounting of the support column 12L to the mounting member 14L. The structure 1 can have a bend in the body where the mounting member is placed such that by mounting the lift gate 10 flush to the corresponding mounting member 14L, the two support columns may be non-parallel to each other with respect to the x-axis such that proper operation of the lift gate platform upwards and/or downwards is not possible.

Figure 50:
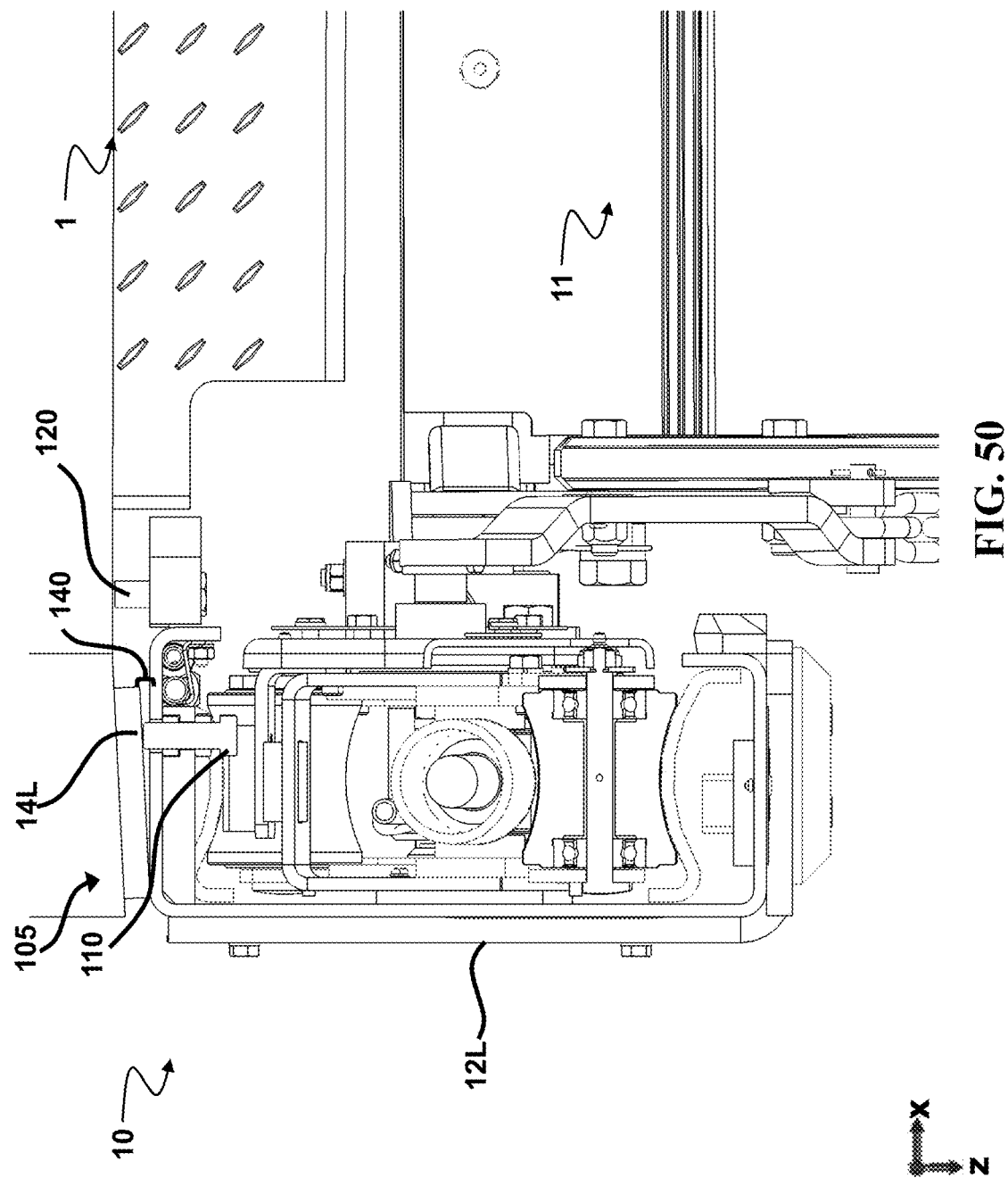
FIG. 50 shows an overhead cross-section view of the left support column of a lift system with an upper support block, an engaged upper correction mechanism, and engaged lower correction mechanism mounted at the left mounting member that is not substantially parallel with the right mounting member along the z-axis, according to one embodiment.

With reference to FIG. 50, the present embodiments include the left support column 12L of a lift gate 10 with an upper support block 115, an engaged upper correction mechanism 110, and engaged lower correction mechanism 120 mounted at the left mounting member 14L that is not substantially parallel with the right mounting member along the x-axis. The lift gate 10 may engage a correction system comprising an upper correction mechanism 110 and a lower correction mechanism 120. The engagement of the upper correction mechanism 110 and lower correction mechanism 120 can create enough force to push the support column 12L away from the mounting member 14L such that a non-flush mounting is achieved. In one embodiment, the non-flush mounting can be achieved when a corrective gap 140 is created between the vehicle-facing side of the support column 12L and the mounting member 14L. This force is created by the pressure of the upper correction mechanism 110 and/or the lower correction mechanism 120 against the surface of the mounting member 14L and/or the structure 1. The corrective gap 140 can be adjusted to facilitate a more parallel alignment between the two support columns with respect to the x-axis that may allow for proper operation of the lift gate platform 11.

Figure 51:
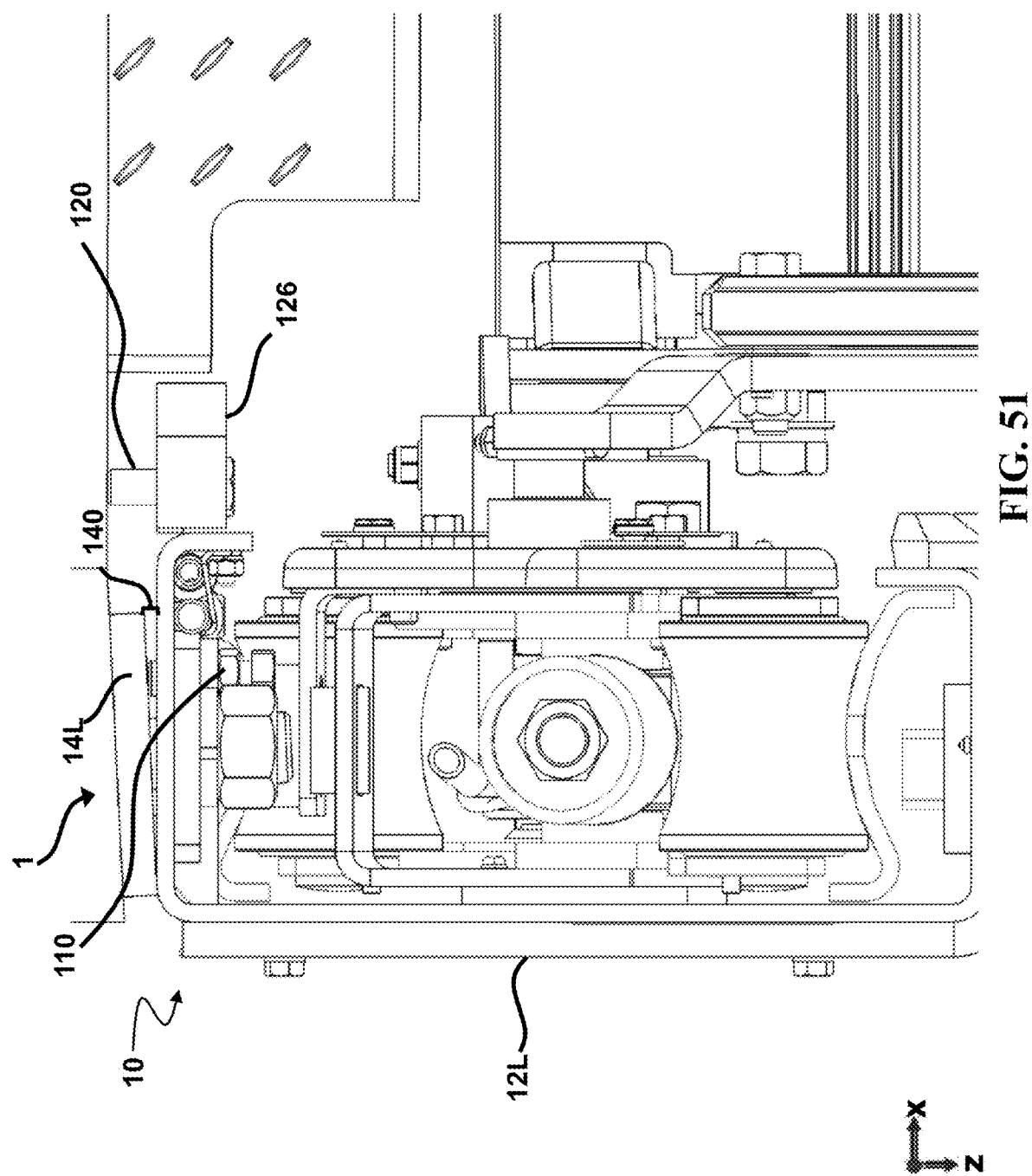
FIG. 51 shows a more-detailed overhead view of the left support column of a lift system with an upper support block, an engaged upper correction mechanism, a lower correction structure attached to the left support column, and engaged lower correction mechanism mounted at the left mounting member that is not substantially parallel with the right mounting member along the z-axis, according to one embodiment.

With reference to FIG. 51, the present embodiments include an overhead view of the left support column 12L of a lift gate 10 attached to a bent left side of the structure 1 after a correction adjustment is made. In further embodiments, the lift gate 10 can further be corrected by engaging the lower correction mechanism 120 that is supported by the lower correction structure 126. In more embodiments, a corrective force can be amplified and/or supported by the lower correction mechanism 120 being engaged against the vehicle. In still more embodiments, the engagement of the lower correction mechanism 120 can simply support the corrective gap 140 created by the engagement of the upper correction mechanism 110 against the mounting member 14L. In certain embodiments, the engagement of the lower correction mechanism 120 can enhance and/or enlarge the corrective gap 140 between the mounting member 14L and vehicle-facing side of the mounting member 12L.

While a variety of correction systems and configurations are described above with reference to FIGS. 49-51, the specific configurations and arrangements of the correction systems and configurations are largely dependent upon the requirements or applications of the users. For example, it can be appreciated by those skilled in the art all depicted parts and processes can be found, installed and/or utilized in both left and right support columns in a mirror and/or similar fashion, and only a single column is shown in certain FIGS. to simplify the illustrative and/or descriptive process. In this way, adjustments can be made to either side or both columns to facilitate increased use of the lift gate platform.

Figure 52:
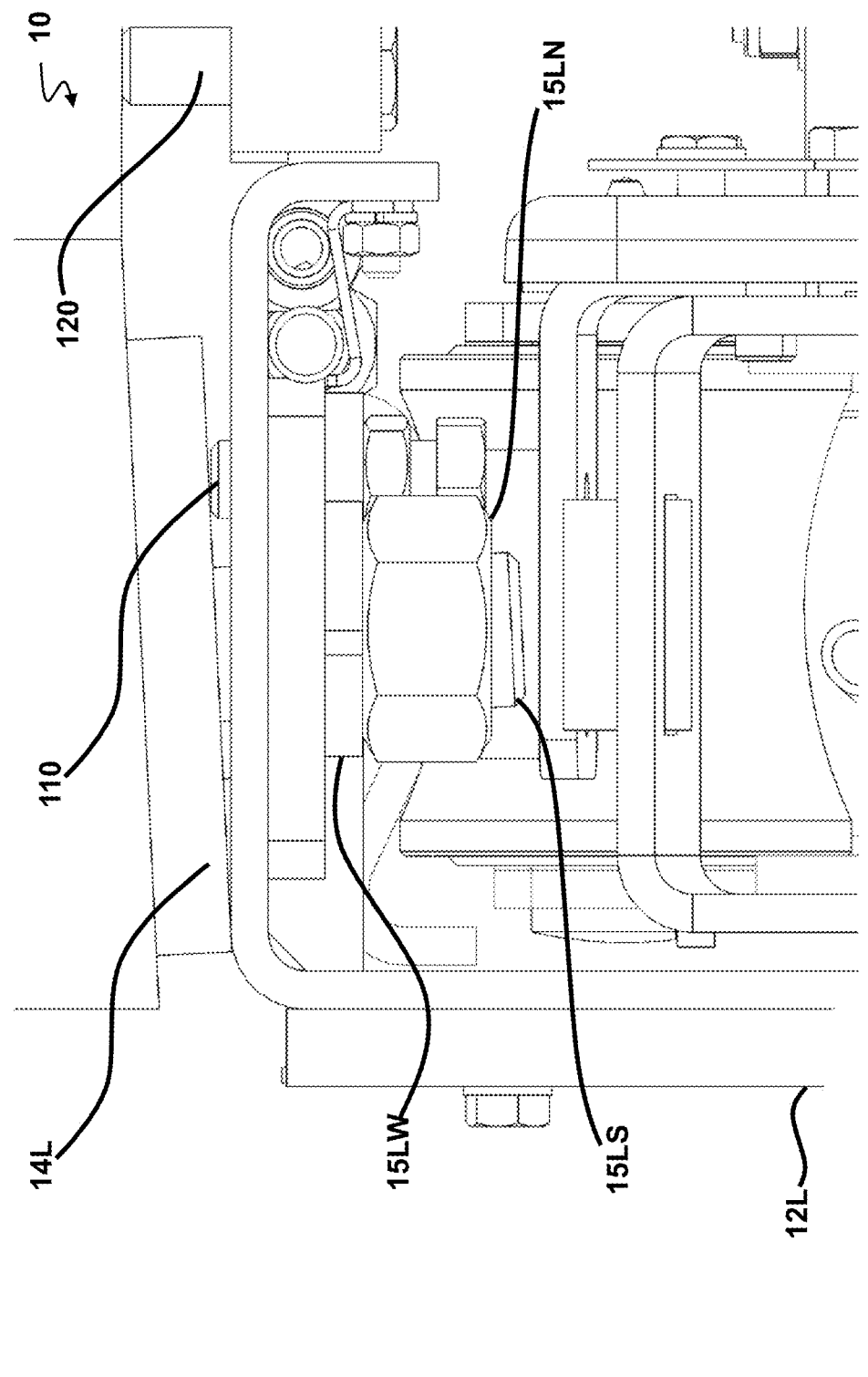
FIG. 52 shows an overhead view of a washer and a threaded nut engaged on a mounting protrusion of a left mounting member that is not substantially parallel with the right mounting member along the z-axis, according to one embodiment.

With reference to FIG. 52, the present embodiments include an overhead view of a threaded nut 15LN engaged in a corrected position. In a number of embodiments, the non-flush mounting of the left support column 12L to the mounting member 14L can create an off-center mounting protrusion 15LS that the threaded nut 15LN may have to engage with. In certain embodiments, the addition of a washer 15LW may help this engagement between threaded nut 15LN and mounting protrusion 15LS. In more embodiments, in response to the engagement of the upper and lower corrective mechanisms 110, 120 that sufficiently creates a pair of substantially parallel columns with respect to the x-axis that can allow for the operation of a lift gate platform, the threaded nut 15LN may be tightened back onto the mounting protrusion 15LS such that a sufficiently tight connection is made and the left support column 12L is properly secured to the vehicle allowing for proper operation of the lift gate 10.

Figure 53:
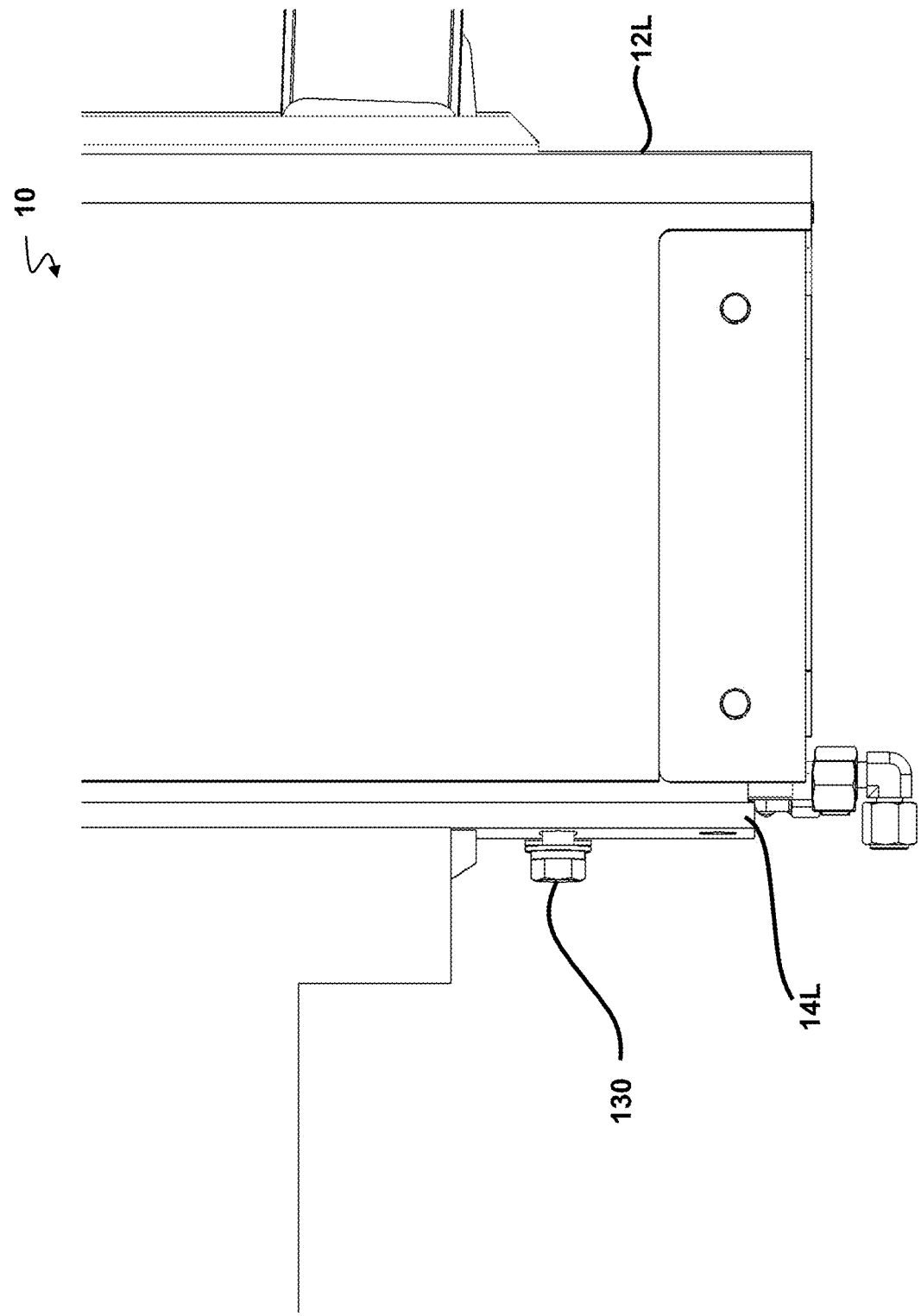
FIG. 53 shows a side view of the lower mounting mechanism engaged on a left mounting member that is not substantially parallel with the right mounting member along the z-axis, according to one embodiment.

With reference to FIG. 53, the present embodiments include a side view of the lower tightening mechanism 130 engaged after correction. Similar to the threaded nut of FIG. 52, in many embodiments, upon completion of the engagement of the corrective mechanisms that allow for the use of a lift gate platform, the lower mounting mechanism 130 may be re-engaged such that the mounting member 14L and support column 12L are fastened together sufficiently to allow for proper lift gate 10 use. In a number of embodiments, the reengagement of the threaded nut of FIG. 52 and lower mounting mechanism 130 after the engagement of the upper and lower corrective mechanisms can complete the correction process.

While a variety of mounting mechanisms and correction processes are described above with reference to FIGS. 52-53, the specific configurations and arrangements of mounting mechanisms and correction processes are largely dependent upon the requirements or applications of the users. For example, it can be appreciated by those skilled in the art all depicted parts and processes can be found, installed and/or utilized in both left and right support columns in a mirror and/or similar fashion, and only a single column is shown in certain FIGS. to simplify the illustrative and/or descriptive process.

Figure 54:
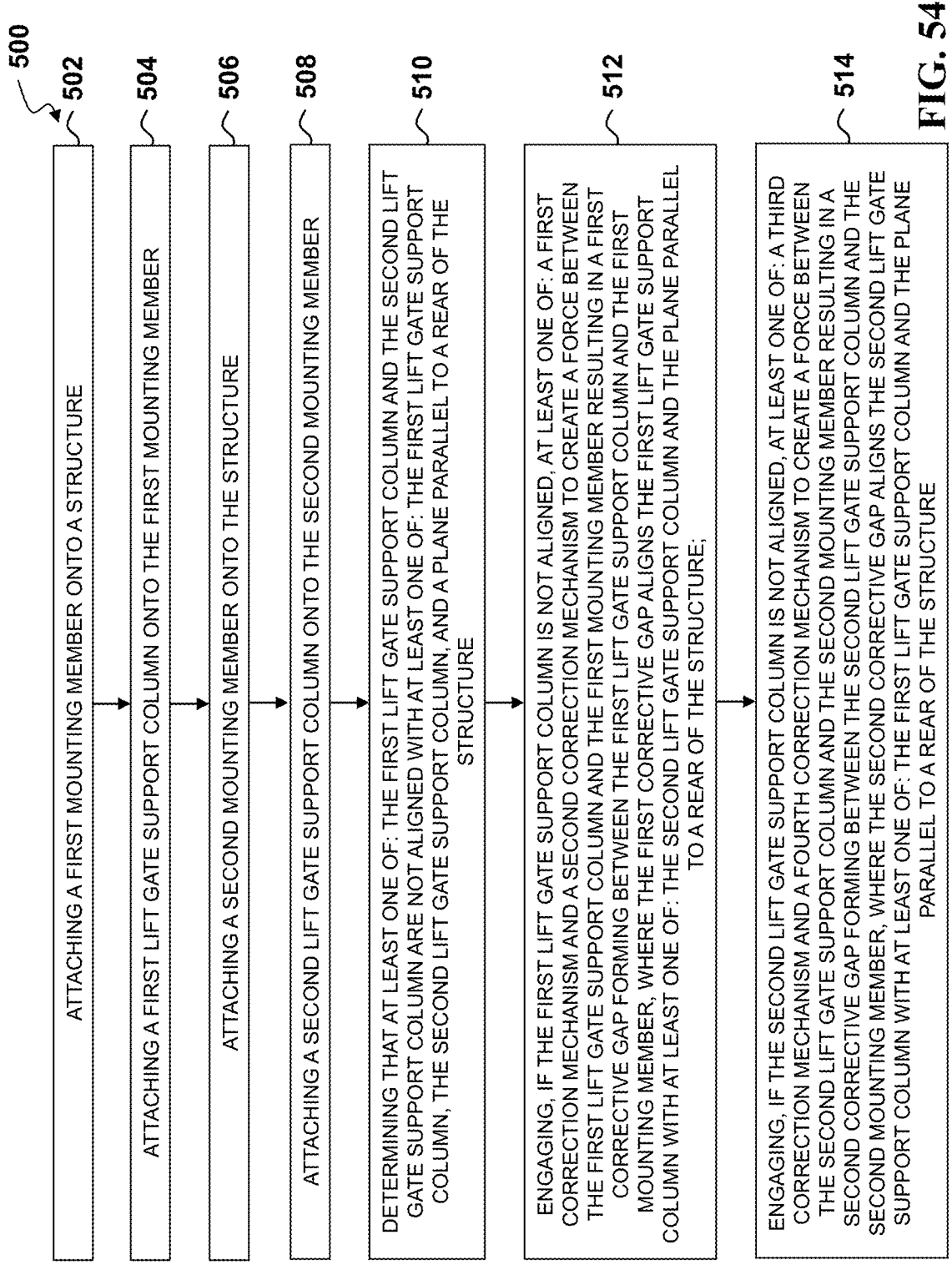
FIG. 54 shows a high-level block diagram of a method embodiment for aligning lift gate support columns, according to one embodiment.

With reference to FIG. 54, a high-level block diagram of a method embodiment 500 is shown for aligning lift gate support columns, according to one embodiment. The method 500 may include attaching a first mounting member 14L onto a structure 1 (step 502). The method 500 may then include attaching a first lift gate support column 12L onto the first mounting member 14L (step 504). The method 500 may then include attaching a second mounting member 14R onto the structure 1 (step 506). The method 500 may then include attaching a second lift gate support column 12R onto the second mounting member 14R (step 508). The structure 1 may be a vehicle, such as a truck. The first and second lift gate support columns 12L, 12R may require substantial alignment to allow for operation of a lift gate platform 11. The structure 1 may have portions that are not substantially aligned along an x-axis due to defects, impacts, and the like. A need exists to account for these misalignments when mounting the first and second lift gate support columns 12L, 12R so as to ensure proper operation of the lift gate 10 without impingement of the lift gate platform 1 against the structure 1, lift gate support columns 12L, 12R, or other elements.

The method 500 may then include determining that at least one of: the first lift gate support column 12L and the second lift gate support column 12R are not aligned with at least one of: the first lift gate support column 12L, the second lift gate support column 12R, and a plane parallel to a rear of the structure 1 (step 510). This determination may be via a visual inspection, a mechanical inspection, or a combination to determine a misalignment. For example, one or more devices may be used to compare the alignment of the first lift gate support column 12L relative to the second lift gate support column 12R and/or a plane parallel to a rear of the structure 1. In some embodiments, the lift gate 10 may include one or more mechanical or visual indications that alignment has not been achieved and that correction is required.

The method 500 may then include engaging, if the first lift gate support column 12L is not aligned, at least one of: a first correction mechanism 110 and a second correction mechanism 120 to create a force between the first lift gate support column 12L and the first mounting member 14L resulting in a first corrective gap 140 forming between the first lift gate support column 12L and the first mounting member 14L, wherein the first corrective gap aligns the first lift gate support column 12L with at least one of: the second lift gate support column 12R and the plane parallel to a rear of the structure 1 (step 512). The first correction mechanism 110 and/or second correction mechanism 120 may be disposed at least partially within the first lift gate support column 12L and/or at least partially attached to an outside surface of the first lift gate support column 12L. The first correction mechanism 110 may be spaced apart from the second correction mechanism 120, e.g., on left and right sides and/or on a top and a bottom portion of the first lift gate support column 12L. This spacing of the first correction mechanism 110 from the second correction mechanism 120 may allow for further adjustment if the structure 1 is not evenly bent, e.g., if the top portion contains a greater bend than a bottom portion. Engaging the first correction mechanism (110) may further include extending the first correction mechanism (110) through a first support block (115) located within the first lift gate support column (12L) and an opening in a wall of the first lift gate support column (12L) to contact the first mounting member (14L). Engaging the second correction mechanism (120) may further include: extending the second correction mechanism (120) through a second support block (125) extending from the first lift gate support column (12L) to contact the structure (1). Engaging the second correction mechanism (120) may further include extending one or more extension mechanisms (15) through one or more holes (127) in a correction structure (126) to one or more corresponding holes in an extension plate 920) of the structure, wherein the correction structure (126) extends from the first lift gate support column (12L).

The method may then include engaging, if the second lift gate support column 12R is not aligned, at least one of: a third correction mechanism 110 and a fourth correction mechanism 120 to create a force between the second lift gate support column 12R and the second mounting member 14R resulting in a second corrective gap 140 forming between the second lift gate support column 12R and the second mounting member 14R, where the second corrective gap aligns the second lift gate support column 12R with at least one of: the first lift gate support column 12L and the plane parallel to a rear of the structure 1 (step 514). The third correction mechanism 110 and fourth correction mechanism 120 may act the same as the first correction mechanism 110 and second correction mechanism 120 but mirrored on the second lift gate support column 12R. In some embodiments, the lift gate 10 may include correction mechanisms in both lift gate support columns. In other embodiments, the lift gate 10 may include correction mechanisms in only one lift gate support columns. In other embodiments, the correct mechanisms may be added to the lift gate 10 based on need, e.g., during initial installation on a vehicle with a bent rear frame or after a vehicle sustains damage to a rear frame resulting in a bend and non-parallel lift gate support columns. The number and placement of correction mechanisms may be determined based on the specific structure 1 and placement of any bends or damage resulting in non-parallel alignment of the lift gate support structures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though the present invention has been described with reference to certain versions thereof; however, other versions are possible. Therefore, the spirit and scope of the appended claims should not be limited to the description of the preferred versions contained herein.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A system for correcting a mounting system for mounting a lift gate on a structure, the lift gate having a lift platform supported between a pair of spaced support columns, the correction system comprising:
a first mounting member configured for attachment onto the structure;
a first lift gate support column configured for attachment onto the first mounting member;
a first correction mechanism configured to couple with a first support block, the first support block located within the first lift gate support column, the first correction mechanism extending from within the first lift gate support column and through the first support block and an opening in a wall of the first lift gate support column to the first mounting member;
wherein the first correction mechanism creates a force between the first lift gate support column and the first mounting member when engaged, resulting in a first corrective gap forming between the first lift gate support column and the first mounting member; and
wherein the resulting corrective gap orients the first lift gate support column to be substantially parallel with a plane parallel to a rear of the structure such that the lift gate platform can be operated.

2. The system of claim 1, wherein the first mounting member includes a support protrusion for engaging an opening in the wall of the first lift gate support column.

3. The system of claim 1 further comprising:
a second correction mechanism configured to couple with a second support block, the second support block located within a correction structure, the correction structure extending from the first lift gate support column, the second correction mechanism extending through the second support block to the structure.

4. The system of claim 3, wherein the first correction mechanism and the second correction mechanism create the force between the first lift gate support column and the first mounting member when engaged, resulting in the first corrective gap forming between the first lift gate support column and the first mounting member.

5. The system of claim 4, wherein the resulting corrective gap orients the first lift gate support column to be substantially parallel with the plane parallel to the rear of the structure such that the lift gate platform can be operated.

6. The system of claim 3, wherein the second correction mechanism is attached to an outer surface of the first lift gate support column.

7. The system of claim 6, wherein the second correction mechanism is disposed proximate an extension plate of the structure.

8. The system of claim 3 further comprising:
a second mounting member configured for attachment onto the structure; and
a second lift gate support column configured for attachment onto the second mounting member;
wherein the resulting corrective gap orients the first lift gate support column to be substantially parallel with the second mounting member such that the lift gate platform can be operated.

9. The system of claim 8 further comprising:
a third correction mechanism configured to couple with a third support block, the third support block located within the second lift gate support column, the third correction mechanism extending from within the second lift gate support column and through the third support block and an opening in the wall of the second lift gate support column to the second mounting member.

10. The system of claim 9 further comprising:
a fourth correction mechanism configured to couple with a fourth support block, the fourth support block located within a second correction structure, the second correction structure extending from the second lift gate support column, the fourth correction mechanism extending through the fourth support block to the structure.

11. The system of claim 10, wherein the third correction mechanism and the fourth correction mechanisms create a force between the second lift gate support column and the second mounting member when engaged, resulting in a second corrective gap forming between the second lift gate support column and the second mounting member, and wherein the resulting second corrective gap orients the first lift gate support column to be substantially parallel with the second lift gate support column with respect to the x-axis such that a lift gate platform can be operated.

12. The system of claim 8 further comprising:
a third correction structure, the third correction structure extending from the second lift gate support column; and
one or more extension mechanisms, each extension mechanism extending through one or more holes in the correction structure and one or more corresponding holes in an extension plate of the structure.

13. The system of claim 1 further comprising:
a correction structure, the correction structure extending from the first lift gate support column; and
one or more extension mechanisms, each extension mechanism extending through one or more holes in the correction structure and one or more corresponding holes in an extension plate of the structure.

14. The system of claim 1 further comprising:
a second lift gate support column, wherein the resulting corrective gap orients the first lift gate support column to be substantially parallel with the second lift gate support column with respect to the x-axis such that the lift gate platform can be operated.

15. A method comprising:

attaching a first mounting member onto a structure;

attaching a first lift gate support column onto the first mounting member;

attaching a second mounting member onto the structure;

attaching a second lift gate support column onto the second mounting member;

determining that at least one of: the first lift gate support column and the second lift gate support column are not aligned with at least one of: the first lift gate support column, the second lift gate support column, and a plane parallel to a rear of the structure;

engaging, if the first lift gate support column is not aligned, at least one of: a first correction mechanism and a second correction mechanism to create a force between the first lift gate support column and the first mounting member resulting in a first corrective gap forming between the first lift gate support column and the first mounting member, wherein the first corrective gap aligns the first lift gate support column with at least one of: the second lift gate support column and the plane parallel to a rear of the structure; and engaging, if the second lift gate support column is not aligned, at least one of: a third correction mechanism and a fourth correction mechanism to create a force between the second lift gate support column and the second mounting member resulting in a second corrective gap forming between the second lift gate support column and the second mounting member, wherein the second corrective gap aligns the second lift gate support column with at least one of: the first lift gate support column and the plane parallel to a rear of the structure.

16. A method of claim 15, wherein engaging the first correction mechanism further comprises:

extending the first correction mechanism through a first support block located within the first lift gate support column and an opening in a wall of the first lift gate support column to contact the first mounting member.

17. A method of claim 15, wherein engaging the second correction mechanism further comprises:

extending the second correction mechanism through a second support block extending from the first lift gate support column to contact the structure.

18. A method of claim 15, wherein engaging the second correction mechanism further comprises:

extending one or more extension mechanisms through one or more holes in a correction structure to one or more corresponding holes in an extension plate of the structure, wherein the correction structure extends from the first lift gate support column.

19. A system comprising:

one or more correction mechanisms configured to couple with one or more support blocks, the one or more support blocks coupled to one or more lift gate support columns, the one or more correction mechanisms extending through the one or more support blocks to a structure;

wherein the one or more correction mechanisms create one or more forces between the one or more lift gate support columns and the structure when engaged, resulting in one or more corrective gaps forming between the one or more lift gate support columns and the structure; and wherein the resulting one or more corrective gaps orient the one or more lift gate support columns to be substantially parallel with a plane parallel to a rear of the structure such that a lift gate platform can be operated.

20. The system of claim 19, wherein the one or more correction mechanisms comprise:

a first correction mechanism configured to couple with a first support block of the one or more support blocks, the first support block located within a first lift gate support column of the one or more lift gate support columns, the first correction mechanism extending from within the first lift gate support column and through the first support block and an opening in the wall of the first lift gate support column to the structure; and a second correction mechanism configured to couple with a second support block of the one or more support blocks, the second support block located within a correction structure, the correction structure extending from the first lift gate support column, the second correction mechanism extending through the second support block to the structure.

* * * * *